United States Patent [19]
Mano et al.

[11] Patent Number: 5,583,530
[45] Date of Patent: Dec. 10, 1996

[54] LIQUID CRYSTAL DISPLAY METHOD AND APPARATUS CAPABLE OF MAKING MULTI-LEVEL TONE DISPLAY

[75] Inventors: Hiroyuki Mano; Tatsuhiro Inuzuka; Satoshi Konuma, all of Yokohama; Kazuhiro Fujisawa, Fujisawa; Toshio Futami, Mobara; Satoru Tsunekawa, Tachikawa, all of Japan

[73] Assignees: Hitachi, Ltd., Tokyo; Hitachi Video Engineering, Inc., Kanagawa-ken, both of Japan

[21] Appl. No.: 15,896

[22] Filed: Feb. 10, 1993

Related U.S. Application Data

[63] Continuation of Ser. No. 592,251, Oct. 3, 1990, abandoned.

[30] Foreign Application Priority Data

Oct. 9, 1989 [JP] Japan .................................. 1-262021
Dec. 15, 1989 [JP] Japan .................................. 1-324927

[51] Int. Cl.⁶ .................................................. G09G 3/36
[52] U.S. Cl. .......................................... 345/89; 345/94
[58] Field of Search ............................... 340/793, 784, 340/767, 805, 701, 703; 345/87, 88, 89, 147, 148, 94; 359/54, 56, 59

[56] References Cited

U.S. PATENT DOCUMENTS

| | | | |
|---|---|---|---|
| 2,743,096 | 5/1988 | Wakai et al. | 340/793 |
| 4,725,833 | 2/1988 | Nakamura | 340/793 |
| 4,808,991 | 2/1989 | Tachiuchiu et al. | 340/793 |
| 4,827,255 | 5/1989 | Ishii | 340/793 |
| 5,038,139 | 8/1991 | Fujisawa et al. | 340/805 |
| 5,196,839 | 3/1993 | Tohany et al. | 345/148 |

FOREIGN PATENT DOCUMENTS

| | | | |
|---|---|---|---|
| 3326517 | 1/1984 | Germany . | |
| 3529376 | 2/1986 | Germany . | |
| 0149393 | 8/1984 | Japan . | |
| 0219887 | 1/1989 | Japan | 345/89 |
| 0001812 | 1/1990 | Japan . | |

*Primary Examiner*—Richard Hjerpe
*Assistant Examiner*—Chanh Nguyen
*Attorney, Agent, or Firm*—Antonelli, Terry, Stout & Kraus

[57] ABSTRACT

A liquid crystal display system capable of making a display of $2^{i+j}$ (i, j: positive integers) kinds of tones display includes a frame rate control device for selecting one out of frame rate control data of $2^j$ kinds in accordance with j-bit display data included in (i+j)-bit display data, i and j being positive integers, a multi-level tone pulse generator for generating display pulses of $2^i+1$ kinds including at least activation for display, inactivation for display, and intermediate display corresponding to an intermediate level, and a selection drive device for selecting a display pulse of one kind out of display pulses of $2^i+1$ kinds in accordance with the frame rate control data supplied from the frame rate control device and i-bit display data and applying the selected display pulse to a liquid crystal panel, the i-bit being different from the j-bit.

2 Claims, 49 Drawing Sheets

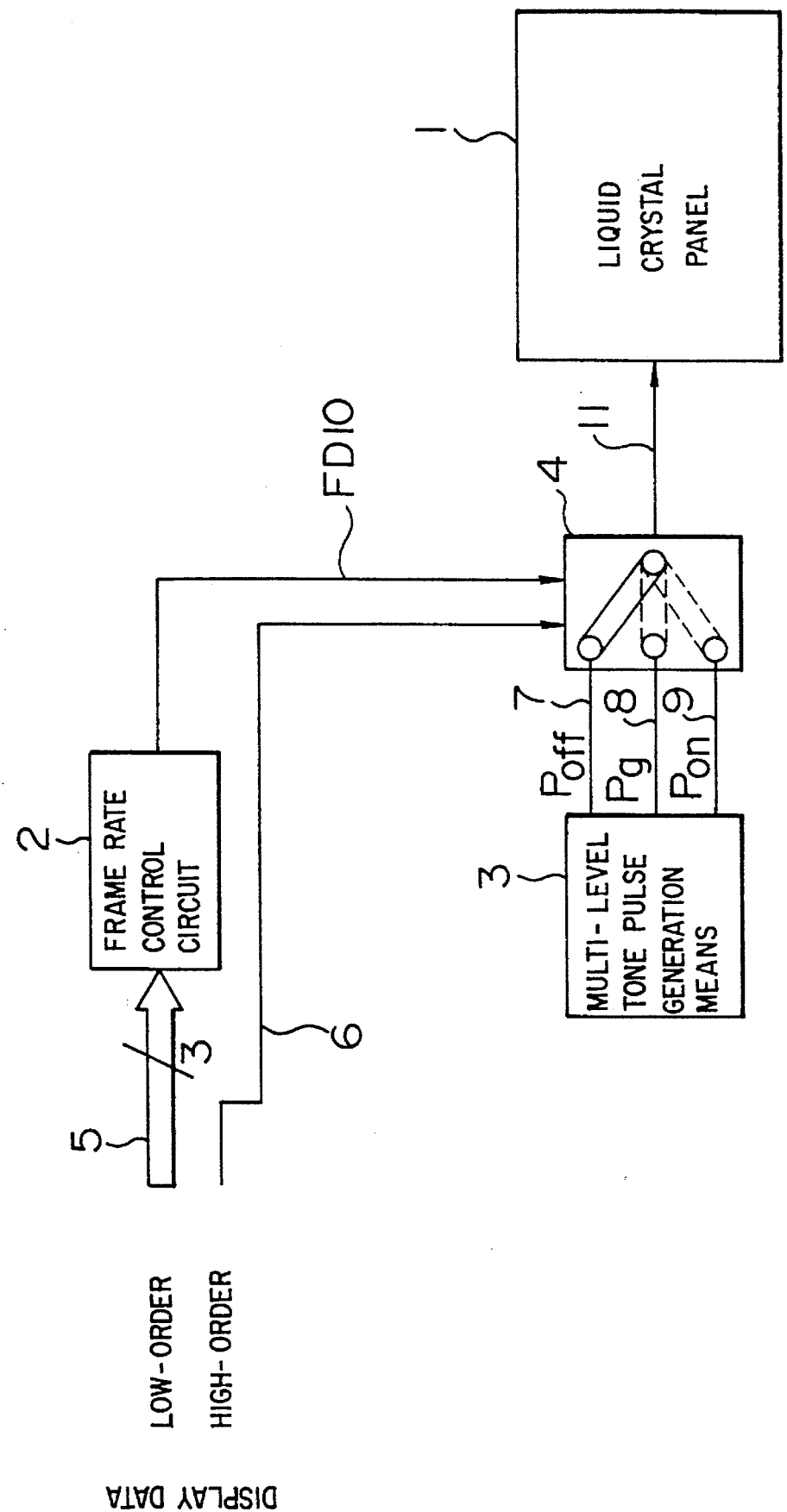

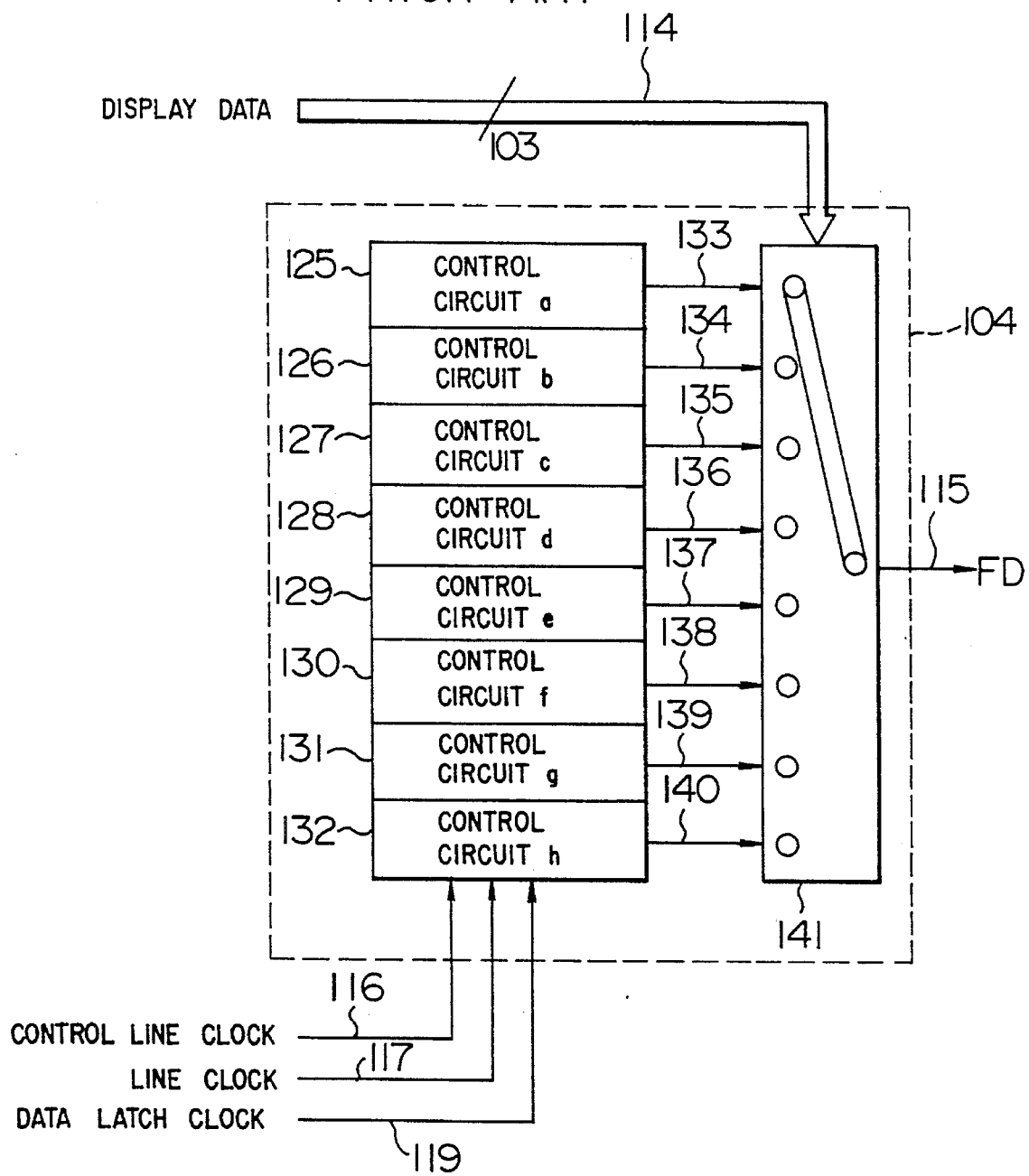

FIG. 3B
PRIOR ART

| DISPLAY DATA | | | SELECTED CONTROL CIRCUIT | FRAME RATE CONTROL RATIO |
|---|---|---|---|---|
| D2 | D1 | D0 | | |
| 0 | 0 | 0 | a | 0 |
| 0 | 0 | 1 | b | 1/5 |
| 0 | 1 | 0 | c | 1/3 |
| 0 | 1 | 1 | d | 1/2 |
| 1 | 0 | 0 | e | 2/3 |
| 1 | 0 | 1 | f | 4/5 |
| 1 | 1 | 0 | g | 7/8 |
| 1 | 1 | 1 | h | 1 |

FIG. 3C
PRIOR ART
| FRAME NO. | FRAME RATE CONTROL RATIO 1/3 | | FRAME RATE CONTROL RATIO 4/5 | |
|---|---|---|---|---|
| | DISPLAY | LUMINANCE LEVEL | DISPLAY | LUMINANCE LEVEL |
| FIRST FRAME |  | 100% |  | 100% |
| SECOND FRAME | | 0% |  | 100% |
| THIRD FRAME | | 0% | | 0% |
| FOURTH FRAME | | |  | 100% |
| FIFTH FRAME | | |  | 100% |
| AVERAGE |  | 33.3% |  | 80% |

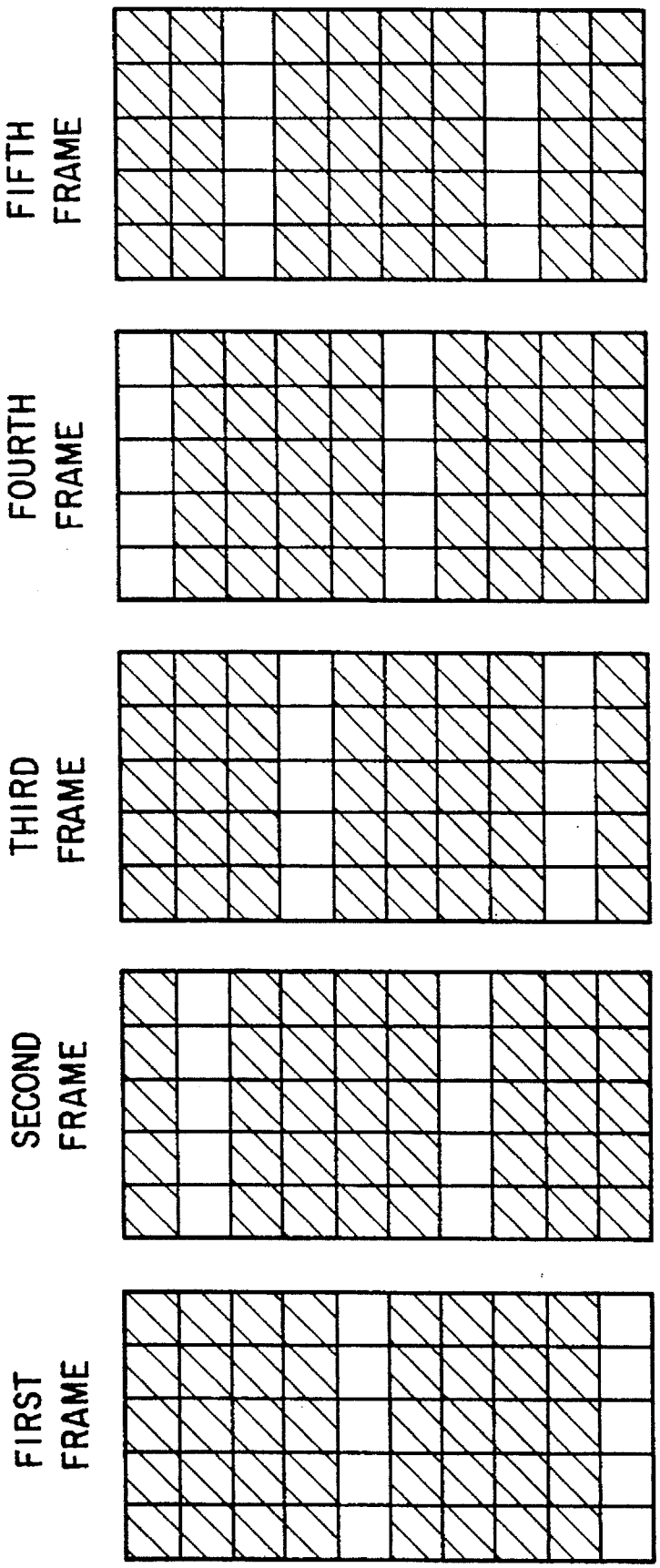

| DISPLAY DATA XD | | SELECTION PULSE | DISPLAY |
| --- | --- | --- | --- |
| XA | XB | | |
| 0 | 0 | PULSE 4 | OFF |
| 0 | 1 | PULSE 3 | HALF TONE DISPLAY |
| 1 | 0 | PULSE 2 | |
| 1 | 1 | PULSE 1 | ON |

FIG. 8

| HIGH-ORDER DISPLAY DATA | MULTI-LEVEL TONE PULSE (LUMINANCE LEVEL) ||
|---|---|---|
| | FD = 0 | FD = 1 |
| 0 | Poff (0%) | Pg (50%) |
| 1 | Pg (50%) | Pon (100%) |

FIG. 9

| FRAME NO. | HIGH-ORDER DISPLAY DATA 0 || HIGH-ORDER DISPLAY DATA 1 ||
|---|---|---|---|---|
| | DISPLAY | LUMINANCE LEVEL | DISPLAY | LUMINANCE LEVEL |
| FIRST FRAME | ▨ | 50% | ▨ | 100% |
| SECOND FRAME | ▨ | 50% | ▨ | 100% |
| THIRD FRAME | ☐ | 0% | ▨ | 50% |
| FOURTH FRAME | ▨ | 50% | ▨ | 100% |
| FIFTH FRAME | ▨ | 50% | ▨ | 100% |
| AVERAGE | ▨ | 40% | ▨ | 90% |

| HIGH-ORDER DISPLAY DATA | | FD = 0 | | FD = 1 | |
|---|---|---|---|---|---|
| Du1 | Du0 | PULSE NAME | LUMINANCE | PULSE NAME | LUMINANCE |
| 0 | 0 | P₀ | 0 % | P₁ | 25 % |
| 0 | 1 | P₁ | 25 % | P₂ | 50 % |
| 1 | 0 | P₂ | 50 % | P₃ | 75 % |
| 1 | 1 | P₃ | 75 % | P₄ | 100 % |

FIG. 14

| INPUT DISPLAY DATA | | | | DATA CONVERSION OUTPUT | | | | | FRAME RATE CONTROL RATIO | SELECTION PULSE | | AVERAGE LUMINANCE LEVEL (%) |
|---|---|---|---|---|---|---|---|---|---|---|---|---|
| | | | | i BITS | | j BITS | | | | WHEN FD=0 | WHEN FD=1 | |
| I | R | G | B | Di1 | Di0 | Dj2 | Dj1 | Dj0 | | | | |
| O | O | O | O | O | O | O | O | O | 0 | — | — | 0 |
| O | O | O | — | O | O | O | — | O | 1/3 | P0 | P1 | 8.3 |
| O | O | — | O | O | O | — | O | O | 2/3 | P0 | P1 | 16.7 |
| O | O | — | — | O | O | — | — | — | 1 | — | — | 25.0 |
| O | — | O | O | O | — | O | — | O | 1/3 | P1 | P2 | 33.3 |
| O | — | O | — | O | — | O | — | — | 1/2 | P1 | P2 | 37.5 |
| O | — | — | O | O | — | — | O | O | 2/3 | P1 | P2 | 41.7 |
| O | — | — | — | O | — | — | — | — | 1 | — | — | 50.0 |
| — | O | O | O | — | O | O | — | O | 1/3 | P2 | P3 | 58.3 |
| — | O | O | — | — | O | O | — | — | 1/2 | P2 | P3 | 62.5 |
| — | O | — | O | — | O | — | O | O | 2/3 | P2 | P3 | 66.7 |
| — | O | — | — | — | O | — | — | — | 1 | — | — | 75.0 |
| — | — | O | O | — | — | O | — | O | 1/3 | P3 | P4 | 83.3 |
| — | — | O | — | — | — | O | O | — | 1/2 | P3 | P4 | 87.5 |
| — | — | — | O | — | — | — | — | O | 2/3 | P3 | P4 | 91.7 |
| — | — | — | — | — | — | — | — | — | 1 | — | — | 100.0 |

FIG. 16

|  | ODD FRAME | | EVEN FRAME | |
|---|---|---|---|---|
|  | X ODD DOT | X EVEN DOT | X ODD DOT | X EVEN DOT |
| ODD LINE | — | ◯ | ◯ | — |
| EVEN LINE | ◯ | — | — | ◯ |

FIG. 17

|  | ODD FRAME | | | | EVEN FRAME | | | |
|---|---|---|---|---|---|---|---|---|
|  | X ODD DOT | | X EVEN DOT | | X ODD DOT | | X EVEN DOT | |
|  | $X_A$ | $X_B$ | $X_A$ | $X_B$ | $X_A$ | $X_B$ | $X_A$ | $X_B$ |
| ODD LINE | 0 | 1 | 1 | 0 | 1 | 0 | 0 | 1 |
| EVEN LINE | 1 | 0 | 0 | 1 | 0 | 1 | 1 | 0 |

| XD | | DISPLAY PULSE |
|---|---|---|
| MA(XA) | MB(XB) | |
| 0 | 0 | PULSE 1 |
| 0 | 1 | PULSE 2 |
| 1 | 0 | PULSE 3 |
| 1 | 1 | PULSE 4 |

FIG. 24
PRIOR ART
| FRAME NO. | FRAME RATE CONTROL RATIO 1/3 | | FRAME RATE CONTROL RATIO 1/3 | |
|---|---|---|---|---|
| | DISPLAY | LUMINANCE LEVEL | DISPLAY | LUMINANCE LEVEL |
| FIRST FRAME | 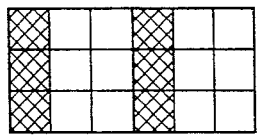 | 33.3% | 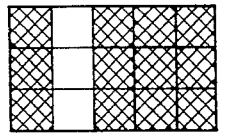 | 80% |
| SECOND FRAME | 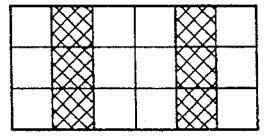 | 33.3% | 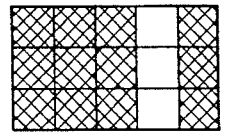 | 80% |
| THIRD FRAME | 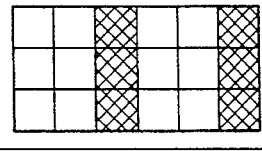 | 33.3% | 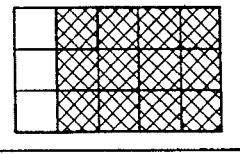 | 80% |
| FOURTH FRAME | | | 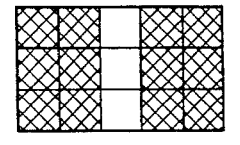 | 80% |
| FIFTH FRAME | | | 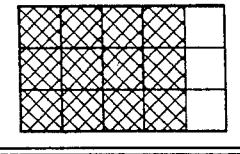 | 80% |
| AVERAGE | 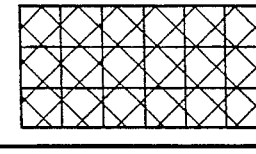 | 33.3% | 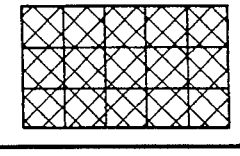 | 80% |

F I G. 25
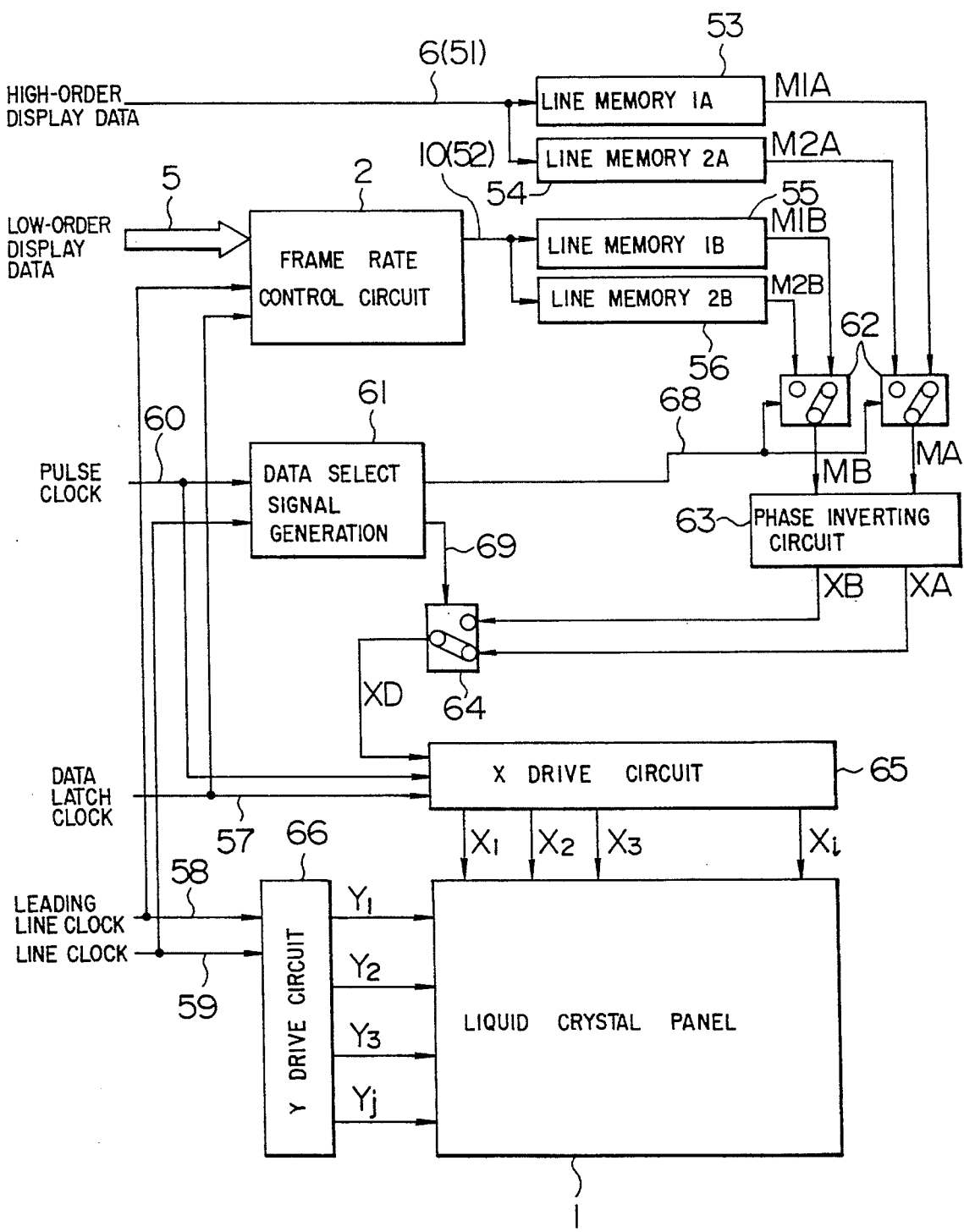

FIG. 26

|   | X | X | X | X | X | X |
|---|---|---|---|---|---|---|
| $Y_1$ | $a_1$ | $a_2$ | $a_3$ | $a_4$ | $a_5$ | $a_6$ |
| $Y_2$ | $b_1$ | $b_2$ | $b_3$ | $b_4$ | $b_5$ | $b_6$ |
| $Y_3$ | $c_1$ | $c_2$ | $c_3$ | $c_4$ | $c_5$ | $c_6$ |
| $Y_4$ | $d_1$ | $d_2$ | $d_3$ | $d_4$ | $d_5$ | $d_6$ |
| $Y_5$ | $e_1$ | $e_2$ | $e_3$ | $e_4$ | $e_5$ | $e_6$ |
| $Y_6$ | $f_1$ | $f_2$ | $f_3$ | $f_4$ | $f_5$ | $f_6$ |

FIG. 40

(EACH NUMERAL DENOTES PULSE NO.)

|  | ODD FRAME | | EVEN FRAME | |
|---|---|---|---|---|
|  | $8n+1$ DOTS<br>$8n+3$ DOTS<br>$8n+6$ DOTS<br>$8n+8$ DOTS | $8n+2$ DOTS<br>$8n+4$ DOTS<br>$8n+5$ DOTS<br>$8n+7$ DOTS | $8n+1$ DOTS<br>$8n+3$ DOTS<br>$8n+6$ DOTS<br>$8n+8$ DOTS | $8n+2$ DOTS<br>$8n+4$ DOTS<br>$8n+5$ DOTS<br>$8n+7$ DOTS |
| ODD LINE | — | ○ | ○ | — |
| EVEN LINE | ○ | — | — | ○ | it

LIQUID CRYSTAL DISPLAY METHOD AND APPARATUS CAPABLE OF MAKING MULTI-LEVEL TONE DISPLAY

This application is a continuation of application Ser. No. 07/592,251, filed Oct. 3, 1990 now abandoned.

CROSS-REFERENCE TO RELATED APPLICATIONS

This application relates to U.S. Pat. No. 4,808,991 issued Feb. 28, 1989 assigned to Hitachi Limited, and is a continuation-in-part application of copending applications U.S. Ser. No. 395,595 filed Aug. 18, 1989 entitled "Half Tone Display Driving Circuit For Crystal Matrix Panel And Half Tone Display Method Therefor" assigned to one of the present assignees, and now U.S. Pat. No. 5,038,139 and U.S. Ser. No. 472,306 filed Jan. 30, 1990 entitled "Method And Apparatus For Multi-level Tone Display For Liquid Crystal Apparatus" by Inuzuka et al assigned to the present assignees, the contents of which are incorporated herein by reference.

This application also relates to U.S. Pat. No. 3,995,942 (JP-A-50-127514) and JP-A-50-156396 both owned by Hitachi Limited.

BACKGROUND OF THE INVENTION

The present invention relates to a liquid crystal display, and in particular to a liquid crystal display method and apparatus capable of making a multi-level tone display.

Multi-level tone display methods for conventional liquid crystal display apparatuses will now be described. The first one of such methods is a frame rate control method as described in the above-referenced U.S. Pat. No. 4,808,991 or the application note for HD 66840 LVIC produced by Hitachi, Ltd. The second one of such method is the pulse width modulation method as described in JP-A-59-149393.

The frame rate control method, which is the first method, comprises allotting m frames to one period for liquid crystal display of one dot, and controlling voltage applied in m frames by applying on-voltage to cause activated display in n frames included in the m frames and applying off-voltage to cause inactivated display in m–n remaining frames, multi-level tone display being accomplished visually. The value n/m is referred to as frame rate control ratio. When this value is 0, i.e., display is inactivated in all frames, display luminance level becomes 0%. When the frame rate control ratio is 1, i.e., display is activated in all frames, the display luminance level becomes 100%.

The frame rate control method will now be described by referring to FIGS. 2A–2C, 3A–3C, 4 and 5. FIGS. 2A and 2B are block diagrams of liquid crystal display systems which perform 8-level tone display by using 3-bit display data. FIG. 2C is a waveform diagram showing display pulses applied to the liquid crystal display. FIG. 3A is a block diagram of a frame rate control circuit. FIG. 4 shows display data and frame rate control ratios. FIG. 3B shows display data and frame rate control ratios. FIG. 3C shows how frame rate control is performed for respective frames.

With reference to FIG. 2A, 3-bit display data 5 is converted to frame rate control data FD 10 by a frame rate control circuit 2 shown in FIG. 3A, in response to the output signal of one of frame rate control circuits a125 to h132 selected by a selection circuit 141. In response to the FD 115, either of liquid crystal display puslses $P_{off}$ 7 and $P_{on}$ 9 outputted from multi-level tone pulse generation means 13 is selected in a display pulse selection circuit 12 and outputted to a liquid crystal panel 1 as a selected display pulse P11. A liquid crystal display pulse or a pulse which remains at off-level during one horizontal interval as shown in FIG. 2C is used as the $P_{off}$ 7, whereas a pulse which remains at on-level during one horizontal interval is used as the $P_{on}$ 9. See, for example, U.S. Pat. No. 3,995,942 or JP-A-50-156396 referenced above.

The frame rate control circuit 2 shown in FIG. 3A includes eight kinds of control circuits 125 to 132. One of frame rate control data outputted therefrom is selected in the selection circuit 141 in accordance with the 3-bit display data 5 and outputted as FD 115. An example of the frame rate control circuits 125 to 132 will now be described by referring to FIGS. 3B and 3C.

FIG. 3B shows display data and frame rate control ratios in HD66840 LVIC produced by Hitachi, Ltd. That is to say, the frame rate control ratio is 0 when the 3-bit display data 5 is (0, 0, 0). When the 3-bit display data is (0, 0, 1), the frame rate control ratio is 1/5. Finally, the frame rate control ratio becomes 1 when the 3-bit display data is (1, 1, 1). These eight ratios ranging from 0 to 1 are assigned to control circuits a125 to h132, respectively. The display state of the liquid crystal panel 1 obtained when (0, 1, 0) or (1, 0, 1) is supplied to this frame rate control circuit 2 as the 3-bit display data 5 is shown in FIG. 3C. When the 3-bit display data 5 is (0, 1, 0), the selected frame control rate is 1/3. That is to say, three frames are chosen as one period and only one of the three frames becomes the on-state whereas two remaining frames become the off-state. In the frame rate control circuit 2, the control circuit C127 is selected and its output is sent out as FD 115. In the display pulse selection circuit 12, the $P_{off}$ 7 or $P_{on}$ 9 is selected by the FD 10. In the first frame of the three frames forming one period, the $P_{on}$ 9 is selected and display of luminance level 100% is performed. In the second and third levels, the $P_{off}$ 7 is selected and display of luminance level 0% is performed. An average of the three frames is just equivalent to display of luminance level 33.3%. When the 3-bit display data 5 is (1, 0, 1), a frame rate control ratio of 4/5 is selected in the same way. Five frames are thus chosen as one period, and the $P_{on}$ 9 is supplied to four frames out of the five frames whereas the $P_{off}$ 7 is supplied to one remaining frame. An average of these five frames becomes just equivalent to display of luminance level 80%.

The above described example of the prior art will now be described from a different viewpoint by referring to FIGS. 2B and 3A as well as FIG. 4 which shows an example of frame rate control data.

With reference to FIG. 2B, 3-bit display data 114 is converted to frame rate control data FD 115 by a frame rate control circuit 104 shown in FIG. 3A. In accordance with this FD 115, a liquid crystal display pulse $P_{off}$ (i.e., a pulse which is at the off-level during one horizontal interval) or $P_{on}$ (i.e., a pulse which is at the on-level during one horizontal interval) is outputted from an X drive circuit 102 to a liquid crystal panel 101. See, for example, U.S. Pat. No. 4,808,991.

The frame rate control circuit 104 shown in FIG. 3A has eight kinds of control circuits 125 to 132. One of frame rate control data 133 to 140 outputted from those control circuits is selected in a selection circuit 141 in accordance with the 3-bit display data 114 and outputted as the FD 115. Each of the control circuits 125 to 132 generates frame rate control data complying with the frame rate control ratio by using a leading line clock 116, a line clock 117 and a data latch clock 119. In a scheme used in the above described HD66840 LVIC, all dots forming the liquid crystal panel are not subject to frame rate control at the same timing, but n lines are removed out of in lateral lines forming one unit in order to prevent flicker on the screen of the liquid crystal panel 101. Frame rate controlled data are thus generated by using the leading line clock 116 and the line clock 117.

FIG. 4 shows frame rate control data of the HD66840 LVIC produced by Hitachi, Ltd. under the condition that the frame rate control ratio is 4/5. In shaded regions, display is in the on-state. When the frame rate control ratio is 4/5, multi-level tone display is accomplished by defining five lateral lines as one unit, introducing four lateral lines among five lateral lines in the display on state, and moving activated display lines and inactivated display lines every frame.

The pulse width modulation method which is the above described second method will now be described by referring to FIGS. 5, 6A and 6B.

FIG. 5 shows an example of configuration of a liquid crystal display apparatus which accomplishes three-level tone display by using the pulse width of the voltage pulse applied to the liquid crystal apparatus in one horizontal interval. Either of two kinds of data 122 and 123 of display information XA and XB for displaying one dot of the liquid crystal apparatus in one horizontal internal is selected in a data selector 112 by a data select signal 121. A selected data 124 is supplied to an X drive circuit 102 as data XD of one kind. The X drive circuit 102 takes in the data XD supplied from the data selector 112 in response to a data latch clock 119. This taking-in operation is repeated until display data corresponding to one line have been taken in. Thereafter, the X drive circuit 102 outputs liquid crystal application pulses onto signal lines X1, X2, —, Xi in response to a pulse clock 118. The pulse clock 118 is obtained by uniformly dividing pulses of the line clock 117 every horizontal interval into two. A Y drive circuit 103 takes in a leading line clock 116 in response to the line clock 117 to produce a "high" state on a line Y1, and in response to successive pulses of the line clock 117, it shifts the "high" state successively to Y2, —, Yj. A liquid crystal panel 101 is an i-row by j-column matrix panel. Liquid crystal application pulses X1, X2, —, Xi outputted from the X drive circuit 102 are applied to liquid crystal cells connected to "high" state lines among output lines Y1, —, Yj of the Y drive circuit 103, display being thus effected.

FIG. 6A shows liquid crystal application pulses outputted from the X drive circuit 102. In one horizontal interval, either of two kinds of display data XA and XB is transmitted from the data selector 112 to the X drive circuit 102 as display data XD every half of the horizontal interval. In response to the data XD, one out of four kinds of pulses, i.e., pulse 1 to pulse 4, is selected and outputted from the X drive circuit 102.

FIG. 6B shows correspondence between the display data XD and the drive pulse outputted from the X drive circuit 102.

When display data are represented as (XA, XB)=(0, 0), the X drive circuit 102 outputs pulse 1 as a liquid crystal application pulse and a display dot is inactivated as shown in FIG. 6B. When (XA, XB)=(1, 1), the liquid crystal application pulse becomes pulse 4 and a display dot is activated. When (XA, XB)=(0, 1), or (1, 0), the liquid crystal application pulse becomes pulse 3 or pulse 2, respectively, producing a half tone display between active and inactive dots in both cases. The luminance (transmission factor) of the liquid crystal is dependent on the effective value of the voltage applied to it. Since the pulse clock 118 is obtained by equally splitting or dividing the line clock 117, the pulse 2 and the pulse 3 have an equal "H" period and thus an equal effective value. Consequently, the pulse 2 and pulse 3 provide an equal luminance of liquid crystal, which is an intermediate luminance between an active dot and inactive dot, resulting in the accomplishment of three-level tone display.

In the liquid crystal display apparatus shown in FIG. 5, therefore, tone display can be accomplished by varying the effective value of the voltage applied to the liquid crystal panel 101 through the combination of display data XA and XB.

If the period of frame rate control, i.e., the value of m is increased in the above described frame rate control method of the prior art, timing of frame rate control is visually recognized. That is to say, flicker or display float is incurred, resulting in degraded quality of tone display. Therefore, the number of practical tone levels is limited to about ten. Multi-level tone display such as 16-level tone display or 32-level tone display cannot be accomplished without degrading the display quality.

On the other hand, the pulse width modulation method of the prior art has a problem that in case the display area of half tone display is large in the X direction (i.e., in the lateral direction of the screen) noise is created by rising edges or falling edges of pulses which make simultaneous transition in one horizontal interval, resulting in degraded luminance of display.

In case the display area of half tone display is large in the Y direction (i.e., in the longitudinal direction of the screen), the frequency component of the liquid crystal application pulse is raised, resulting in problems of lowered luminance of display and increased crosstalk. JP-A-2-1812 laid open Jan. 8, 1990 discloses a related art, but is not prior art.

SUMMARY OF THE INVENTION

An object of the present invention is to provide a liquid crystal display method and apparatus enabling multi-level tone display without degrading the display quality.

Another object of the present invention is to provide a liquid crystal display method and apparatus using voltage pulses having a pulse width obtained by dividing one horizontal interval into two, having display luminance which is not lowered even if the display area of half tone display is expanded into the X direction and Y direction, and enabling multi-level tone display without lowering the display quality.

In accordance with one feature of the present invention for achieving the above described object, $P_g$ having a half level between $P_{off}$ and $P_{on}$ is provided in addition to $P_{off}$ and $P_{on}$ for display pulses generated by multi-level tone pulse generation means, and one display pulse is selected out of these three display pulses and outputted to the liquid crystal panel by the frame rate control data and a second selection signal different from the FD. As a result, multi-level tone display having twice as many levels as that accomplished by the conventional frame rate control method can be realized.

Display pulses outputted from the multi-level tone pulse generation means include $P_{off}$ corresponding to a luminance level of 0%, $P_{on}$ corresponding to a luminance level of 100% and $P_g$ corresponding to a luminance level of 50%. One of these three display pulses is selected by frame rate control data FD (which is a first selection signal) and a second selection signal which is different from the FD and outputted to the liquid crystal panel. Either combination ($P_{off}$, $P_g$) or combination ($P_g$, $P_{on}$) is selected by the second selection signal. Out of the combination thus selected, either of the display pulses is selected by the FD which is the first selection signal.

When this selection method is used and the combination ($P_{off}$, $P_g$), for example, is selected by the second selection signal, a display pulse of $P_{off}$ or $P_g$ is outputted onto the liquid crystal panel by the first selection signal FD. Therefore, the luminance level displayed on the liquid crystal panel can be controlled in the range of 0% to 50%. When the combination ($P_g$, $P_{on}$) is selected by the second selection signal, the luminance level can be controlled in the range of 50% to 100% in the same way. As heretofore described, the luminance level can be finely controlled in the range of 0% to 100%, multi-level tone display being enabled.

In accordance with another feature of multi-level tone display method according to the present invention, the multi-level tone display method of a matrix display panel for displaying one-line data taken in by an X drive circuit on horizontal lines successively indicated by a Y drive circuit uses frame rate control for controlling activation of display dots while taking a frame as the unit together with pulse width modulation for controlling the width of a pulse applied to each X drive line during one horizontal interval, and the above described frame rate control is exercised every frame in a slant dot pattern form, which is displaced each time the frame is changed.

Preferably in this method, display data corresponding to first and second pulses applied to each X drive line in one horizontal period are so interchanged as to decrease the number of transitions of pulses applied to the above described each X drive line.

Alternatively, display data corresponding to first and second pulses successively applied to each X drive line in one horizontal period are so interchanged that the number of transitions in the positive direction of pulses applied to all of the X drive lines may become nearly equivalent to the number of transitions in the negative direction of those pulses.

Further, in accordance with the present invention, a liquid crystal display apparatus including an X drive circuit for taking in display data of one line and outputting the data onto the liquid crystal panel and a Y drive circuit for successively indicating horizontal lines whereon data outputted from the X drive circuit should be displayed comprises frame rate control means for generating frame rate control data activating or inactivating display dots while taking a frame as the unit in accordance with the low-order data portion of display data forming one dot, a first line memory for storing the high-order data portion of the above described display data forming one dot by an amount equivalent to one line, a second line memory for storing frame rate control data outputted from the frame rate control means by an amount equivalent to one line, means for successively supplying the high-order data having an amount equivalent to one line stored in the first line memory and the frame rate control data stored in the second line memory to the X drive circuit during one horizontal interval, and means for interchanging the frame rate control data corresponding to the dot and the above described high-order data in accordance with the position of the dot in the frame before they are supplied to the X drive circuit at the latest.

In this apparatus, the frame rate control means exercises the frame rate control by taking 2N lines in the Y direction and m dots in the Y direction (where N and m are integers) as one unit, for example.

In accordance with the above described feature, the frame rate control method and the pulse width modulation method are used jointly for multi-level tone display, and measures against degradation in display luminance are taken. As for the frame rate control method, the frame rate control data is generated in accordance with low-order data included in display data having a plurality of bits for one dot.

Further, pulse width modulation control is effected on the basis of the frame rate control data and high-order data included in the above-described two kinds of display data. As for this control, a phase inverting circuit for modulating the phase of the liquid crystal application voltage pulse for implementing half tone display with respect to adjacent dots in the X direction is provided, and the phase of the liquid crystal application voltage pulse is thus modulated. In order to supply display data to the X drive circuit twice during one horizontal internal, read operation must be carried out at a speed which is twice that of the write operation. For that reason, the first and second line memories are provided. Preferably, each of the first and second line memories is duplicated in order to execute the write operation and the read operation at the same time.

The phase inverting circuit rearranges 2-bit data supplied thereto for one dot display with respect to adjacent dots in the X direction and the Y direction and supplies liquid crystal application pulses corresponding to 2-bit display data thus rearranged to the liquid crystal panel via the X drive circuit. By the rearrangement of data, the phase of the liquid crystal application pulse is inverted, and the noise caused by the rising edge offsets or cancels the noise caused by the falling edge. The so-called offsetting or cancelling effect prevents the display luminance from being degraded by expansion in area of half tone display.

The frame rate control circuit performs frame rate control in a slant dot pattern form. For example, longitudinal line rate control is effected by taking 2N lateral lines and m longitudinal dots as one unit (where N is an integer and m is a frame rate control period). As a result, the canceling effect owing to phase inversion can be effectively used.

BRIEF DESCRIPTION OF THE DRAWINGS

FIG. 1 is a configuration diagram of a 16-level tone display system which is an embodiment of the present invention;

FIGS. 3A, 3B and 3C are diagrams for explaining a frame rate control circuit 2 shown in FIG. 2A;

FIG. 4 is a diagram for explaining a frame rate control circuit shown in FIG. 2B;

FIG. 8 is a diagram showing the result of selection made by the selection circuit 4 of FIG. 1;

FIG. 9 is a diagram showing results of display according to the present invention;

FIG. 14 is a diagram showing average luminance levels in the system of FIG. 11;

FIGS. 16 and 17 are diagrams for explaining data rearrangement performed in a phase inverting circuit 63;

FIGS. 23 and 24 are diagrams for explaining more detailed implementation examples of FIGS. 3A and 6A, respectively;

FIG. 25 is a block diagram of an embodiment obtained by combining the circuits of FIGS. 23 and 15;

FIG. 26 is a diagram showing an example of display obtained when a matrix liquid crystal model comprising 6 dots by 6 dots is used;

FIGS. 36 to 41 are diagrams for explaining a frame rate control method used in an embodiment of the present invention assuming that two lines in the Y direction and m dots in the X direction are taken as one unit;

FIGS. 46 to 50 are diagrams for explaining another aspect of the present invention regarding a phase inverting circuit.

DESCRIPTION OF THE PREFERRED EMBODIMENTS

Figure 2A:
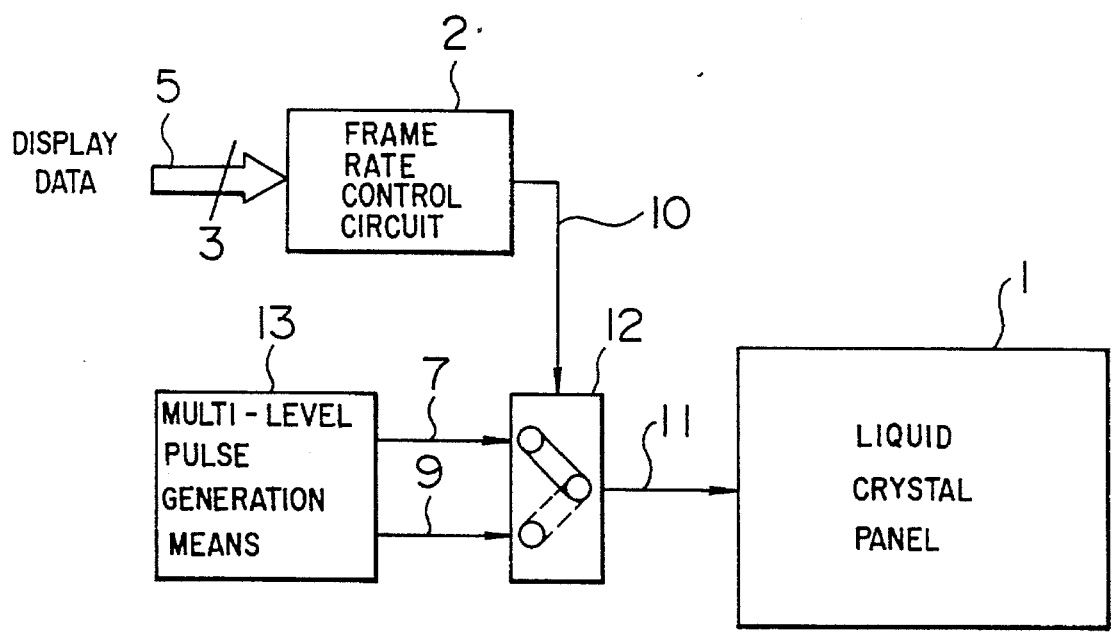
FIGS. 2A and 2B are configuration diagrams of an 8-level tone display system of the prior art.
Figure 2C:
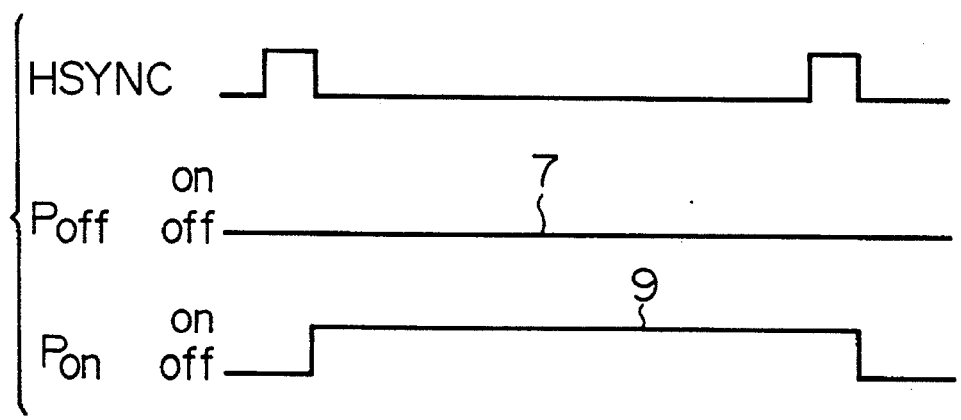
FIG. 2C shows multi-level tone pulses generated by multi-level tone pulse generation means 13 illustrated in FIG. 2A.
Figure 2B:
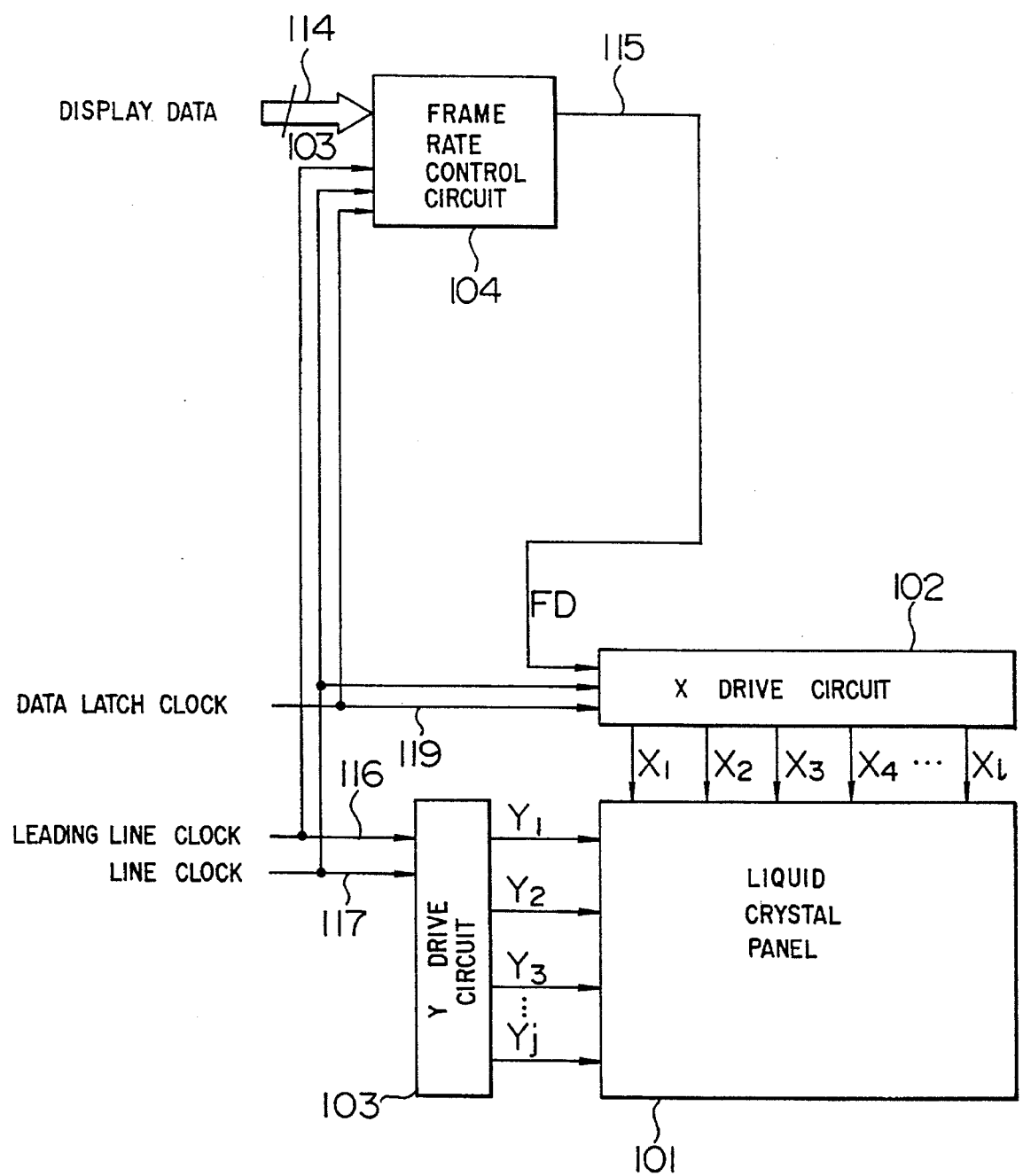

An embodiment of the present invention will hereafter be described by referring to FIG. 1.

With reference to FIG. 1, numerals 6 and 5 respectively denote one high-order bit and three low-order bits of display data to be displayed with multi-level tone. Numeral 2 denotes a frame rate control circuit, 10 frame rate control data FD outputted from the circuit 2, and 3 multi-level tone pulse generation means. Numerals 7, 8 and 9 denote multi-level tone display pulses outputted from the means 3. Numeral 4 denotes a display pulse selection circuit for selecting one multi-level tone display pulse out of multi-level tone display pulses 7, 8 and 9 in accordance with the high-order display data 6 and the FD 10. Numeral 11 denotes a liquid crystal display pulse outputted from the circuit 4. Numeral 1 denotes a liquid crystal panel.

Figure 7:
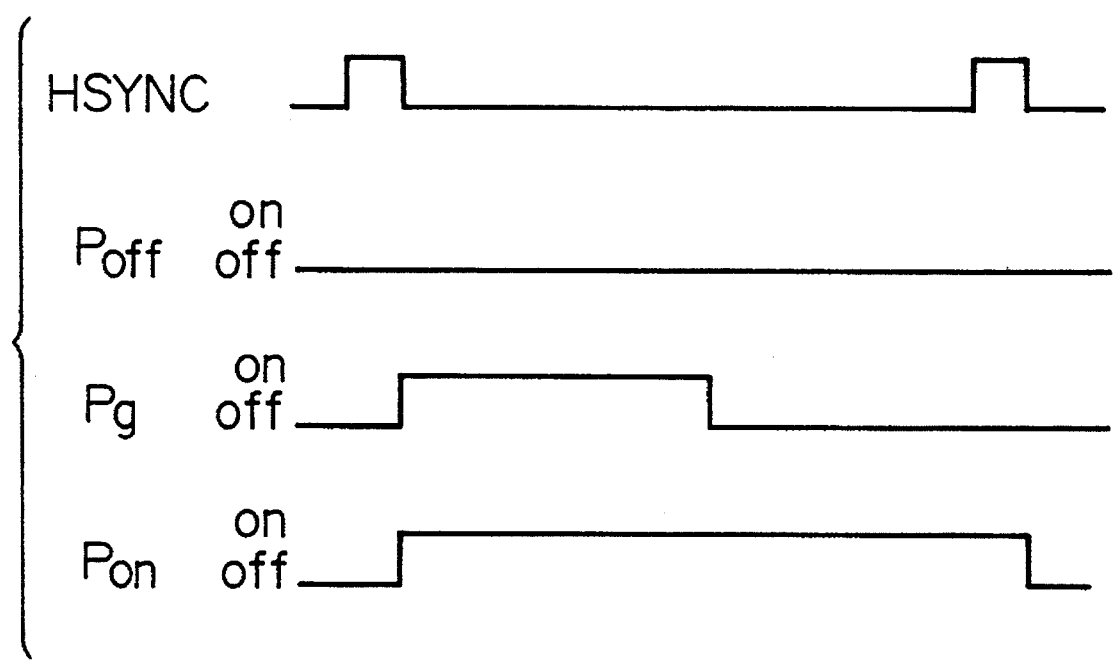
FIG. 7 shows multi-level tone pulses generated by multi-level tone pulse generation means 3 illustrated in FIG. 1.

The multi-level tone pulse generation means 3 outputs $P_{off}$ 7 representing a luminance level of 0%, $P_g$ 8 representing a luminance level of 50%, and $P_{on}$ 9 representing a luminance level of 100% as shown in FIG. 7. Out of these three multi-level tone pulses, one pulse is selected by the display pulse selection circuit 4 and outputted to the liquid crystal panel 1.

The frame rate control circuit 2 may be the same as that of the prior art. The frame rate control circuit 2 outputs frame rate control data FD 10 in accordance with the 3-bit display data 5 (which has three low-order bits belonging to 4-bit display data in the present embodiment).

The frame rate control circuit 2 will now be described again by referring to FIGS. 3A and 3B.

FIG. 3A is a block diagram showing the configuration of the frame rate control circuit 2. The frame rate control circuit 2 comprises eight control circuits 125(a) to 132(h) and a selection circuit 141 for selecting data out of frame control data 133 to 140 respectively outputted from the control circuits 125(a) to 132(h) in accordance with 3-bit display data.

Specific frame rate control ratios are assigned beforehand to control circuits 125(a) to 132(h), respectively. For example, 0, 1/5, 1/3 and so on are assigned to control circuits in order beginning with the frame rate control circuit 125(a) as shown in FIG. 3B. It is now assumed that one period has m frames. In accordance with an assigned frame rate control ratio n/m, each control circuit outputs "1" for n frames and outputs "0" for m-n remaining frames.

In the selection circuit 141, data is selected as the frame rate control data FD 115 out of control data 133 to 140 outputted from eight control circuits in accordance with 3-bit display data 5 as shown in FIG. 3B. When the 3-bit display data is represented as (0, 0, 0), output 133 of the control circuit 125(a) is selected. When the 3-bit display data is represented as (0, 0, 1), output 134 of the control circuit 126(b) is selected.

The display pulse selection circuit 4 is provided to select one pulse out of multi-level tone display pulses $P_{off}$ 7, $P_g$ 8 and $P_{on}$ 9 outputted from the multi-level tone pulse generation means 3 in accordance with the high-order display data 6 and the frame rate control data FD 10. Results of selection thereof are shown in FIG. 8. Three multi-level tone display pulses are divided into two combinations. One of the two combinations is selected by the high-order display data 6. That is to say, combination ($P_{off}$, $P_g$) and ($P_g$, $P_{on}$) are provided When the high-order display data 6 is "0" the combination ($P_{off}$, $P_g$) is selected. When the high-order display data 6 is "1", the combination ($P_g$, $P_{on}$) is selected. Out of the selected combination, one pulse is selected in accordance with the frame rate control data FD 10. In case the combination ($P_{off}$, $P_g$) has already been selected, $P_{off}$ is selected when the FD 10 is "0", whereas $P_g$ is selected when the FD 10 is "1". The same holds true in case the combination ($P_g$, $P_{on}$) has already been selected.

Details of function of each block have heretofore been described. An example of display on an actual liquid crystal panel will now be described by referring to FIG. 9. FIG. 9 shows an example of display obtained when the 3-bit low-order data 5 is represented as (1, 0, 1). The frame rate control data FD 10 selected in accordance with this 3-bit display data 5 is the output 138 of the control circuit 130(*e*). The frame rate control ratio is then 4/5. That is to say, the FD 10 becomes "1" in four frames among five frames and the FD 10 becomes "0" in one remaining frame. With reference to FIG. 9, therefore, the FD 10 becomes "0" in the third frame among the first to fifth frames and the FD 10 becomes "1" in four remaining frames.

In case the high-order display data 6 is "0", $P_{off}$ is applied to the liquid crystal to make a display with a luminance level of 0% in frames with the FD 10 being equivalent to "0", whereas P is applied to the liquid crystal to make a display with a luminance level of 50% in frames with the FD 10 being equivalent to "1". In four frames among five frames, a display is thus made with a luminance level of 50%. In one remaining frame, a display is made with a luminance level of 0%. An average of five frames becomes equivalent to display of luminance level 40%.

In case the high-order display data 6 is "1" as well, $P_g$ is applied to the liquid crystal to make a display with a luminance level of 50% in frames with the FD 10 being equivalent to "0", whereas $P_{on}$ is applied to the liquid crystal to make a display with a luminance level of 100% in frames with the FD 10 being equivalent to "1". In four frames among five frames, a display is thus made with a luminance level of 100%. In one remaining frame, a display is made with the luminance level of 50%. An average of five frames becomes equivalent to a display of luminance level 90%. The description with respect to FIGS. 8 and 9 is also referred to in the above-referenced application Ser. No. 472,306.

Figure 10:
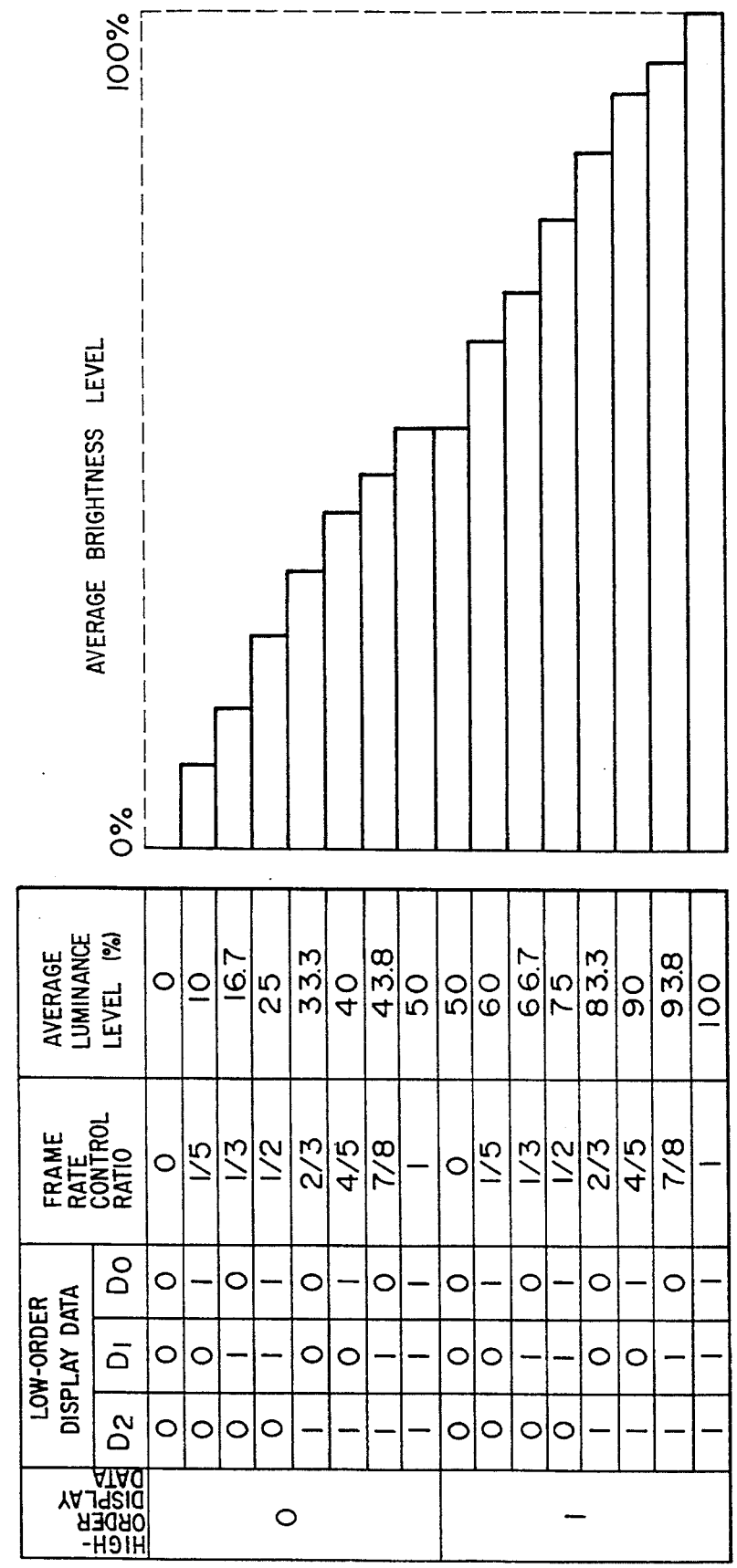
FIG. 10 shows average luminance levels according to the present invention.

When the high-order display data 6 is "0" as shown in FIG. 10, the combination ($P_{off}$, $P_g$) is similarly selected. On the basis of frame rate control data FD 10 selected out of eight kinds in accordance with the low-order 3-bit display data 5, $P_{off}$ 7 or $P_g$ 8 is outputted to the liquid crystal panel 1 as the liquid crystal display pulse 11.

When the high-order display data 6 is "0", therefore, the average luminance level can be so controlled as to be one of eight steps between 0% and 50%, eight-level tone display being thus realized.

When the high-order display data 6 is "1" as well, the average luminance level can be similarly controlled so as to be one of eight steps between 50% and 100%, eight-level tone display being thus realized.

In the liquid crystal panel 1, therefore, it is possible to make displays of 16 levels in total in accordance with the 4-bit display data (comprising the high-order data 6 and the low-order 3-bit data 5).

An example of concrete use can be shown by referring to FIG. 10. If CRT color display data I, R, G and B (i.e., luminance information, red information, green information and blue information, respectively) are respectively assigned to D3, D2, D1 and D0, it becomes possible to make displays of 16 levels respectively corresponding to displays of 16 colors made in conventional CRTs in one-to-one correspondence.

An embodiment for making ($2^{1+3}=$) 16-level tone display by using 4-bit display data has heretofore been described. However, a method of making $2^N$-level tone display by using N-bit display data is also conceivable in the same way.

Figure 11:
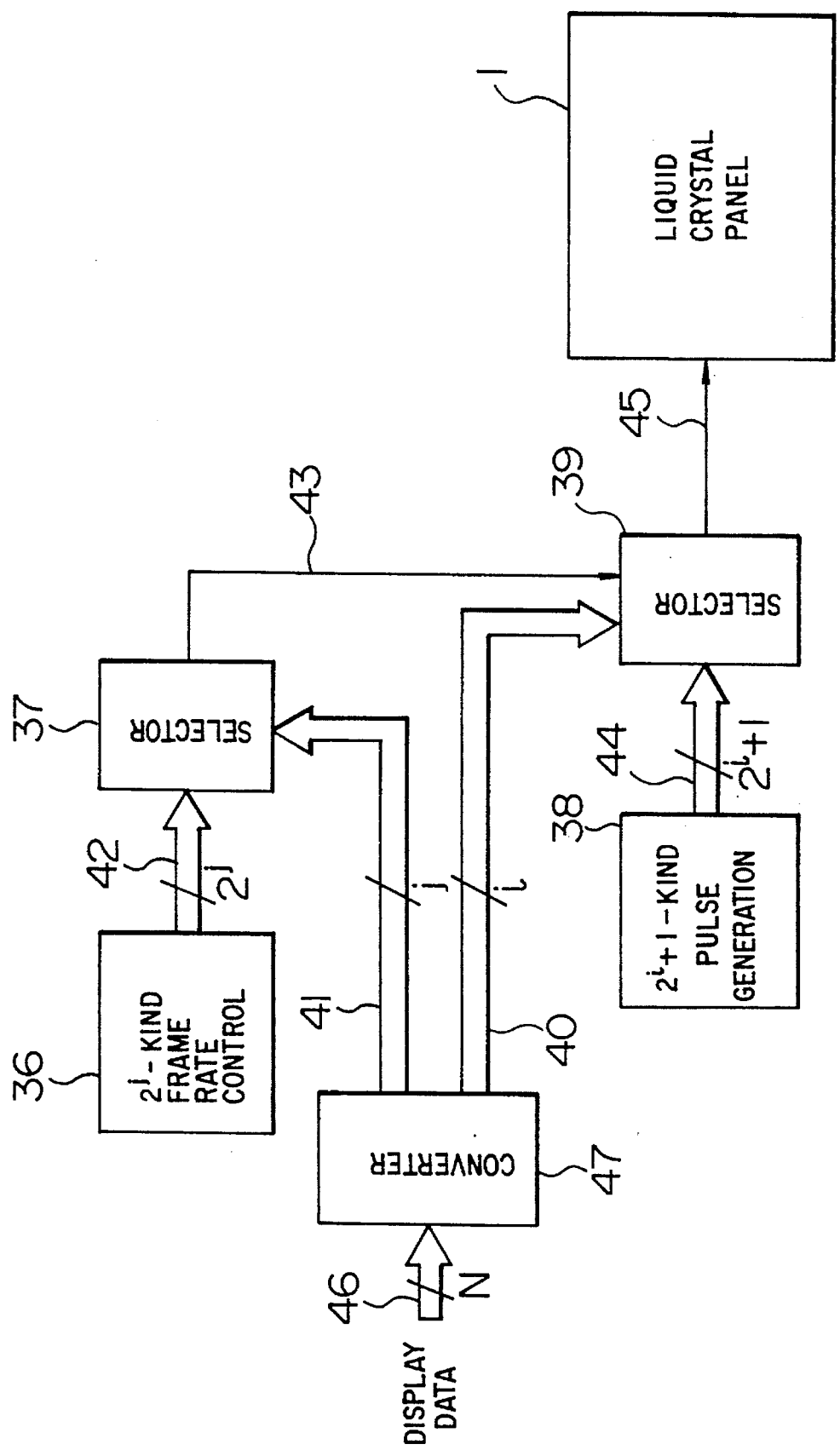
FIG. 11 is a configuration diagram of a $2^N$-level tone display system which is another embodiment of the present invention.

FIG. 11 is a configuration diagram of a system using this method. N-bit display data 46 is converted into i-bit display data 40 and j-bit display data 41 in a data conversion section 47 such as a decode circuit. A frame rate control circuit 36 comprises $2^j$ kinds of control circuits. In a selection section 37, data is selected out of $2^j$ kinds of control data outputted from control circuits in accordance with j-bit display data 41 and outputted as frame rate control data FD 43.

Figures 12, 13:
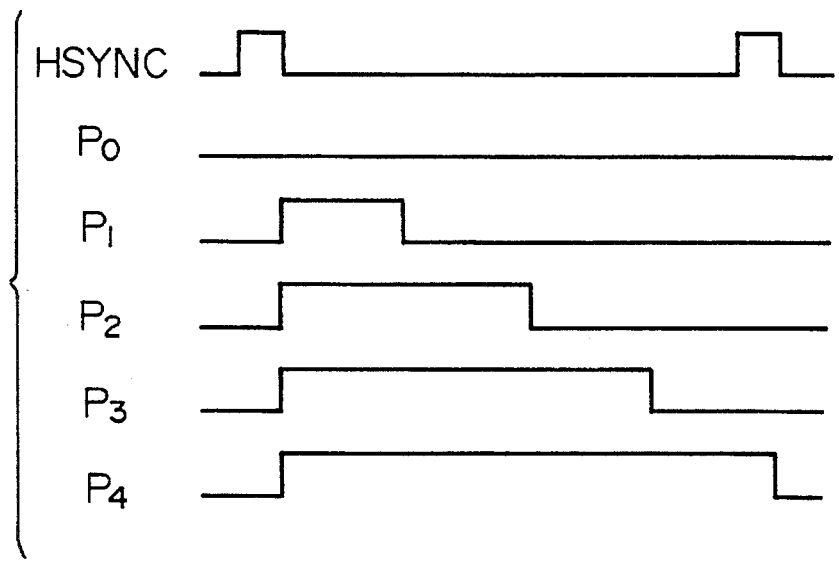
FIG. 12 is a waveform diagram showing multi-level tone pulses generated by a pulse generation circuit 38 illustrated in FIG. 11.
FIG. 13 is a diagram showing results of selection made by a selection section 39 illustrated in FIG. 11.

On the other hand, a pulse generation circuit 38 generates multi-level tone pulses of $2^i+1$ kinds. FIG. 12 exemplifies multi-level tone pulses generated by the pulse generation circuit 38 when i=2. $P_{off}$ with a luminance level of 0% is defined as $P_0$ and $P_{on}$ with a luminance level of 100% is defined as $P_4$. The space between $P_0$ and $P_4$ are evenly divided into four. A multi-level tone pulse with a luminance level of 25% is defined as $P_1$, and a multi-level tone pulse with a luminance level of 50% is defined as $P_2$. A multi-level tone pulse with a luminance level of 75% is defined as $P_3$. Multi-level tone pulses of ($2^2+1=$) 5 kinds in total are thus obtained.

In a selection section 39, one multi-level tone pulse is selected out of multi-level tone pulses of five kinds in accordance with the i-bit display data 40 (where i=2 in this case) and the frame rate control data FD 43, and it is outputted to a liquid crystal panel 1 as the multi-level tone pulse 45. In the selection section 39, multi-level tone pulses of two kinds are selected in combination out of multi-level tone pulses of five kinds in accordance with the 2-bit display data 40. When the 2-bit display data 40 is (0, 0), a combination ($P_0$, $P_1$) of multi-level tone pulses is selected as shown in FIG. 13. When the 2-bit display data 40 is (0, 1), (1, 0) or (1, 1), a combination ($P_1$, $P_2$), ($P_2$, $P_3$) or ($P_3$, $P_4$) is selected, respectively. Further, in accordance with the frame rate control data FD 43, one pulse is selected out of the selected combination and outputted to the liquid crystal panel 1.

When the i-bit display data 40 is (0, 0), for example, the combination ($P_0$, $P_1$) of multi-level tone pulses is selected by the above-described selection operation. Out of this combination, $P_0$ or $P_1$ is selected in accordance with the FD 43. Since the FD 43 is one kind selected out of frame rate control data of $2^j$ kinds, the average luminance level can be so controlled as to be one of $2^j$ steps located between the luminance level 0% of $P_0$ and the luminance level 25% of $P_1$. When the i-bit display data 40 is (0, 1), (1, 0) or (1, 1), the average luminance level can be so controlled as to be one of $2^j$ steps in the same way.

A detailed example of practical use will now be described by referring to FIGS. 11 and 14. In the system of FIG. 11, the data conversion section 47 converts the 4-bit display data 46 into i(=2)-bit data 40 and j(=3)-bit data 41. The $2^j$-kind frame rate control circuit 36 and the selection section 37 have circuit configurations as shown in FIGS. 3A and 3C, respectively. The $2^i+1$-kind pulse generation circuit 38 generates multi-level tone pulses shown in FIG. 12. FIG. 14 shows the average luminance level of the liquid crystal display obtained when the CRT display data I, R, G and B are supplied to the system of FIG. 11 as the input display data 46. As shown in FIG. 14, the data conversion section 47 converts the input display data I, R, G and B into the i-bit data 40 (where i=2) and the j-bit data 41 (where j=3). In the selection section 39, a combination is selected out of combinations of display pulses generated by the $2^i+1$-kind pulse generation circuit 38 in accordance with the i-bit data 40 obtained as a result of conversion. On the other hand, the frame rate control data FD 43 is selected in the selection section 37 in accordance with the j-bit data 41. In accordance with this FD 43, one pulse out of the combination selected by the i-bit data 40 is outputted from the selection section 39.

An example of this circuit operation will now be described. When the input display data (I, R, G, B)=(0, 1, 0, 0), the output of the data conversion section 47 can be represented as $(D_{i1}, D_{i0})$=(0, 1) for the i-bit display data 40 and as $(D_{j2}, d_{j1}, D_{j0})$=(0, 1, 0) for the j-bit display data 41. In response to $(D_{j2}, D_{j1}, D_{j0})$=(0, 1, 0), the frame rate control data FD 43 becomes data having a frame rate control ratio of 1/3. In response to $(D_{i1}, D_{i0})$=(0, 1), the combination of display pulses has $P_1$ corresponding to a luminance level of 25% and $P_2$ corresponding to a luminance level of 50%. Out of this combination $(P_1, P_2)$, $P_1$ or $P_2$ is selected and outputted to the liquid crystal panel 1 in accordance with the frame rate control data FD 43 having a frame rate control ratio of 1/3. Therefore, one period is defined as three frames. In two frames among three frames, $P_1$ with the display luminance level of 25% is selected. In one remaining frame, $P_2$ with the display luminance level of 50% is selected. An average of three frames becomes equivalent to a display of luminance level 33.3%.

If the input data I, R, G and B are converted in the data conversion section 47 as shown in FIG. 14 in the same way, sixteen levels can be displayed on the liquid crystal screen evenly between the average luminance level of 0% and that of 100%.

As heretofore described, it is possible to make a $2^N$-level tone display by using N-bit display data.

Concrete aspects of the present invention will hereafter be described by referring to FIGS. 15 to 34.

Figure 15:
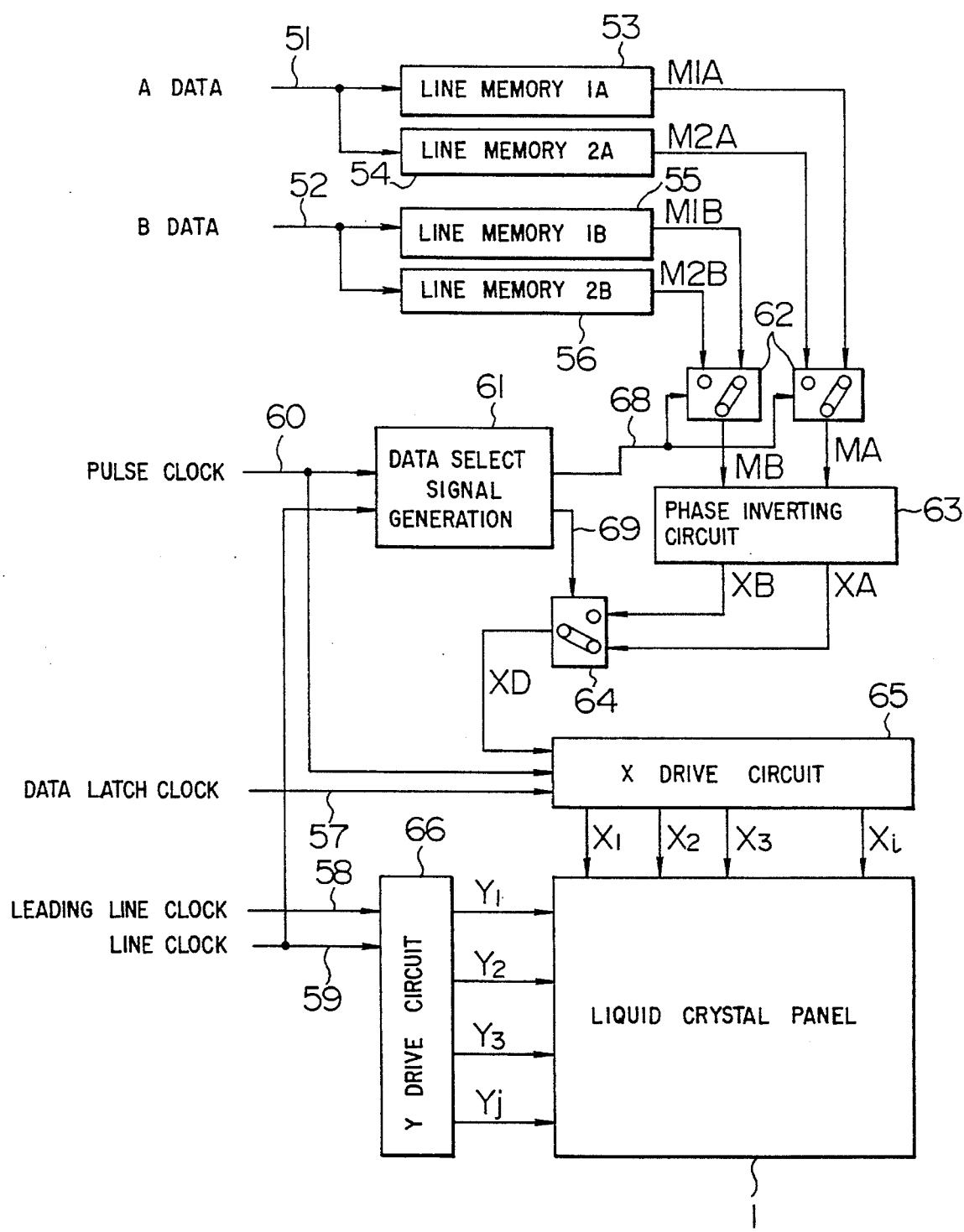
FIG. 15 is a block diagram showing embodiments of a multi-level tone pulse generation means 3, a multi-level tone pulse selection circuit 4 and a liquid crystal panel 1 illustrated in FIG. 1.

FIG. 15 is a block diagram showing embodiments of the multi-level tone pulse generation means 3, the multi-level tone pulse selection circuit 4 and the liquid crystal panel 1 illustrated in FIG. 1 according to the present invention.

In FIG. 15, reference numerals 51 and 52 represent information for displaying one line in the form of high-order data A and low-order data B of color information for displaying one dot. (Data A and B respectively correspond to high-order display data 6 and frame rate control data FD 10 shown in FIG. 1) Line memories 53 and 54 are provided for storing the A data, line memories 55 and 56 are provided for storing the B data for one line. A data select signal generation circuit 61 produces data select signals 68 and 69 from the pulse clock 60 and line clock 59. The data select signal 68 alternates between "high" and "low" in accordance with the line clock 59, and the data select signal 69 alternates between "high" and "low" in accordance with the pulse clock 60 having a frequency twice that of the line clock 59. Data select circuits 62 and 64, a phase inverting circuit 13 which rearranges two kinds of display data, a liquid crystal display panel 1, and X and Y drive circuits 65 and 66 for driving the liquid crystal panel are also provided.

In FIG. 15, data A for one line is introduced to the line memory 53(1A) or line memory 54(2A) alternately for every line, and the data is read out from line memories opposite to those at introduction alternately for every line. The read-out data M1A or M2A is selected as MA by the select circuit 62. The operation for B data 52, line memory 55(1B) and line memory 56(2B) is identical, with data MB being selected by the data select circuit 62.

In the phase inverting circuit 63, the data MA and MB sent from the data select circuit 62 are rearranged in a dot-wise manner in the X direction and in the line-wise manner in the Y direction, and delivered as X drive data XA and XB for the X drive circuit 65. The data rearrangement operation of the phase inverting circuit 63 is described with reference to FIGS. 16 and 17.

FIG. 16 shows the data rearrangement position of the phase inverting circuit 63 wherein a dot indicated by "—" is not accompanied by the rearrangement of input data MA and MB to the phase inverting circuit 63 and the input data are delivered immediately as the x drive data XA and XB. A dot indicated by "0" is accompanied by the rearrangement of input data MA and MB to the phase inverting circuit 63, and the rearranged data are delivered as the X drive data XA and XB. Specifically, for a dot indicated by "—" in FIG. 16, input data (MA, MB)=(0, 0) is reformed to output data (XA, XB)=(0, 0), input data (MA, MB)=(0, 1) is reformed to output data (XA, XB)=(0, 1), input data (MA, MB)=(1, 0) is reformed to output data (XA, XB)=(1, 0), and input data (MA, MB)=(1, 1) is reformed to output data (XA, XB)=(1, 1). For a dot indicated by "0" in FIG. 16, input data (MA, MB)=(0, 0) is reformed to output data (XA, XB)=(0, 0), input data (MA, MB)=(0, 1) is reformed to output data (XA, XB)=(1, 0), input data (MA, MB)=(1, 0) is reformed to output data (XA, XB)=(0, 1), and input data (MA, MB)=(1, 1) is reformed to output data (XA, XB)=(1, 1). As a result, the phase inverting circuit 63 implements the data rearrangement on input data (MA, MB)=(0, 1) or (1, 0) for a display dot marked by "0" to produce data XA and XB. FIG. 17 shows output data (XA, XB) for each dot having input data of (MA, MB)=(0, 1). Among output data XA and XB provided by the phase inverting circuit 63, one of XA and XB is selected by the data selector 14 in accordance with the data select signal 69 which splits one line equally into two parts, and the selected one is delivered as XD.

The X drive circuit 65 introduces display information for one line with high-order data XD(=XA) in response to the data latch clock 57, and produces display information X1–Xi indicated by XD(=XA) at the falling edge of the successive pulse clock 60. While the X drive circuit 65 is delivering display information of high order data XD(=XA), low-order data XD(=XB) for one line is introduced in response to the data latch clock 57, and display information X1–Xi specified by XD(=XB) is delivered at the falling edge of the successive pulse clock. The display information X1–Xi produced by the X drive circuit 65 is applied to the liquid crystal panel on one line, which is the line in a high state according to the output Y1–Yj of the Y drive circuit 66 so that light in proportion to the information is transmitted. The Y drive circuit 66 introduces the leading line clock 58 in response to the line clock 59, making the Y1 high, and it shifts the high state to Y2 ... Yj in response to the following line clocks 59.

The method of half tone display which creates an intermediate luminance between an active dot and inactive dot will be described with reference to FIGS. 18 to 22.

Figure 18:
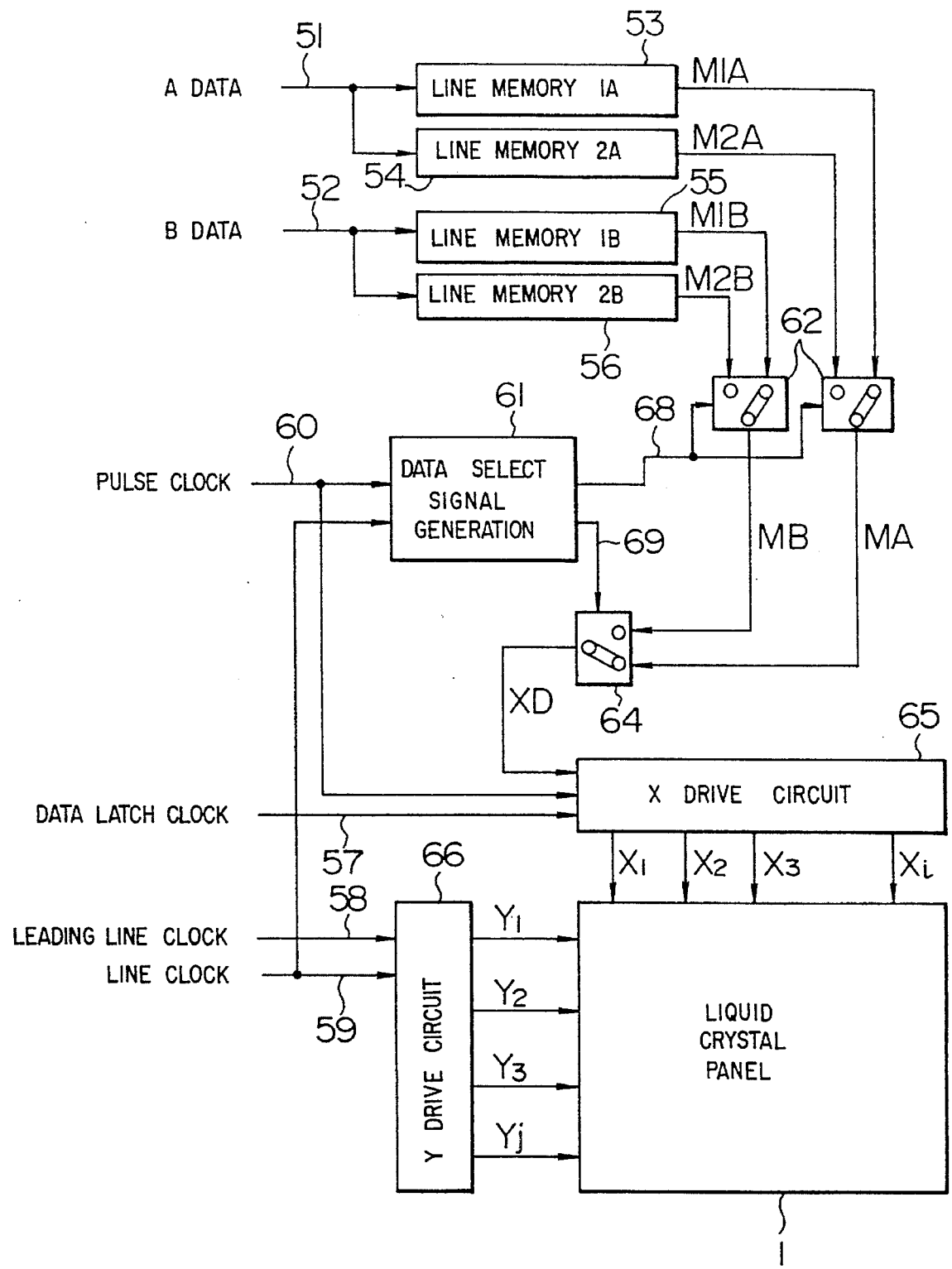
FIG. 18 is a block diagram showing an embodiment for half tone display between active and inactive dots.
Figures 19, 20:
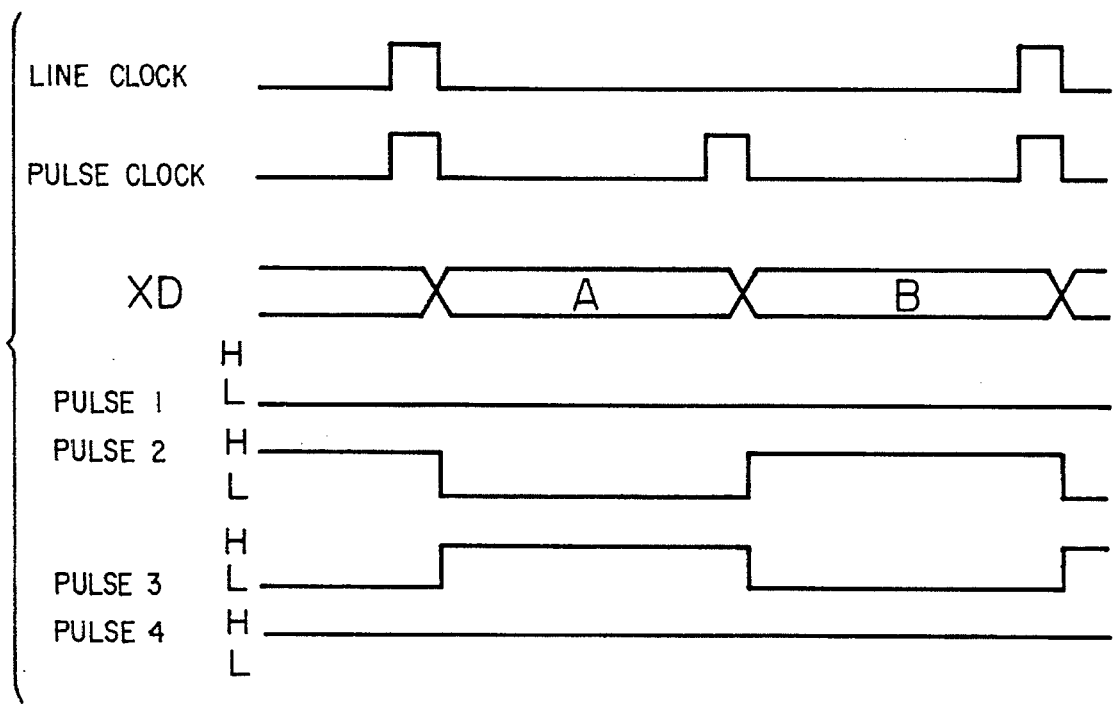
FIGS. 19 and 20 are diagrams showing relationship between X drive data and display information in the embodiment of FIG. 18.

In FIG. 18, display data A and B for one line are simultaneously introduced to the line memory 53(1A) and line memory 55(1B), X drive data MA and MB are read out of the line memories 53(1A) and 55(1B), MA or MB is selected by the data selector 64 and the selected one is sent as XD to the X drive circuit 65, whereby display information X1–Xi is delivered in accordance with the X drive data XD. FIGS. 19 and 20 show the relation between the X drive data and display information. While the line memories 53(1A) and 55(1B) are being read out, display data A and B for the next one line are introduced to the line memories 54(2A) and 56(2B). After the line memories 53(1A) and 55(1B) have been read, the line memories 54(2A) and 56(2B) are read out, and during this period of reading, display data for the next one line is introduced to the line memories 53(1A) and 55(1B). The same operation is repeated. Read-out data for one line is switched by the data selector 62.

Figure 21:
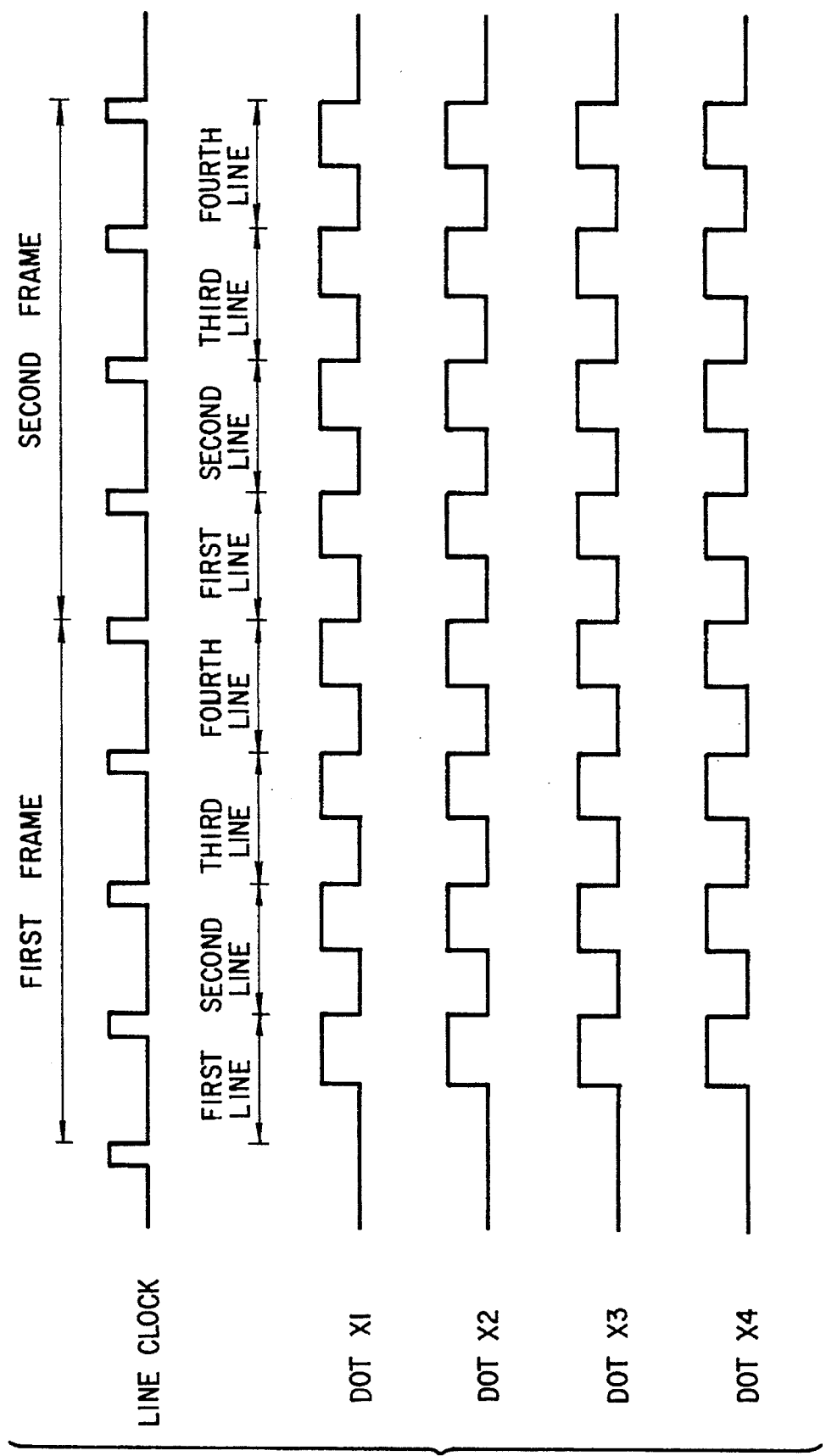
FIGS. 21 and 22 are diagrams showing display pulses outputted from an X drive circuit 65 in the embodiment of FIG. 18.

Next, in the circuit arrangement of FIG. 18, upon receiving display data with (A, B)=(0, 1) for i rows and j columns (i and j are assumed to be 4), the X drive circuit 65 produces display pulses shown in FIG. 21. In the FIG. 21, display pulses for dot X1 to dot X4 rise and fall at the same timing. This results in increased noise caused by the rising display pulse and falling display pulse for displaying one dot, and consequently the luminance of display on the liquid crystal panel 1 is deteriorated.

Moreover, each X dot is accompanied by a rising portion and a falling portion in one line, causing the frequency component to rise due to the variation of pulse, and this results in the occurrence of cross-talk on the liquid crystal panel 1.

With the intention of alleviating the degradation of display luminance on the liquid crystal panel 1 and decreasing the occurrence of crosstalk, the circuit arrangement shown in FIG. 15 includes the phase inverting circuit 63 which operates to rearrange MA and MB selected by the data selector 62 in a frame-wise manner, line-wise manner and dot-wise manner as shown in FIG. 16.

Figure 22:
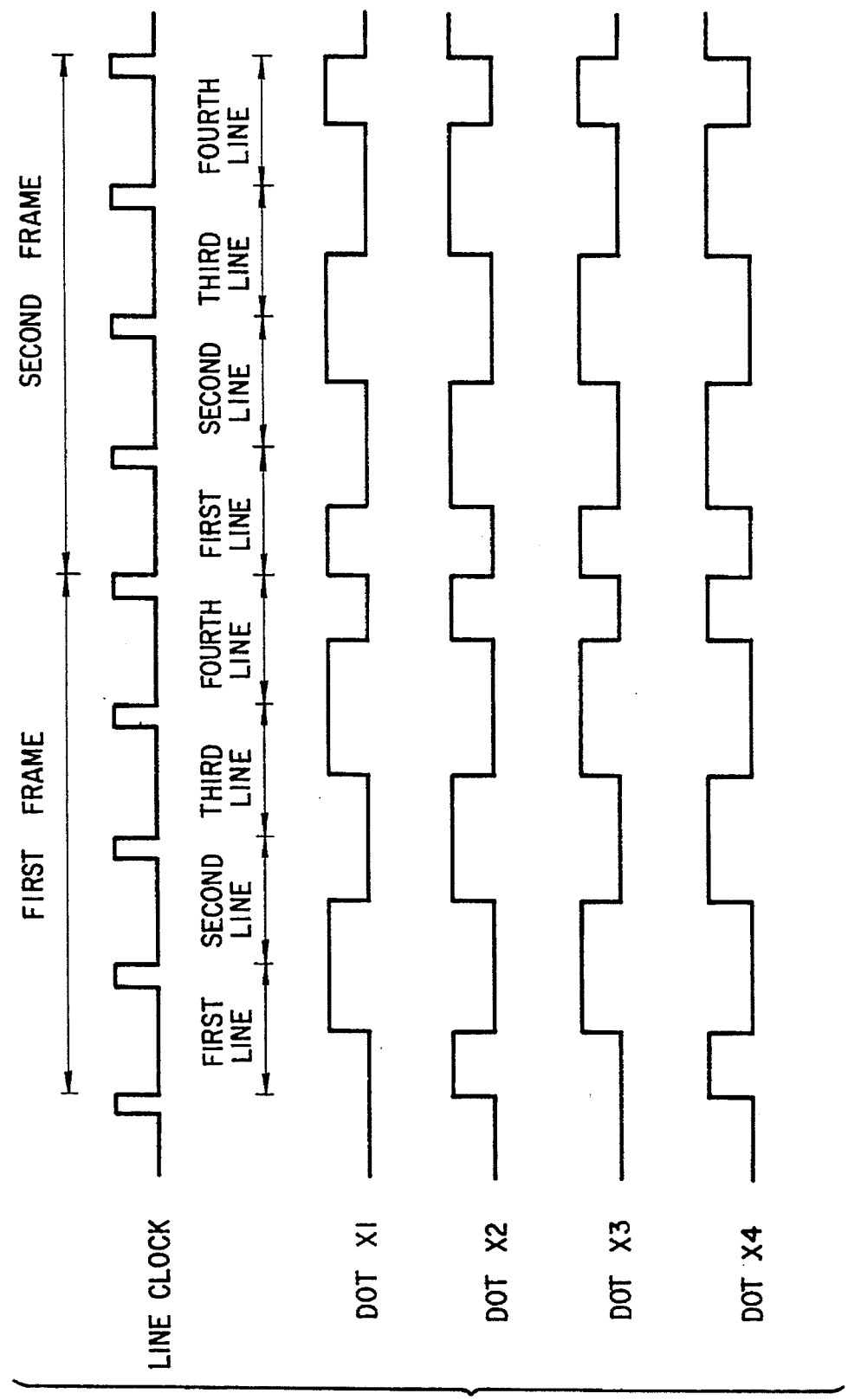

In the liquid crystal display circuit with the provision of the phase inverting circuit 63 shown in FIG. 15, the X drive circuit 65 produces display pulses shown in FIG. 22 upon receiving display data with (A, B)=(0, 1) for i rows and j columns (i and j are assumed to be 4). FIG. 22 shows that when output pulses for adjoining X dots are different and when the pulse for one dot rises, pulses for adjacent dots fall coincidently. In FIG. 21 which shows display pulses of the liquid crystal display circuit without the provision of the phase inverting circuit 63, display pulses for dot X1 to x4 rise and fall at the same timing, deteriorating the display luminance due to a rising noise and failing noise, whereas the provision of the phase inverting circuit 63 provides display pulses for adjoining dots which rise and fall at different timing as shown in FIG. 22. By changing the transition of display pulses for adjoining dots from rising to falling, the noise thereof cancel each other, and the degradation of luminance of liquid crystal display can be eliminated or reduced resulting in the so-called canceling effect.

Furthermore, in the liquid crystal display circuit without the phase inverting circuit 63, the display pulse once rises and falls in one line for each X dot, as shown in FIG. 21, and therefore the frequency component is higher due to the variation of pulse rises, resulting in the occurrence of crosstalk on the liquid crystal panel 1, whereas the provision of the phase inverting circuit 63 unifies display pulses of one line of one X dot and display pulses of the next line or previous line thereby to eliminate the rising or falling of display pulse on one line, and it reduces by half the variation of display pulse in one frame period. This results in the reduction of frequency component by half, and consequently the crosstalk occurring on the liquid crystal panel 1 is reduced.

The selection pulse 2 and pulse 3 shown in FIG. 19 have the same pulse width and therefore both pulses should provide the same luminance of display, however, complete noise cancellation is not achieved unless rising noises and falling noises in one line are in a 1-to-1 correspondence, and therefore there arises a small difference in the luminance of display between pulse 2 and pulse 3. On this account, when adjoining two dots on the liquid crystal display panel 1 are activated with pulse 2 and pulse 3, these dots will have slightly different luminances of display. In order to overcome this problem, the phase inverting circuit 63 is operated to rearrange the X drive data for every frame so that the display pulse for one dot is varied for every frame from pulse 2 to pulse 3 to pulse 2 and to pulse 3, and the display pulse for the adjacent dot is varied for every frame from pulse 3 to pulse 2 to pulse 3 and to pulse 2, thereby equalizing the luminance of display for these dots.

Furthermore, although the foregoing phase inverting circuit 63 rearranges the display information MA and MB read out of the line memory, in accordance with the present invention, the phase inverting circuit 63 may alternatively be provided at the front of the line memory so that data A and data B are rearranged before being introduced to the line memories.

Figure 23:
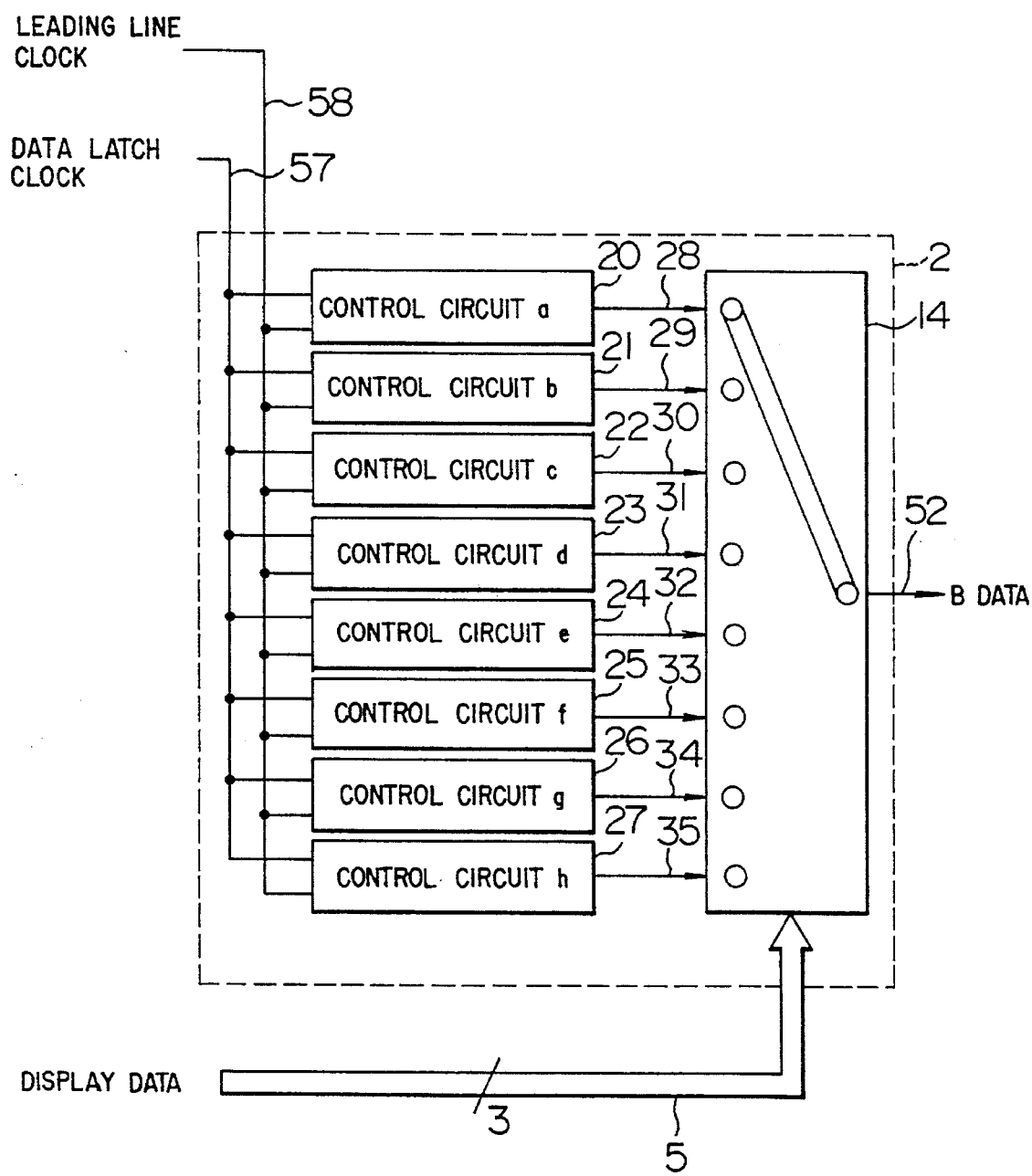

A concrete example of the frame rate control circuit 2 shown in FIG. 1 of the present invention will now be described by referring to FIGS. 23 and 24. FIGS. 23 and 24 show more concrete implementation of FIGS. 3A and 3D, which were used in roughly explaining the present invention assuming that a liquid crystal cell 1 comprises one dot.

In the liquid crystal panel 1, the frame rate control method is generally used to make a multi-level tone display. FIG. 23 is a block diagram showing the configuration of the frame rate control circuit 2. The function of each block is the same as that of FIG. 4. All dots forming the liquid crystal panel 1 are not subject to frame rate control at the same timing, but they are subject to frame rate control at different timing dot by dot in order to prevent flicker on the screen. This frame rate control method is implemented by using a leading line clock 58 and a data latch clock 57. In the present invention, frame rate control is exercised by taking a dot in the X direction as the unit. That is to say, frame rate control is exercised in the longitudinal line direction with respect to all dots of the liquid crystal panel 1. In case of a frame rate control ratio of n/m, n longitudinal lines among m longitudinal lines are activated for display every frame. An example of this frame rate control is shown in FIG. 24 If the frame rate control ratio is 1/3, three longitudinal lines are defined as one unit, and one longitudinal line is activated for display every frame. If the frame rate control ratio is 4/5, five longitudinal lines are defined as one unit, and four longitudinal lines are activated for display every frame. In each dot, therefore, a display proportionate to each frame rate control ratio is made.

In order to exercise frame rate control in the longitudinal line direction heretofore described in accordance with the frame rate control ratio, frame rate control data 28 to 35 are generated respectively in frame rate control circuits 20(a) to 27(h), and data is selected out of the frame rate control data 28 to 35 in accordance with 3-bit display data 5 and outputted as B data 52 (corresponding to the frame rate control data FD 10 shown in FIG. 1).

An embodiment comprising a combination of the circuit shown in FIG. 23 and the circuit shown in FIG. 15 will hereafter be described by referring to FIGS. 25 to 31.

FIG. 25 is a configuration diagram of this embodiment. This circuit is used to make a 16-level tone display on one screen of the liquid crystal panel 1 in accordance with high-order 1-bit display data 6 (corresponding to the A data 51 in FIG. 15) and low-order 3-bit display data 5. In the frame rate control circuit 2, the low-order 3-bit display data 5 is converted into frame rate control data 10 (corresponding to the B data 52 in FIG. 15).

Relationship among the high-order display data 6, the frame rate control data 10 and selection pulses applied to the liquid crystal panel 1 will now be described by referring to FIGS. 26 to 34. FIGS. 27 to 32 show examples of display made by using a matrix liquid crystal model comprising 6 dots by 6 dots as shown in FIG. 26. In the high-order display data and frame rate control data, "X" indicates an inactivation state "0" for display, whereas "0" indicates an activation state "1" for display. Each numeral in selection pulse represents one of pulse 1 to 4 shown in FIG. 19. That is to say, "1" represents the pulse 1 which is in the off-state during one horizontal internal, "2" the pulse 2 which is in the on-state during the latter half of one horizontal interval, "3" pulse 3 which is in the on-state during the former half of one horizontal interval, and "4" pulse 4 which is in the on-state during one horizontal interval.

Figure 27:
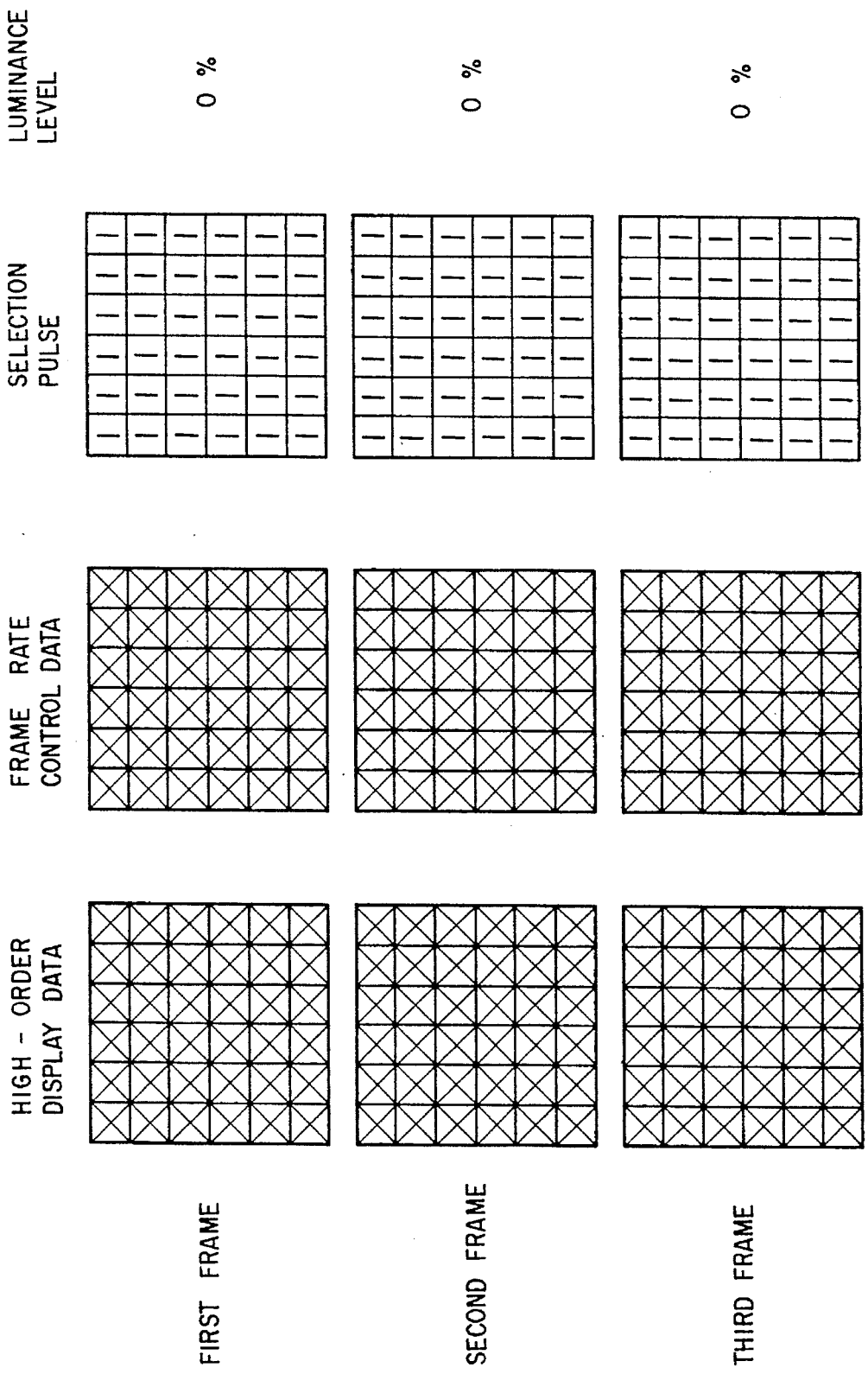
FIGS. 27 to 32 are diagrams for explaining detailed examples of luminance levels of respective frames obtained in the embodiment of FIG. 25.
Figure 28:
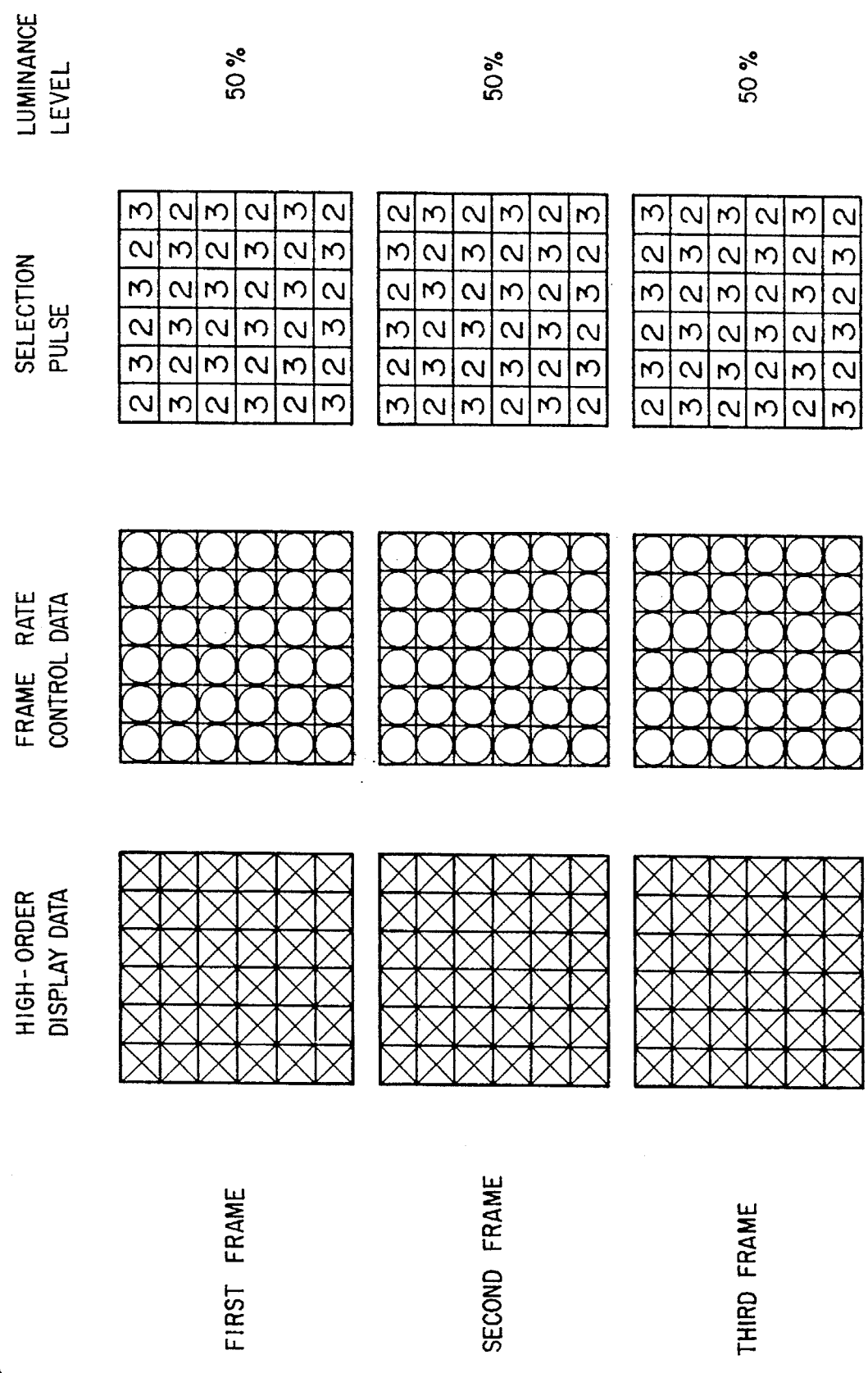

FIG. 27 shows the case where every data of the high-order display data and frame rate control data is "X" (i.e., inactivation state "0"). Since both the high-order display data and the frame rate control data are "0", the pulse 1 is selected as the display pulse as shown in FIG. 20, and the display luminance level of each frame is 0%. FIG. 28 shows the case where every high-order display data is "X" (inactivation state "0" for display) and every frame rate control data is "0" (activation state "1" for display).

Figure 29:
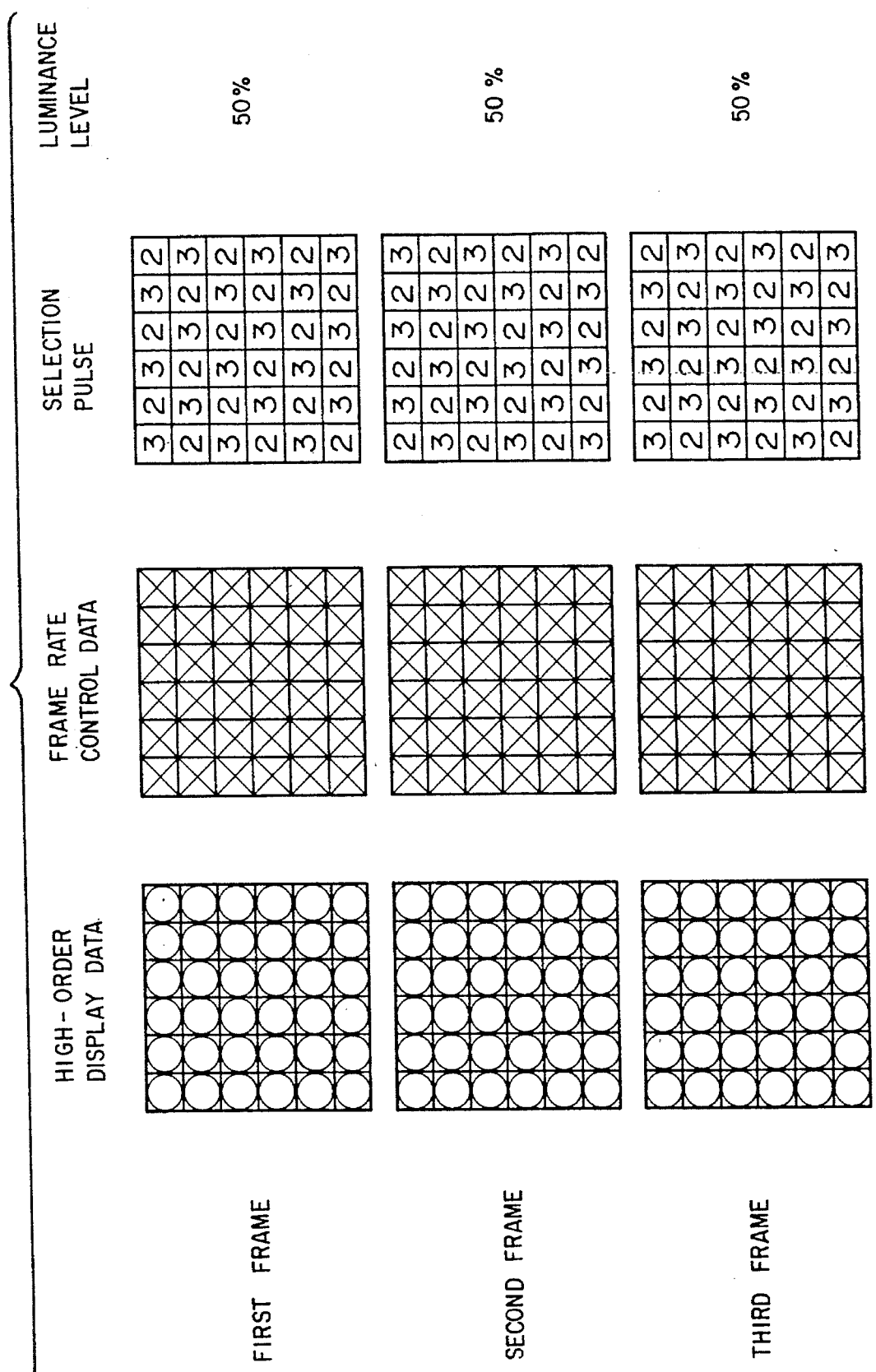

If it is attempted to make a display in accordance with this data without the intervention of a phase inverting circuit 63, every display pulse becomes the pulse 2. If the phase inverting circuit 63 is used as shown in FIG. 25, however, phase inversion is performed every adjacent dots and every frame. Therefore, every display pulse selected is not pulse 2, and selection pulses become as shown in FIG. 28. The display luminance level of each frame becomes 50%. In contrast with FIG. 28, FIG. 29 shows the case where every high-order display data is "O" and every frame rate control data is "X". The display pulse selected is inverted in phase by the phase inverting circuit every adjacent dots and every frame.

Figure 30:
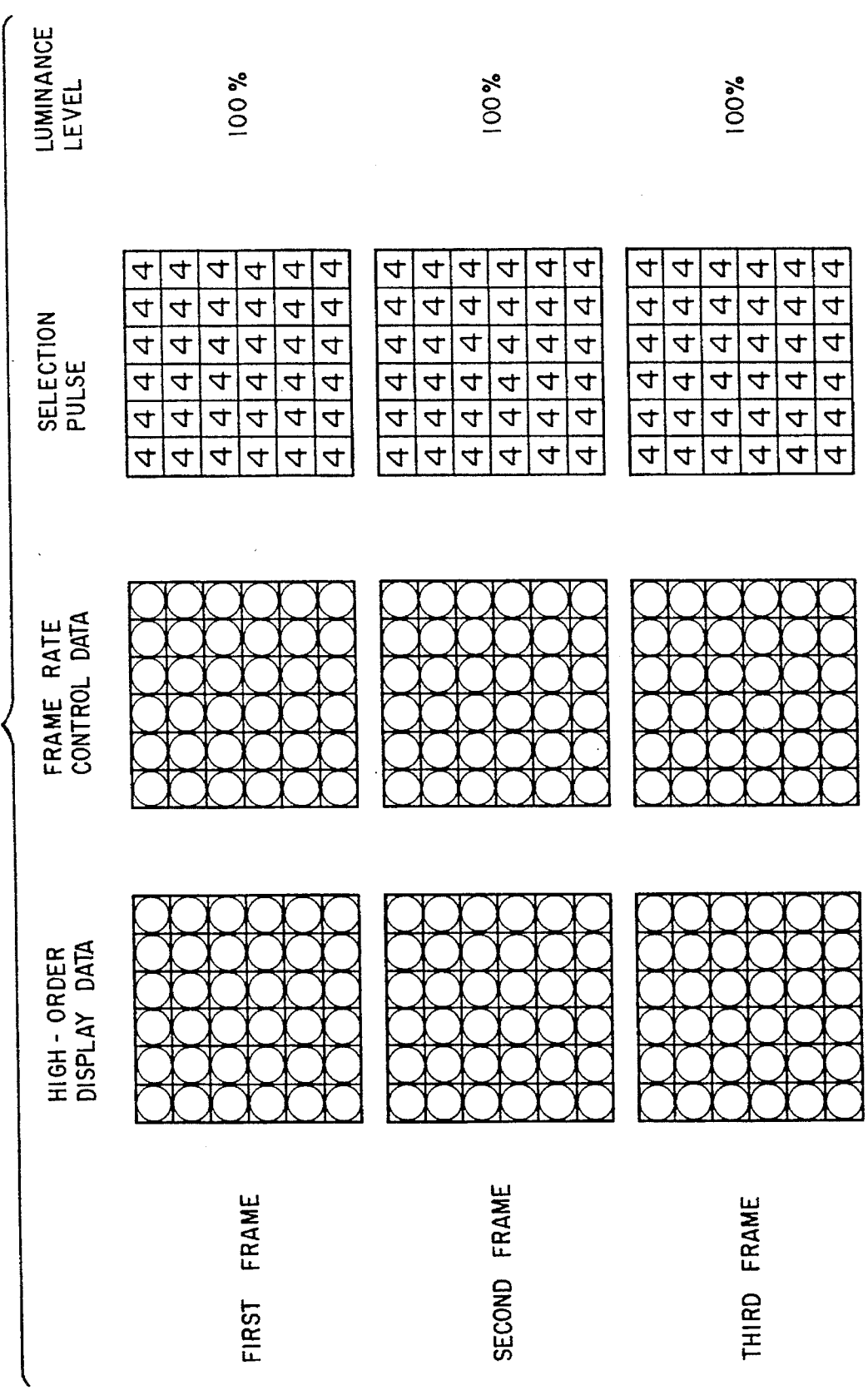

FIG. 30 shows the case where both the high-order display data and the frame rate control data are "1" (activation state "1" for display). Since both the high-order display data and the frame rate control data are "1", the selected display pulse becomes the pulse 4 as shown in FIG. 20. The display luminance level of each frame thus becomes 100%.

Figure 31:
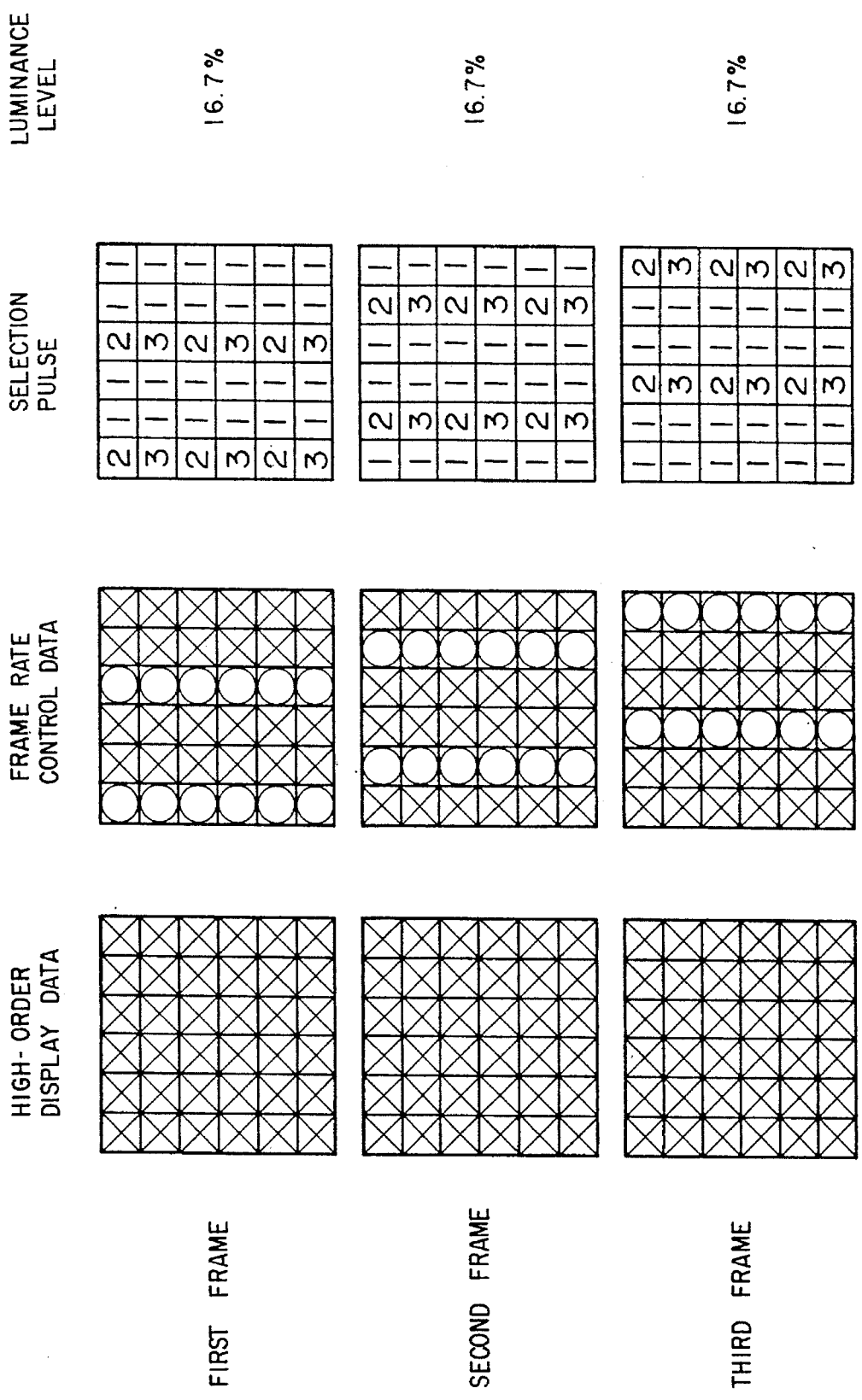

FIG. 31 shows the case where every high-order display data is "X" (inactivation state "0" for display) and the frame rate control data have a frame rate control ratio 1/3. In this frame rate control method, three longitudinal lines are defined as one unit and one of the three lines has activation states "O" for display whereas two remaining lines have activation states "X" for display.

Since every high-order display data is "X", the selected display pulse becomes the pulse 1 for a dot having frame rate control data "X" whereas it becomes the pulse 2 or pulse 3 by the intervention of the phase inverting circuit for a dot having frame rate control data "O". Therefore, the luminance level of the whole screen becomes 16.7% for each frame. Voltage waveforms applied to respective X electrodes by selection pulses shown in FIG. 31 are shown in FIG. 33.

Figure 33:
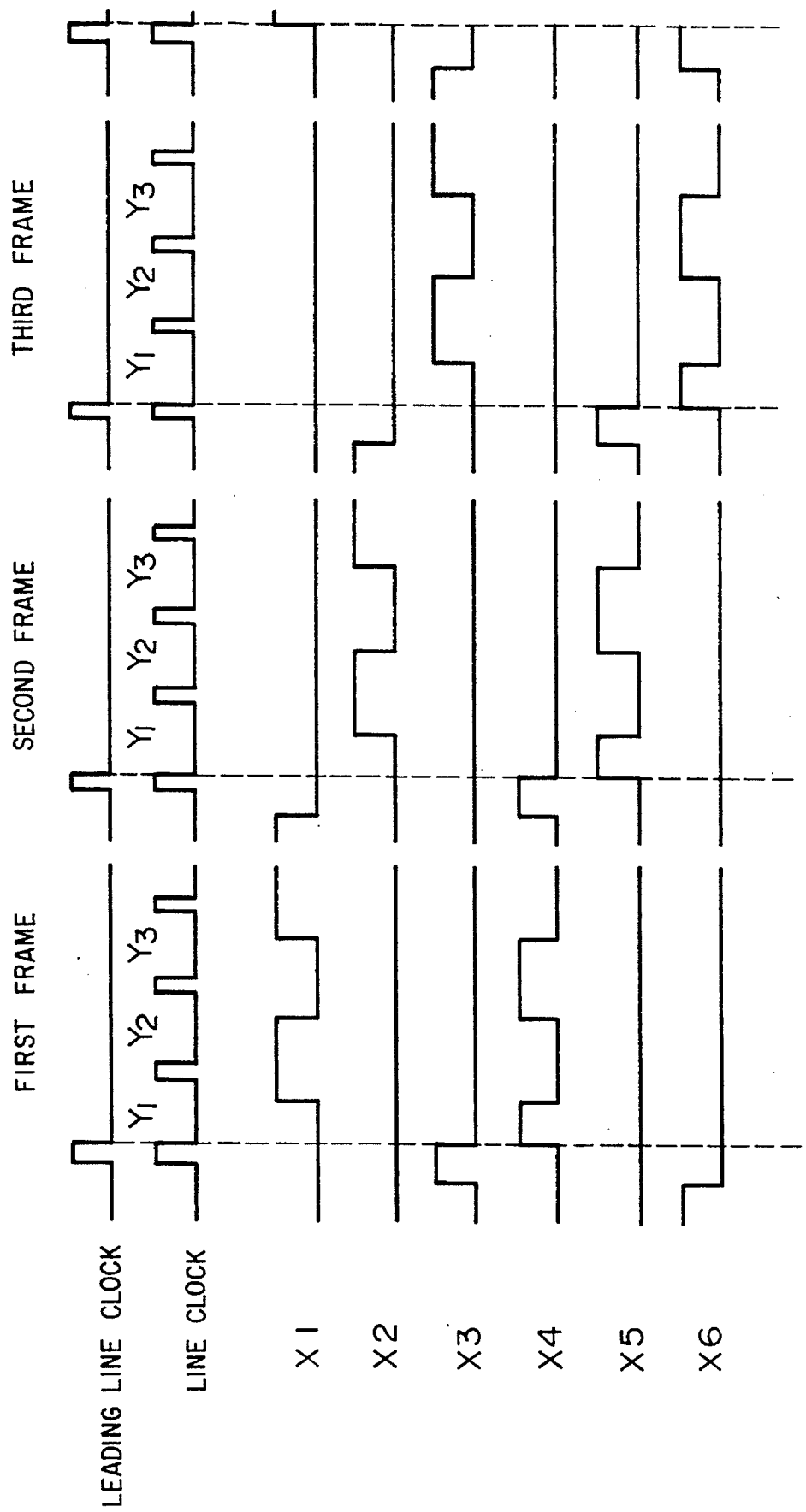
FIG. 33 is a diagram showing voltage waveforms applied to respective X electrodes in case of FIG. 31.

In the first frame shown in FIG. 33, pulses are applied to an electrode $X_1$ in the order of pulse 2, pulse 3, pulse 2 and pulse 3, whereas pulses are applied to an electrode $X_4$ in the order of pulse 3, pulse 2, pulse 3 and pulse 2. Transition points of pulses cancel each other between these two electrodes. Pulse 1 is applied to all of other electrodes $X_2$, $X_3$, $X_5$ and $X_6$. In the same way, pulse transition points cancel each other between electrodes $X_2$ and $X_5$ in the second frame and between electrodes $X_3$ and $X_6$ in the third frame. This canceling effect prevents the luminance from being lowered by expansion of display area.

Figure 32:
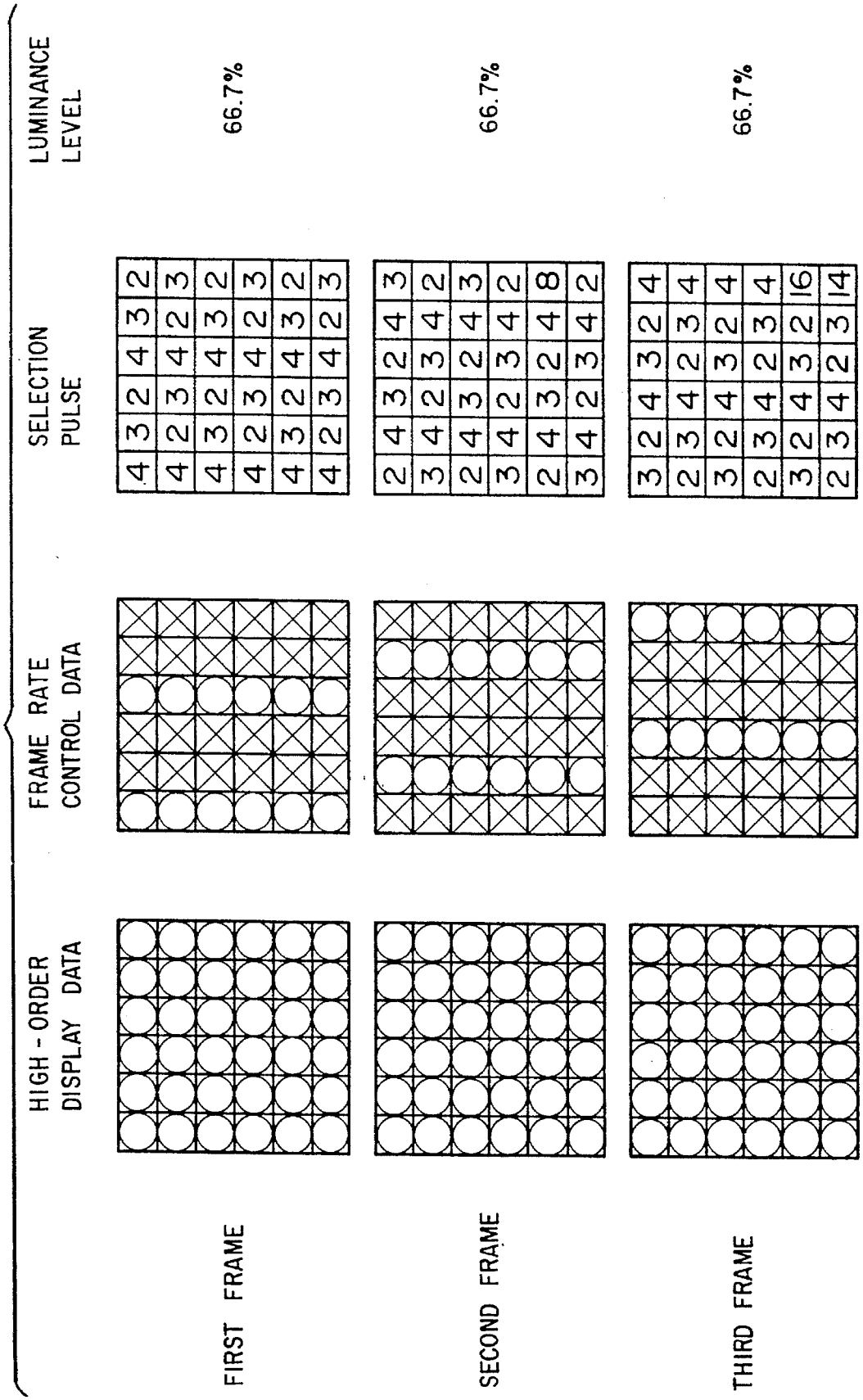

FIG. 32 shows the case where every high-order display data is "O" (activation state "1" for display) and the frame rate control data has a frame rate control ratio 1/3.

Figure 34:
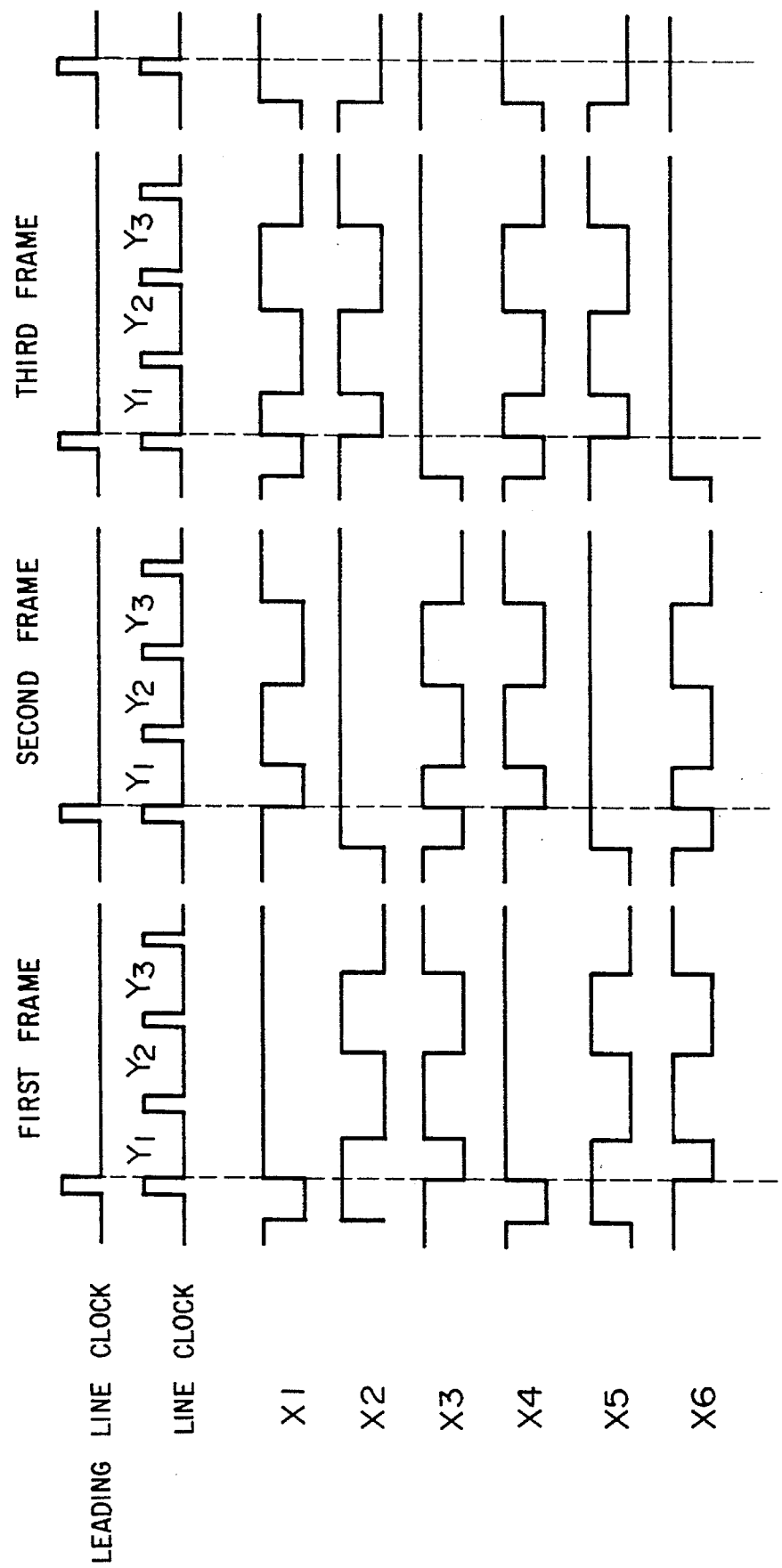
FIG. 34 is a diagram showing voltage waveforms applied to respective X electrodes in case of FIG. 32.

Since every high-order display data is "O", the selected display pulse becomes the pulse 2 or pulse 3 by the intervention of the phase inverting circuit for a dot having frame rate control data "X" whereas the selected display pulse becomes the pulse 4 for a dot having frame rate control data "O". Therefore, the luminance level of the whole screen becomes 66.7%. Voltage waveforms applied to respective X electrodes by selection pulses shown in FIG. 32 are shown in FIG. 34. In the first frame application voltage pulse becomes the pulse 4 for the electrodes $X_1$ and $X_4$, and it changes in the order of pulse 3, pulse 2, pulse 3 and pulse 2 for the electrodes $X_2$ and $X_5$ whereas it changes in the order of pulse 2, pulse 3, pulse 2 and pulse 3 for the electrodes $X_3$ and $X_6$. As a result of such pulse application, pulse transition points cancel each other between the electrodes $X_2$ and $X_3$ and between the electrodes $X_5$ and $X_6$, respectively. In the same way, pulse transition points cancel each other respectively between the electrodes $X_1$ and $X_3$ and between the electrodes $X_4$ and $X_6$ in the second frame. Further, in the third frame, pulse transition points cancel each other between the electrodes $X_1$ and $X_2$ and between the electrodes $X_4$ and $X_5$, respectively.

Foregoing description has been given by taking a frame rate control ratio of 1/3 as an example. However, the same holds true for other values of the frame rate control ratio. In order to generate canceling effect caused by selected display pulses, a frame rate control method taking a longitudinal line as the unit is effective.

The present embodiment is largely efficient in multi-level tone display because multi-level tone display having fine levels which cannot be realized by the frame rate control method becomes possible.

If the frame control method is used in order to make a multi-level display of luminance level 10%, for example, ten frames are defined as one period and display is activated (with luminance level of 100%) once every ten frames. If a display is actually made, flicker is caused and display quality is deteriorated. In contrast with this, the present invention makes it possible to make a display of luminance level 10% without deteriorating the display quality by adopting the frame rate control method with a frame rate control ratio 1/5 causing comparatively slight flicker and making a display of luminance level 50% once every five frames.

In the embodiments heretofore described, liquid crystal panels are used. However, the present invention is also applicable to flat panels such as plasma or EL.

Further, in transition to use of colors, quasi-multicolor display becomes possible by applying the present invention to red, blue and green colors.

A liquid crystal display system according to another embodiment of the present invention will now be described by referring to FIG. 35. This system is provided to receive input data at the rate of four bits per display dot and make a 16-level tone display.

Figure 35:
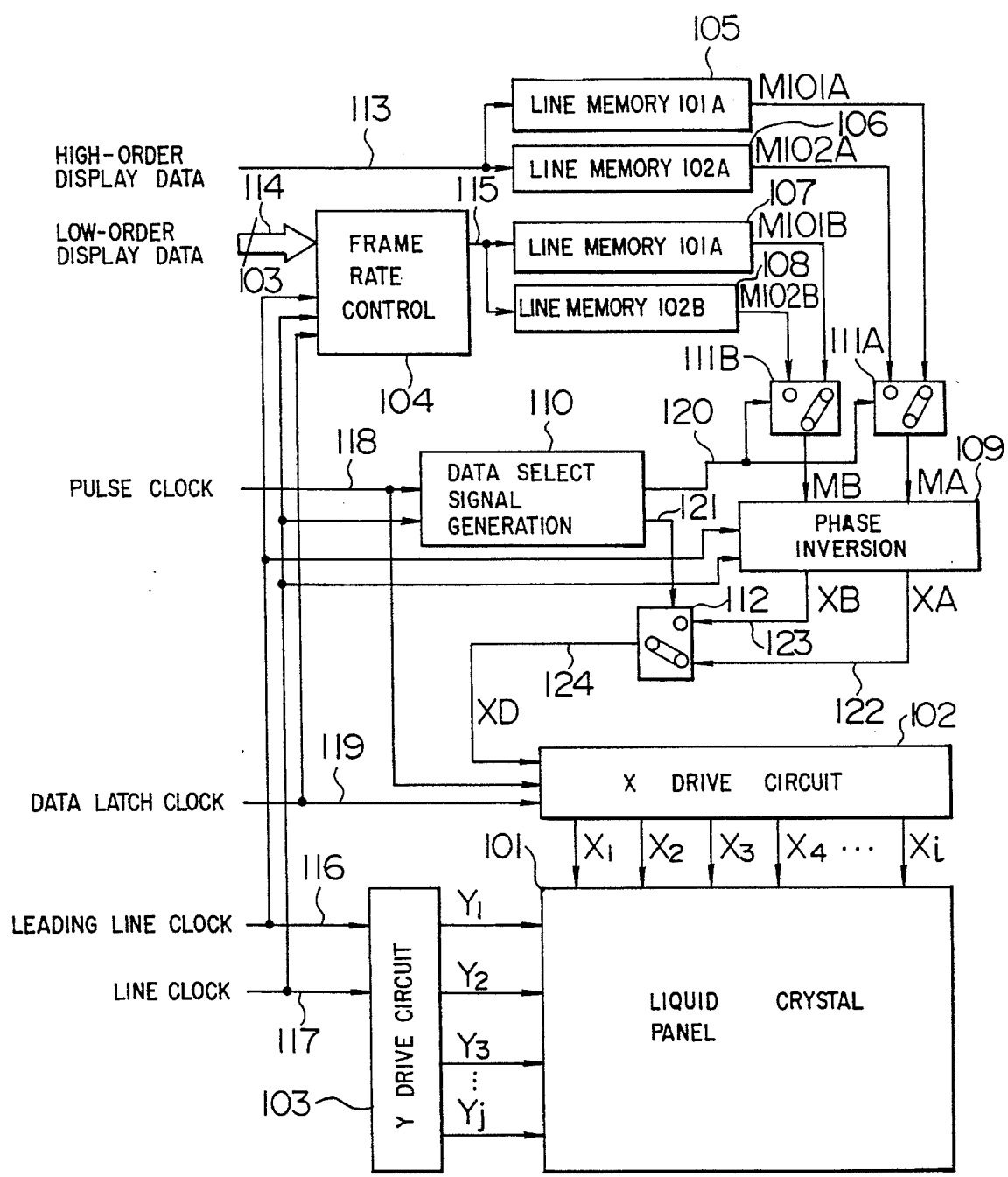
FIG. 35 is a block diagram of a 16-level tone display system according to another embodiment of the present invention.

In the block diagram of FIG. 35, reference numerals 113 and 114 respectively denote high-order display data and low-order 3-bit display data. Reference numeral 104 denotes a frame rate control circuit for converting the low-order 3-bit display data 114 into frame rate control data FD 115. Reference numerals 105 and 106 respectively denote line memories 101A and 101B for storing the high-order display data 113. Reference numerals 107 and 108 respectively denote line memories 101B and 102B for storing the frame rate control data 115 by an amount corresponding to one line. Reference numeral 110 denotes a data select signal generation circuit for generating data select signals 120 and 121 on the basis of a pulse clock 118 and a line clock 117. The data select signal 120 thus generated assumes alternately the "high" state and the "low" state in response to the line clock 117. The data select signal 121 assumes alternately the "high" state and the "low" state in response to the pulse clock 118 having a frequency which is twice that of the line clock 117. Reference characters 111A, 111B and 112 denote data select circuits. Reference numeral 109 denotes a phase inverting circuit for rearranging two kinds of data, and reference numeral 101 denotes a liquid crystal panel. Reference numerals 102 and 103 denote an X drive circuit and a Y drive circuit, respectively.

With reference to FIG. 15, the high-order display data 113 is taken into the line memory 101A and the line memory 102A alternately every line. Data is read out from a line memory which is not taking in data. This read operation is executed at a speed which is twice that of the write operation. The same data stored in the line memory is read out twice. In the data select circuit 111A, data M101A or M102A thus read out is selected as MA. As for the frame rate control data 115, the similar operation is performed by the line memories 101B and 102B, and data MB is selected by the data select circuit 111B.

The phase inverting circuit 109 rearranges data MA and MB sent from the data select circuits 111A and 111B by taking a dot in the X direction (i.e., lateral direction of the screen) as the unit and outputs the rearranged data as data XA and XB for driving the X drive circuit 102. The dot which is the subject of this arrangement depends upon the line and each dot position. For example, data rearrangement in the phase inverting circuit 109 is performed as follows. As shown in FIG. 16, a dot indicated by "—" is not subject to rearrangement of the input data MA and MB, and the input data MA and MB are outputted respectively as X drive data XA and XB as they are. For a dot indicated by "○", the input data MA and MB are rearranged, and rearranged results are outputted as X drive data XA and XB, respectively. That is to say, the phase inverting circuit 109 rearranges data for a dot indicated by "○" and outputs results of rearrangement to XA and XB if the input data (MA, MB)=(0, 1) or (1, 0). If (MA, MB)=(0, 0) or (1, 1), MA and MB are respectively outputted to XA and XB as they are because the same data are produced even if rearrangement is made. It is a matter of course that rearrangement may be made in such cases as well for convenience of processing. In the data select circuit 112, either of X drive data XA and XB is selected by the data select signal 121, which divides one line evenly in two, and then outputted as XD 124.

FIG. 17 shows output data (XA, XB) for respective dots assuming that the input data (MA, MB)=(0, 1).

Figure 5:
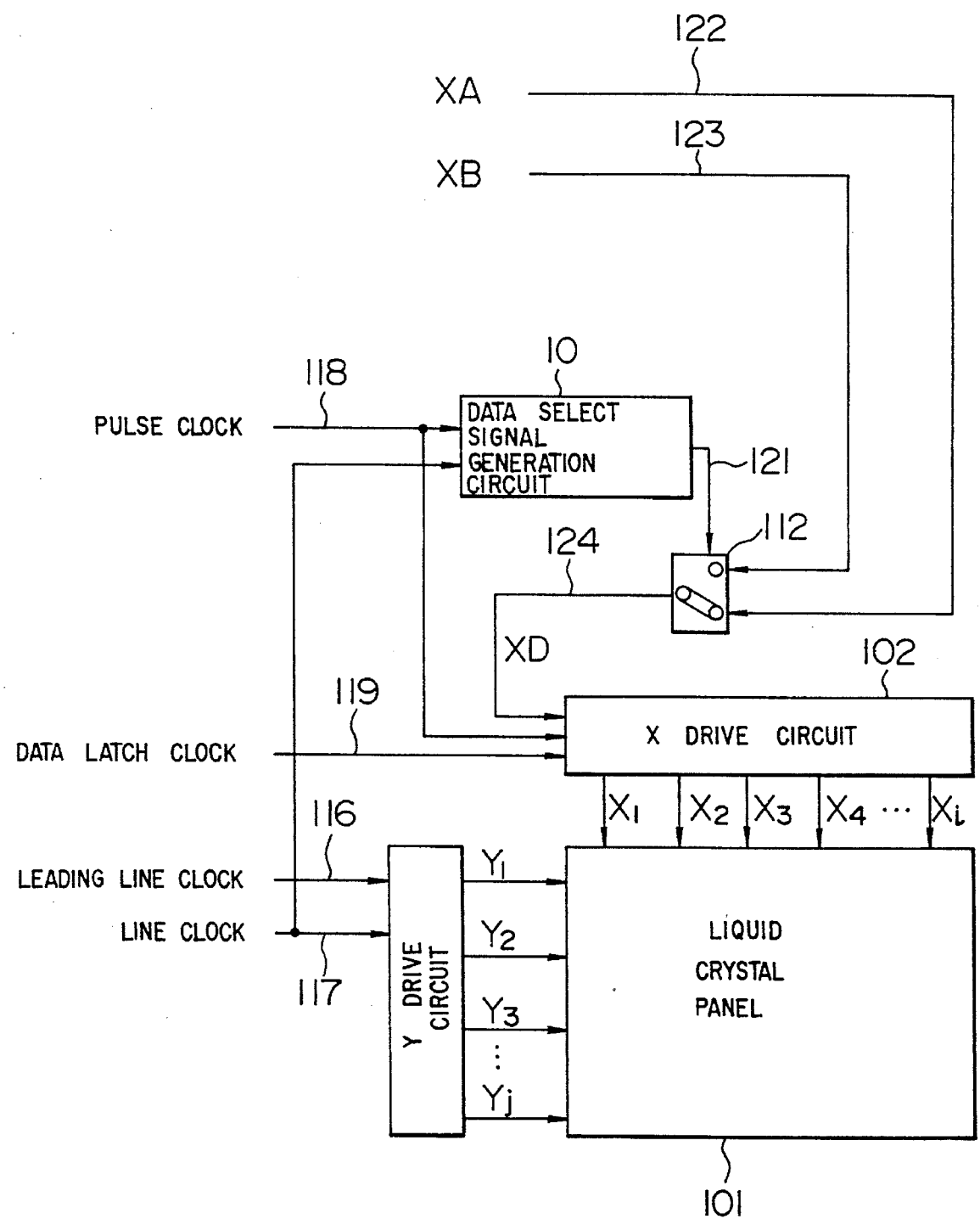
FIG. 5 is a block diagram of a pulse width modulation multi-level tone display system of the prior art; prior art.

In the same way as the prior art shown in FIG. 5, the X drive circuit 102 takes in the high-order data XD(=XA) required for displaying one line in response to a data latch clock 119. In response to the succeeding falling edge of the pulse clock 118, the X drive circuit 102 outputs display information indicated by XD(=XA) onto X1 to Xi. While the X drive circuit 102 is outputting display information of the high-order data XD(=XA), the X drive circuit takes in low-order data XD(=XB) corresponding to one line in response to the data latch clock 119 and outputs display information indicated by XD(=XB) onto X1 to Xi in response to the succeeding falling edge of the pulse clock 118. Display information X1 to Xi supplied from the X drive circuit 102 is applied to liquid crystals located on one line of output Y1–Yj of the Y drive circuit 103 assuming the "high" state at that time. Quantity of light proportional to the display information is transmitted. In response to the leading line clock 116 and the line clock 117, the Y drive circuit 103 makes Y1 "high". In response to succeeding pulses of the line clock 117, the Y drive circuit 103 shifts the "high state" successively to Y2 to Yj in this order.

Figure 36:
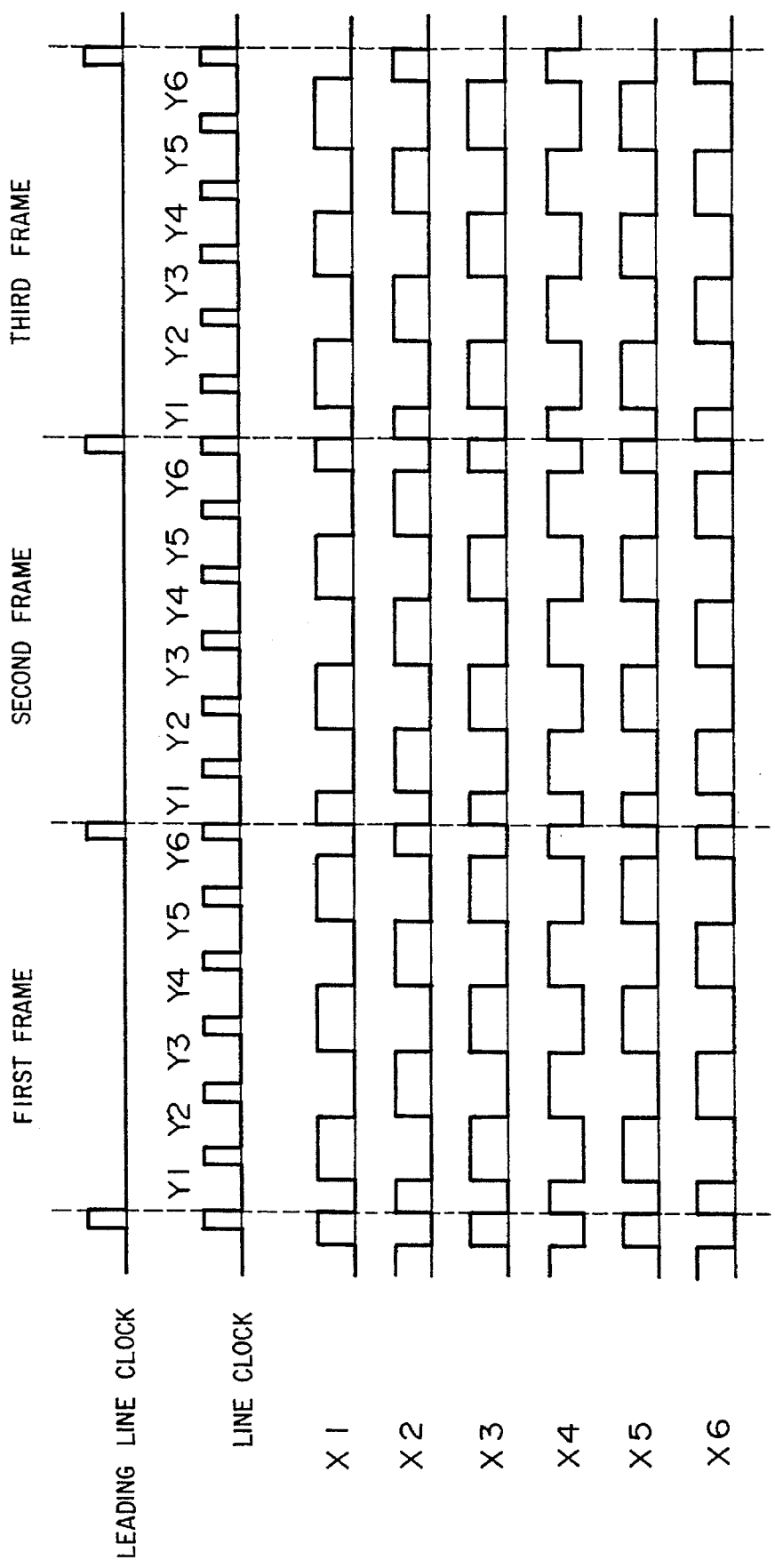

When display data represented as (high-order display data, frame rate control data)=(0, 1) are so inputted to the liquid crystal display circuit of FIG. 35 heretofore described as to form i rows and j columns as shown in FIG. 28 (where i, j=6) and half tone display with a luminance level of 50% is made, display pulses as shown in FIG. 36 are outputted from the X drive circuit 102.

With reference to FIG. 36, output pulses of adjacent X dots differ. When the pulse of a certain dot rises, pulses of adjacent dots fall simultaneously. Since transition edges of display pulses of adjacent dots thus include a rising edge and a falling edge, their noise cancels or offsets each other. Lowering of luminance level in liquid crystal display can be prevented or reduced. That is to say, the cancelling effect is obtained.

By putting the display pulse of one line in a certain X dot and the display pulse of the succeeding line or the display pulse of the preceding line together, the rising edge or falling edge of the display pulse in one line is cancelled and the variation of display pulses in one frame interval is reduced to half. Therefore, the frequency component is also reduced to half. As a result, crosstalk generated in the liquid crystal panel 101 is advantageously reduced.

The frame rate control circuit 104 will now be described.

In the same way as the circuit of the prior art shown in FIG. 3A, the frame rate control circuit 104 comprises eight kinds of control circuits 125 to 132 and a selection circuit 141 for selecting one out of eight kinds of frame rate control data 133 to 140 respectively outputted from the control circuits 125 to 132. As described before, each of the control circuits 125 to 132 generates frame rate control data complying with its frame rate control ratio by using the leading line clock 116, the line clock 117 and the data latch clock 119.

Figure 37:
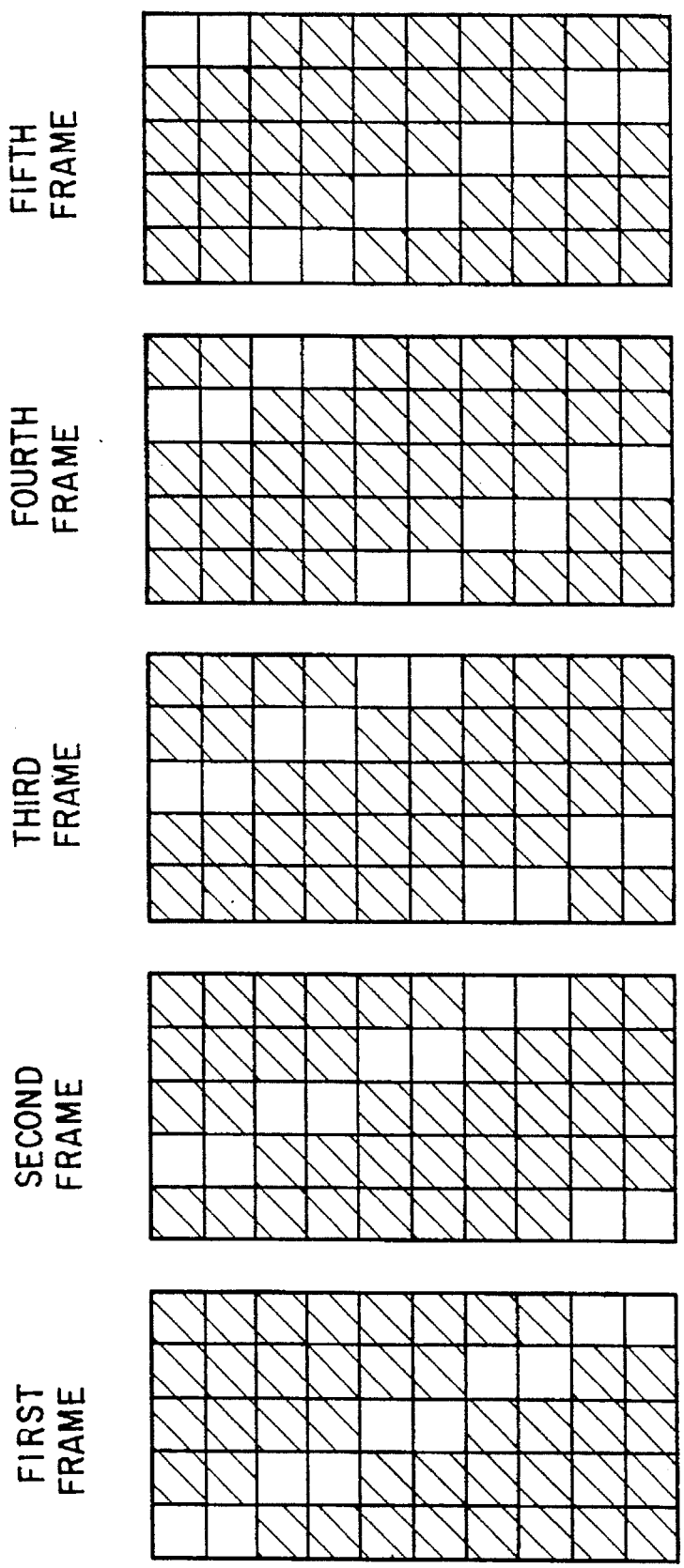

FIG. 37 shows frame control data taking the shape of a slant dot pattern according to the present embodiment. In the example shown in FIG. 37, the frame rate control ratio is 4/5. The shaded region indicates "1" (activation for display). Unlike the frame rate control data of the prior art shown in FIG. 4, one unit of the frame control data has two lines in the Y direction (longitudinal direction) of the screen and m dots (where the frame rate control period is in frames) in the Y direction (longitudinal direction). One unit of the frame control data includes the same data in the Y direction, i.e., in two lines. In order to prevent flicker on the screen of the liquid crystal panel 1, frame control data is shifted every frame by taking two lines in the Y direction as the unit.

Figure 45:
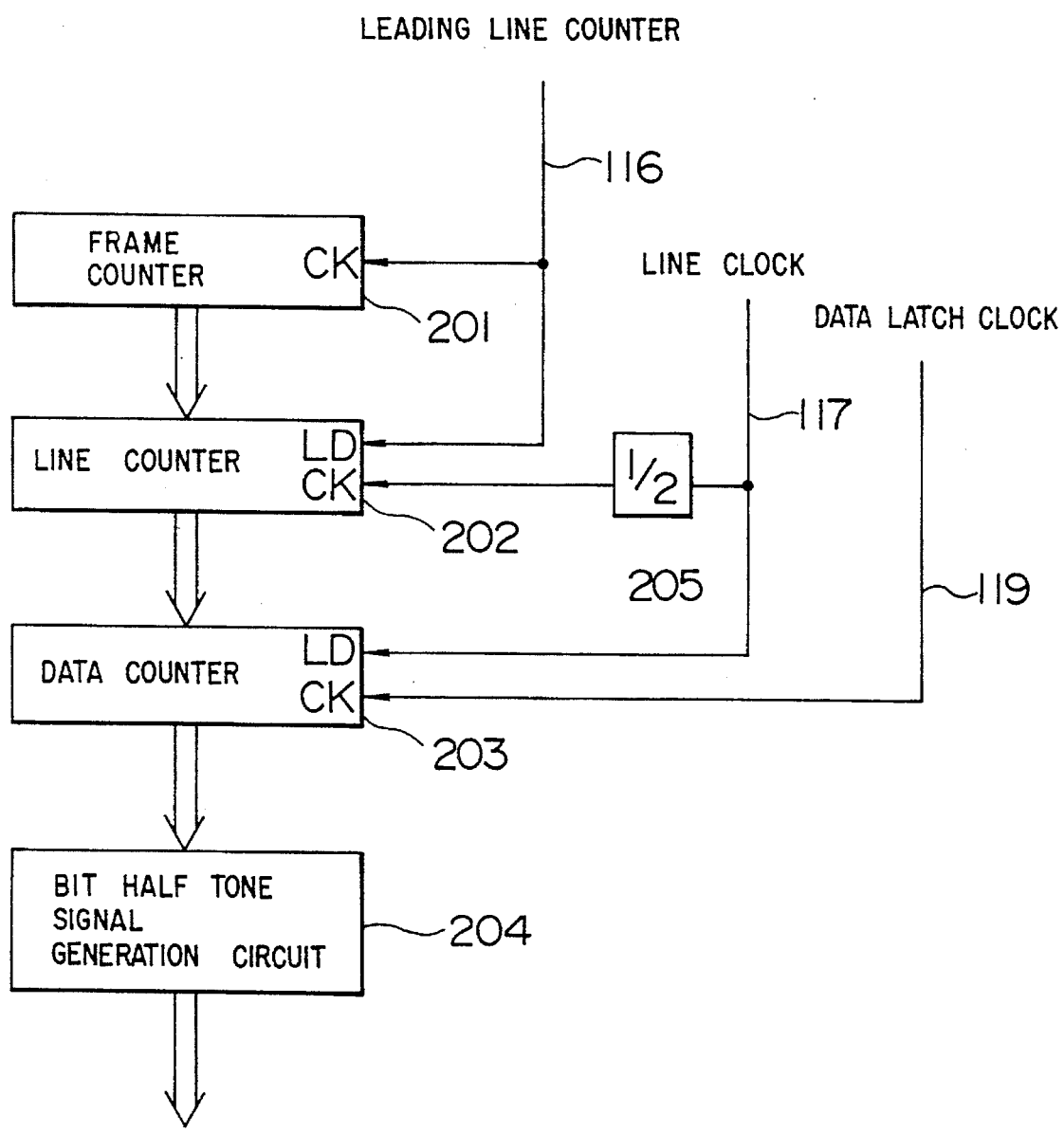
FIG. 45 is a block diagram of an example of a circuit for exercising frame rate control in both X and Y directions so as to form a slant dot pattern.

FIG. 45 shows an example of a control circuit for generating frame rate control data illustrated in FIG. 37. This circuit corresponds to one of the control circuits included in the frame rate control circuit as shown in FIG. 3A.

This control circuit includes a quinary (5-scale) frame counter 201 for counting pulses of the leading line clock 116, a quinary line counter 202 which is loaded with a value supplied from the frame counter 201 in response to the leading line clock 116 and which counts 1/2 frequency division output of pulses of the line clock 117 by taking the loaded value as the initial value, a frequency divider 205 for performing the above described frequency division, a quinary data counter 203 which is loaded with the output value of the line counter 202 in response to the line clock and which counts pulses of the data latch clock by taking the loaded value as the initial value, and a bit half tone signal generation circuit 204 for outputting a predetermined dot pattern in response to the output value of the data counter 203. Quinary counters are used as the frame counter 201 and the data counter 203 on the basis of the value of the denominator (frame period) of the frame rate control ratio 4/5. According to the frame rate control ratio, other counters may be used. A quinary counter is used as the line counter 202 because the frame rate control pattern shown in FIG. 37 includes five different line patterns in ten lines. Pulses of the line clock undergo frequency division with a ratio of 2 because the line pattern changes every two lines. In this example, contents of the line pattern are "01111", "10111", "11011", "11101" and "11110". The contents of the line pattern differ according to the frame rate control ratio. The bit half tone signal generation circuit 204 generates different line patterns in response to the output value of the data counter 203 and may include a decoder or a memory table.

This frame rate control circuit shifts the phase of the line pattern by one dot in the horizontal direction every two lines in one frame, and it shifts the phase of the line pattern by one dot every frame as well. As a result, the frame rate control pattern taking the shape of slant dot pattern as shown in FIG. 37 is generated.

When this configuration of the control circuit is used, parallel data are outputted from the selector 141 shown in FIG. 3A. Therefore, line memories each having a width of a plurality of bits are used. If line memories receiving serial data are used, parallel-serial conversion must be performed.

Details of respective blocks shown in FIG. 35 have heretofore been described. An example of display made by the liquid crystal display system of FIG. 35 will now be described by referring to FIGS. 38 to 41. As an example of display, it is now assumed that a liquid crystal device having 6 dots by 6 dots, X drive electrodes X1 to X6 arranged from the left side, and Y drive electrodes Y1 to Y6 arranged from the top side are used.

Figures 6A, 6B:
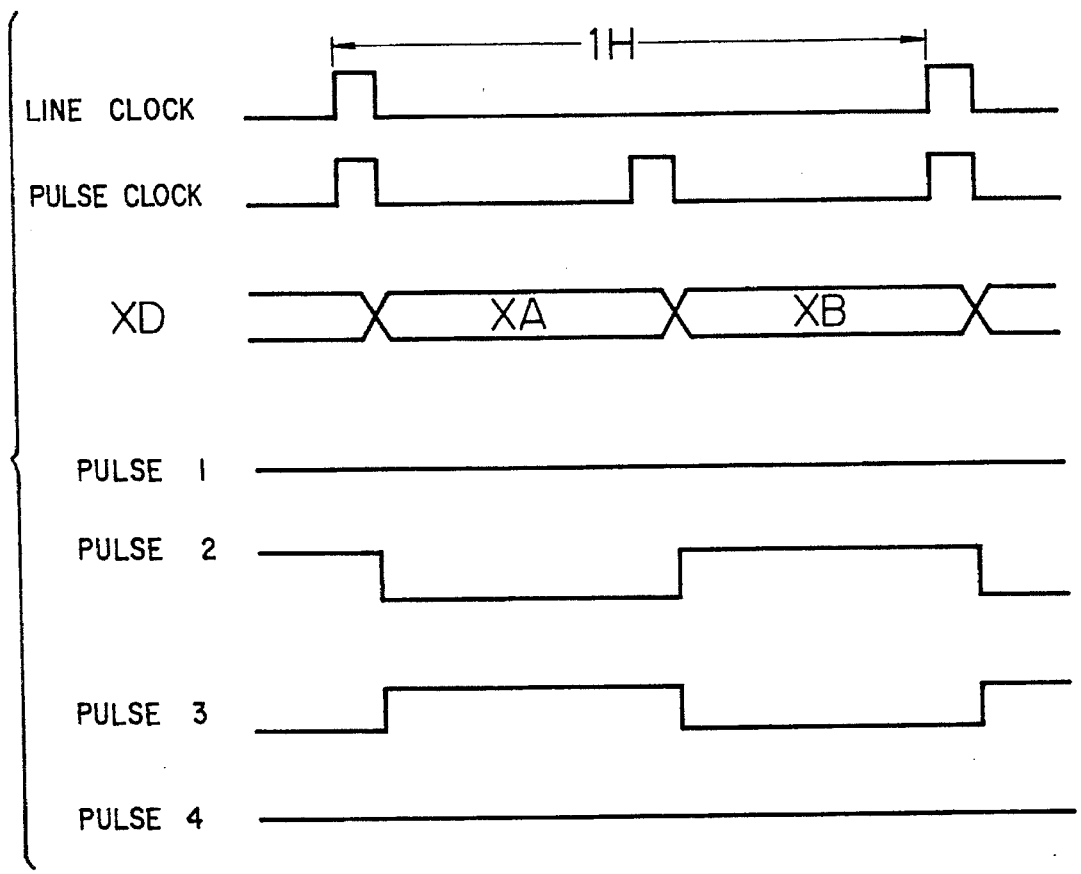
FIGS. 6A and 6B are diagrams for explaining display pulses of pulse width modulation of the prior art.
Figure 38:
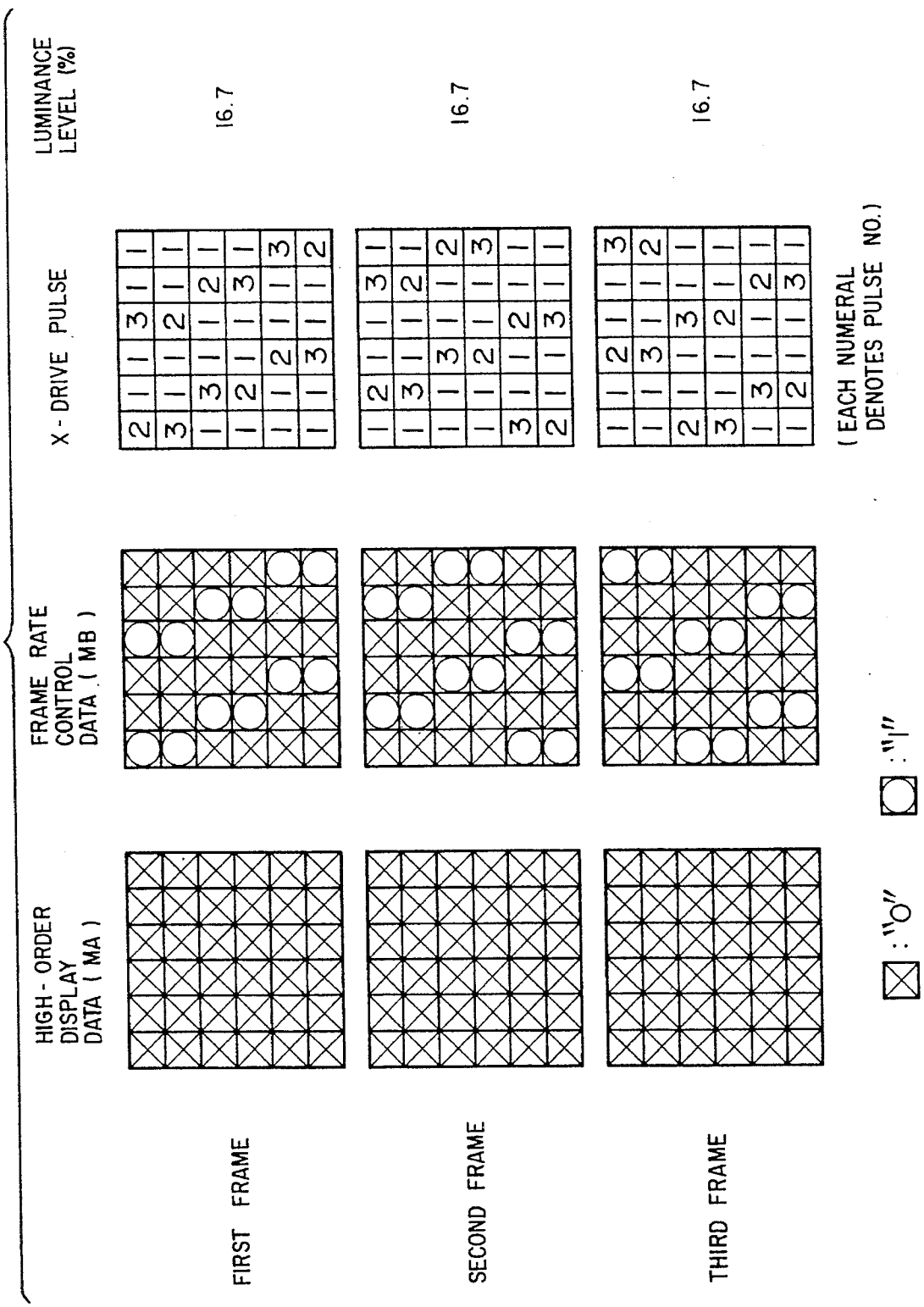

FIG. 38 shows the X drive pulse and display luminance level (16.7%) in case the high-order display data MA 113 is "0" and the frame rate control data MB 115 has a frame rate control ratio of 1/3. In the high-order display data MA and the frame rate control data MB, "X" indicates inactivation state "0" for display whereas "○" indicates inactivation state "1" for display. Further, each numeral shown in X drive pulse denotes either of pulses 1 to 4 shown in FIG. 6B.

In FIG. 38, every high-order display data MA is "0". For a dot having frame rate control data MB "0", therefore, the X drive pulse becomes pulse 1. For a dot having frame rate control data MB "1", the X drive pulse becomes pulse 2 or pulse 3 through the phase inverting circuit 109 functioning as shown in FIG. 16. In each frame, therefore, the luminance level of the whole screen becomes 16.7%.

Figure 39:
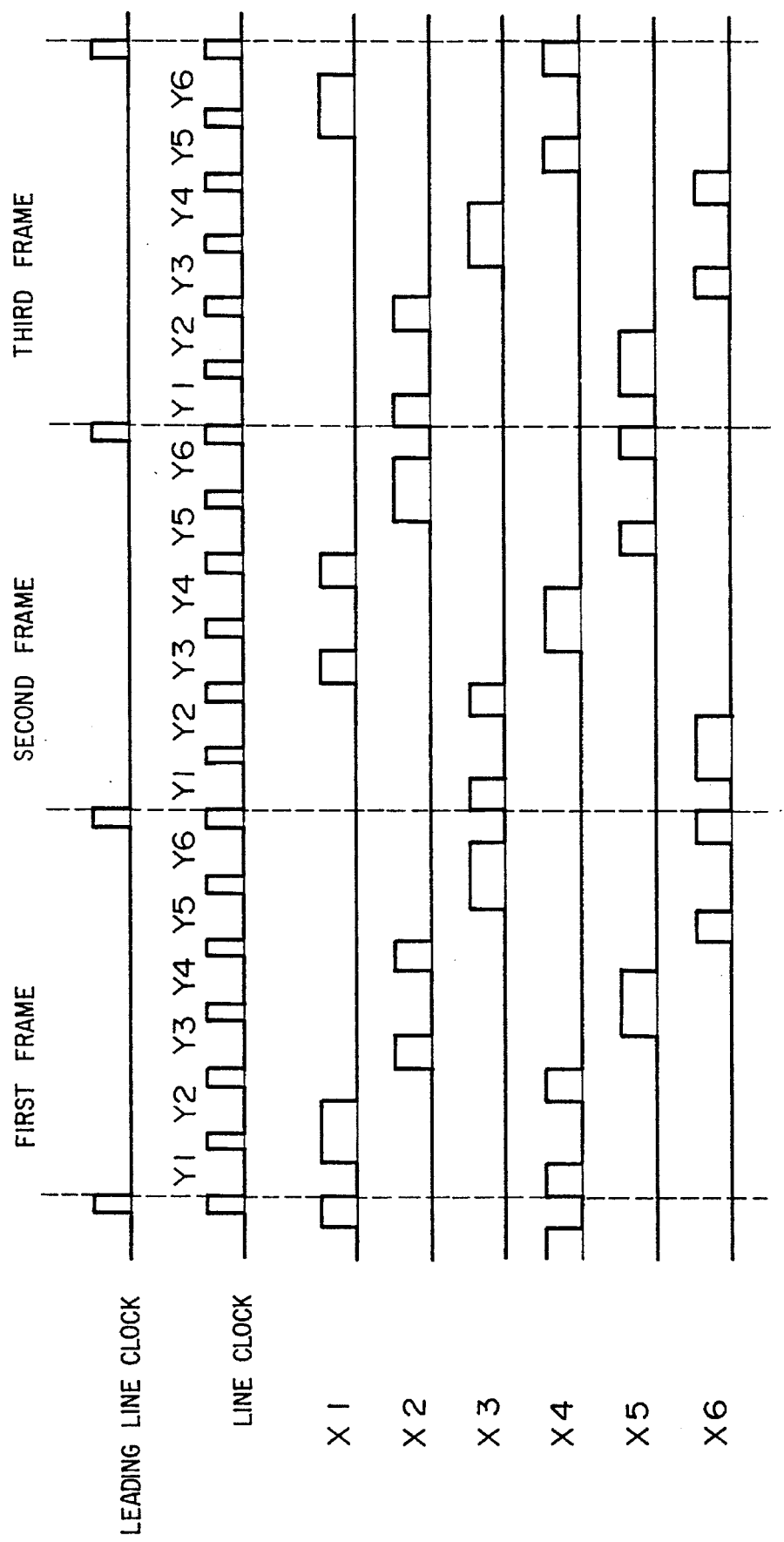

Waveforms of X drive pulses of FIG. 38 are shown in FIG. 39. In the first frame, display pulses are applied to respective X electrodes in combination "pulse 2, pulse 3" or "pulse 3, pulse 2" every two lines in the Y direction and in the order represented as "X1→X2→X3" and "X4→X5→X6". In the second frame, display pulses are applied to respective X electrodes in the order represented as "X3→X1→X2" and "X6→X4→X5". In the third frame, display pulses are applied to respective X electrodes in the order represented as "X2→X3→X1" and "X5→X6→X4". Since the frame rate control data MB has a frame rate control ratio 1/3, the first to third frames are repeated in the fourth frame and succeeding frames. In two lines Y1 and Y2 of the first frame, "pulse 2, pulse 3" is applied to the electrode X1 and "pulse 3, pulse 2" is applied to the electrode X4. Pulse transition points cancel each other between these two electrodes. In two lines Y3 and Y4, "pulse 3, pulse 2" is applied to the electrode X2 and "pulse 2, pulse 3" is applied to the electrode X5. Pulse transition points cancel each other between these two electrodes. In two lines Y5 and Y6, pulse transition points cancel each other between the electrodes X3 and X6.

In the second frame and succeeding frame as well, pulse transition points cancel each other between two electrodes. Owing to this effect, luminance lowering caused by expansion of display area is prevented.

Figure 40:
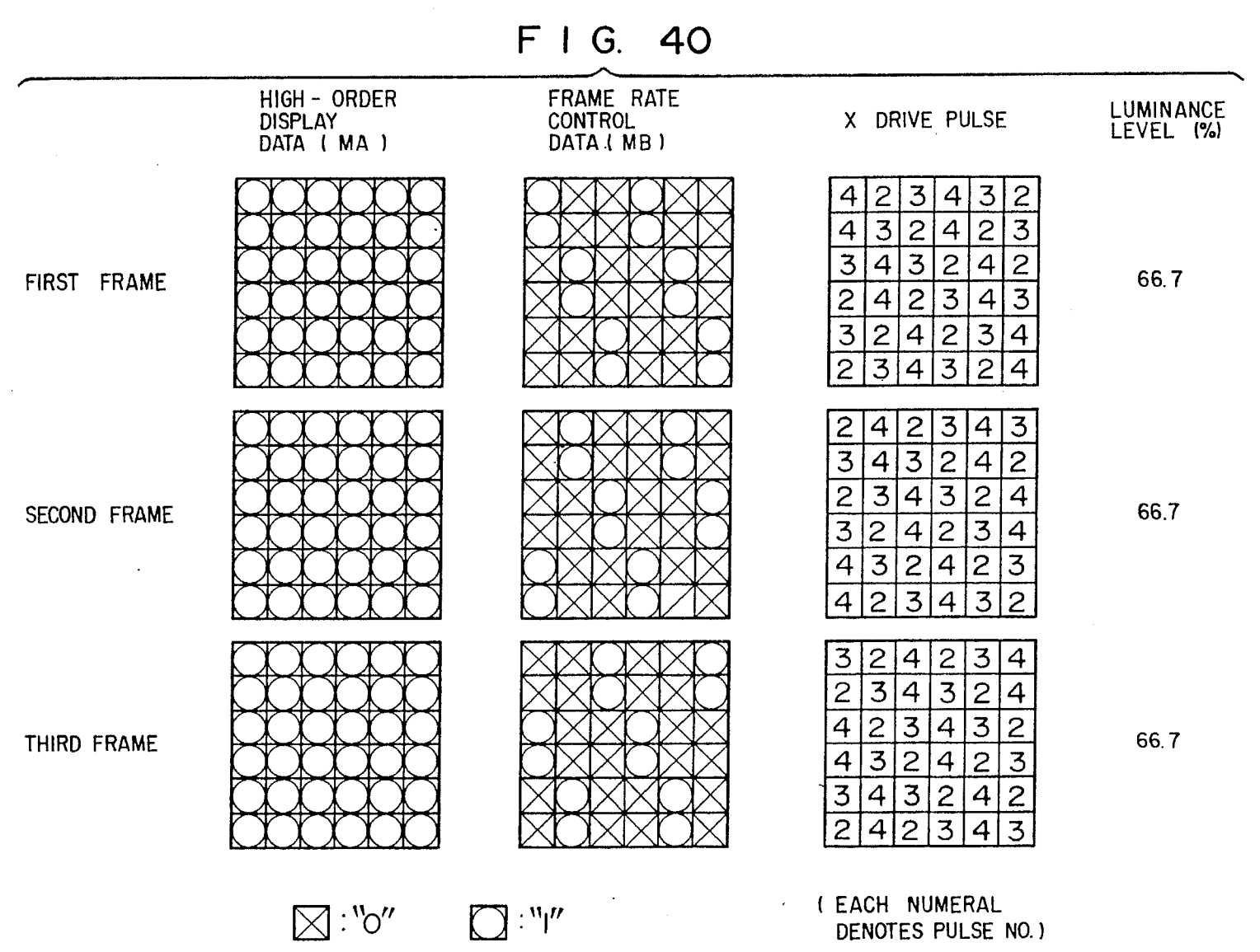
Figure 41:
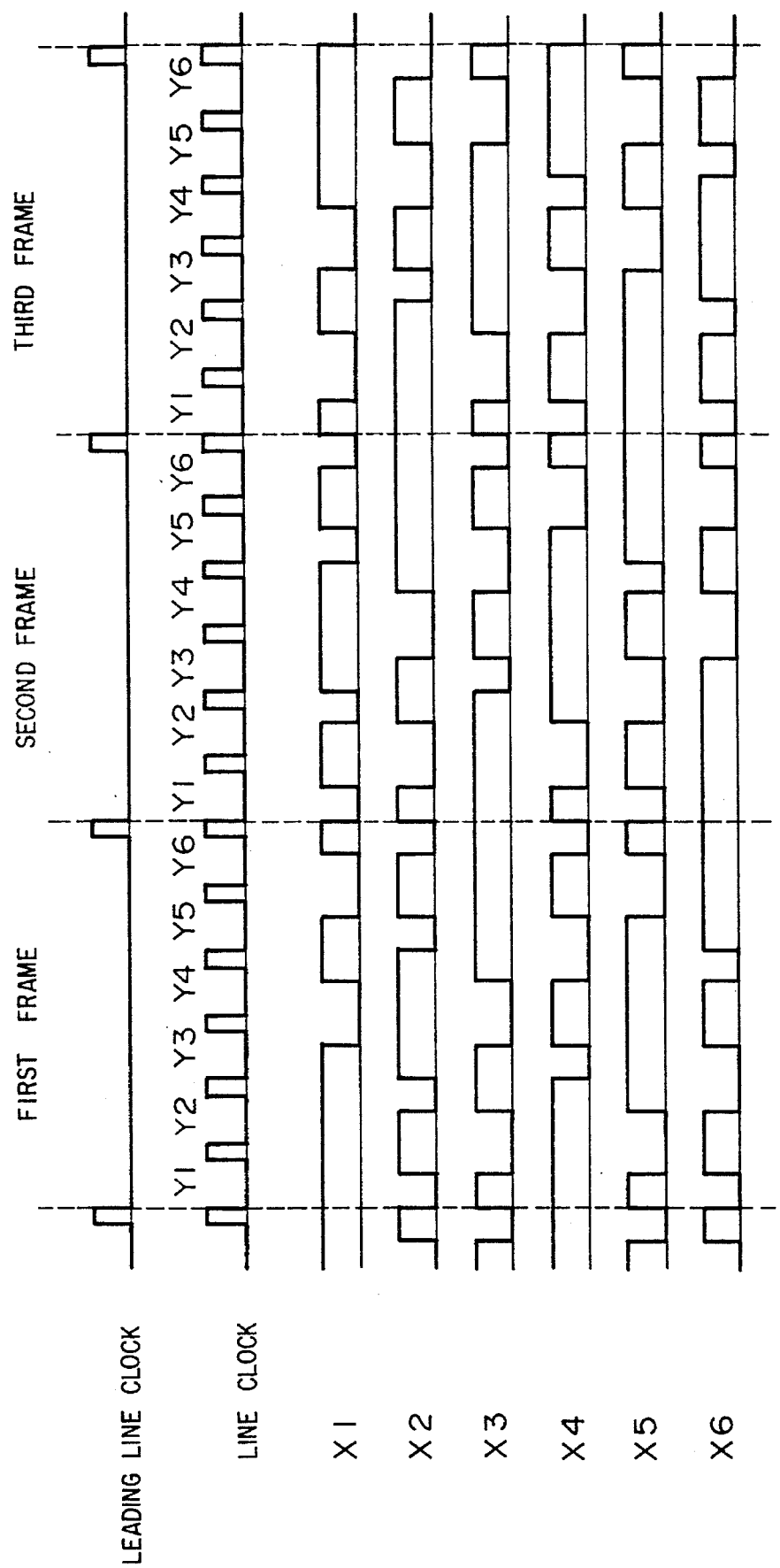

FIG. 40 shows the X drive pulse and display luminance level (66.7%) in case every high-order display data MA is "1" and the frame rate control data MB has a frame rate control ratio 1/3. Every high-order display data MA is "1". For a dot having frame rate control data MB "1", therefore, the X drive pulse becomes pulse 4. For a dot having frame rate control data "0", the X drive pulse becomes pulse 2 or pulse 3 through the phase inverting circuit 109 functioning as shown in FIG. 16. In each frame, therefore, the luminance level of the whole screen becomes 66.7%. Waveforms of X drive pulses of FIG. 40 are shown in FIG. 41. In the same way as FIG. 39, pulse transition points cancel each other between two electrodes X1 and X4, between X2 and X5, and between X3 and X6. A transition point which is not canceled between the two electrodes (such as the rising edge for the first frame, electrode X2 and line Y3) cancels the transition point (the falling edge of the electrode X4 in this case) other than a mating electrode (electrode X5 in this case). That is to say, the number of rising edges is equivalent to the number of falling edges in each line. As a result, pulse transition points cancel each other. The luminance is prevented from being lowered by expansion of the display area.

The frame rate control method of the frame rate control circuit 104 shown in FIG. 35 has heretofore been described assuming that one unit has two lines in the Y direction of the screen and m dots in the X direction. Even if one unit has 2N lines (where n is an integer) such as 4, 6 or 8 lines in the Y direction of the screen and m dots in the X direction, however, a similar scheme can be considered.

In an alternative method, control of the Y direction of the screen is not exercised and n dots (n lines in the longitudinal direction) are removed out of m dots in the X direction (m lines in the longitudinal direction) taken as one unit. This method can be considered similarly and will now be described by referring to FIGS. 42 to 44.

Figure 42:
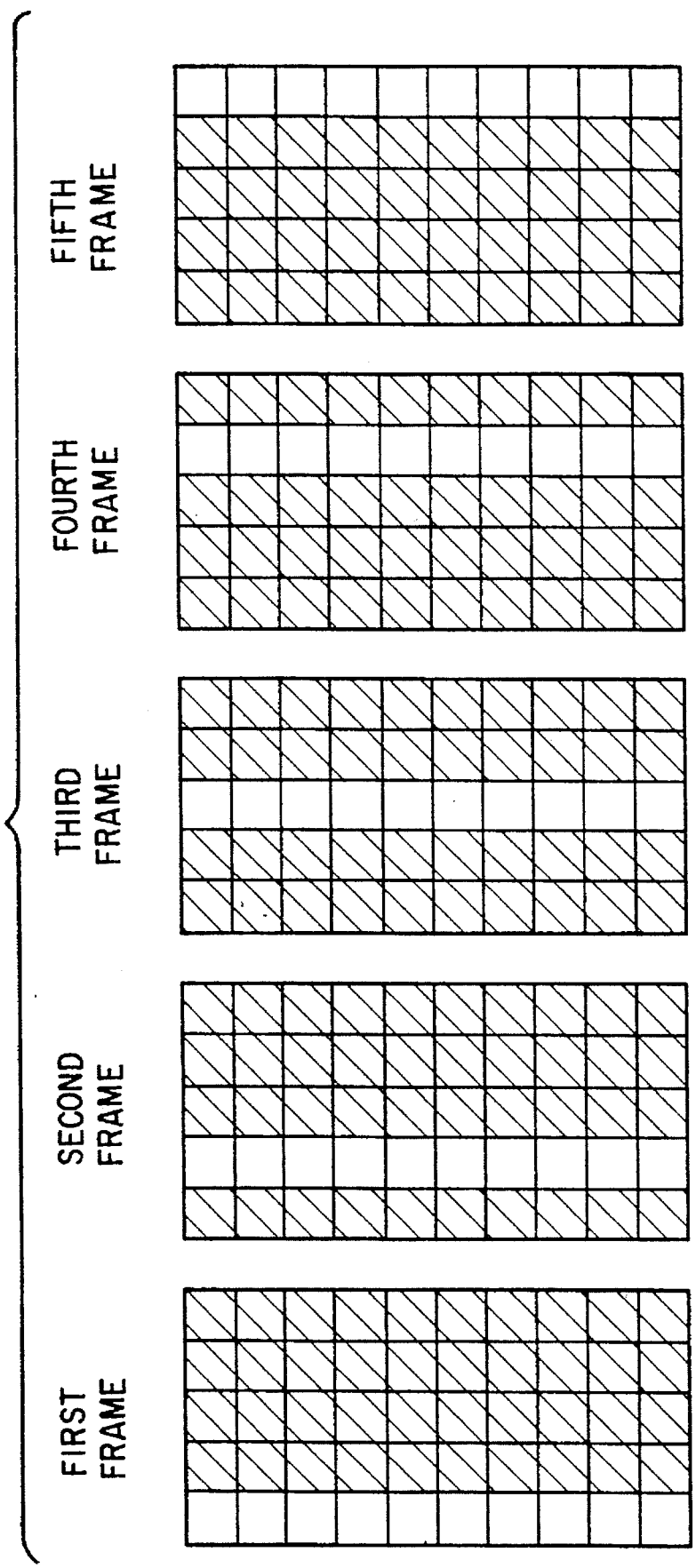
FIGS. 42 to 44 are diagrams for explaining a frame rate control method used in an embodiment of the present invention assuming that all lines in the Y direction and m dots in the X direction are taken as one unit.

Assuming that the frame rate control ratio is 4/5 as an example, FIG. 42 shows frame rate control data of respective frames. Each shaded region represents activation state "1" for display.

Figure 43:
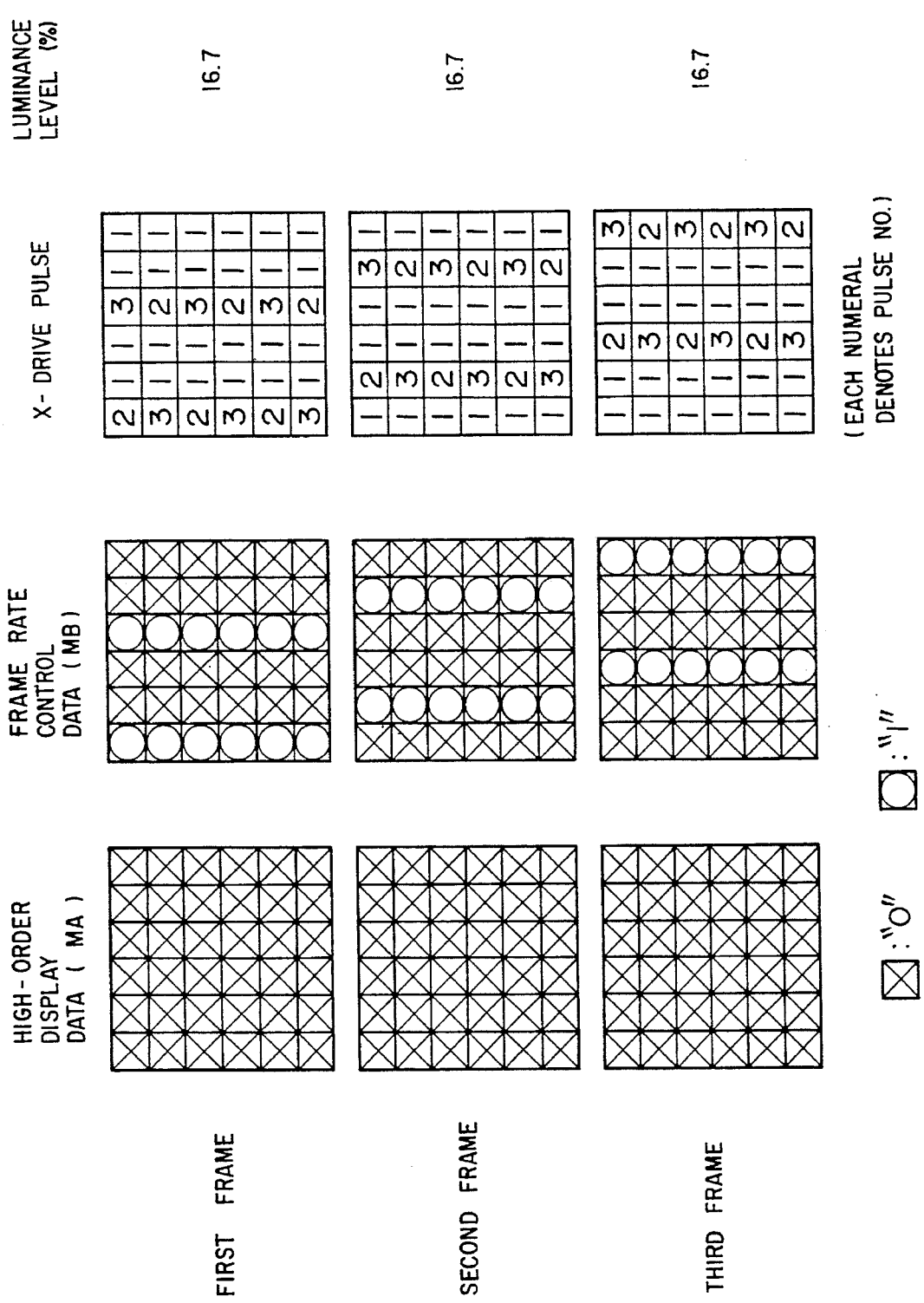

FIG. 43 shows the X drive pulse and display luminance level (16.7%) under the condition that every high-order display data MA is "0" whereas the frame rate control data MB has a frame rate control ratio of 1/3 and one unit of the data MB has all lines in the Y direction of the screen and three dots in the X direction. In the same way as FIG. 38, every high-order display data is "0". For a dot having frame rate control data MB equivalent to "0", therefore, the X drive pulse becomes pulse 1. For a dot having frame rate control data MB equivalent to "1", the X drive pulse becomes pulse 2 or pulse 3 through the phase inverting circuit 109 functioning as shown in FIG. 16. In each frame, therefore, the display luminance level becomes 16.7%. Waveforms of X drive pulses are shown in FIG. 44.

Figure 44:
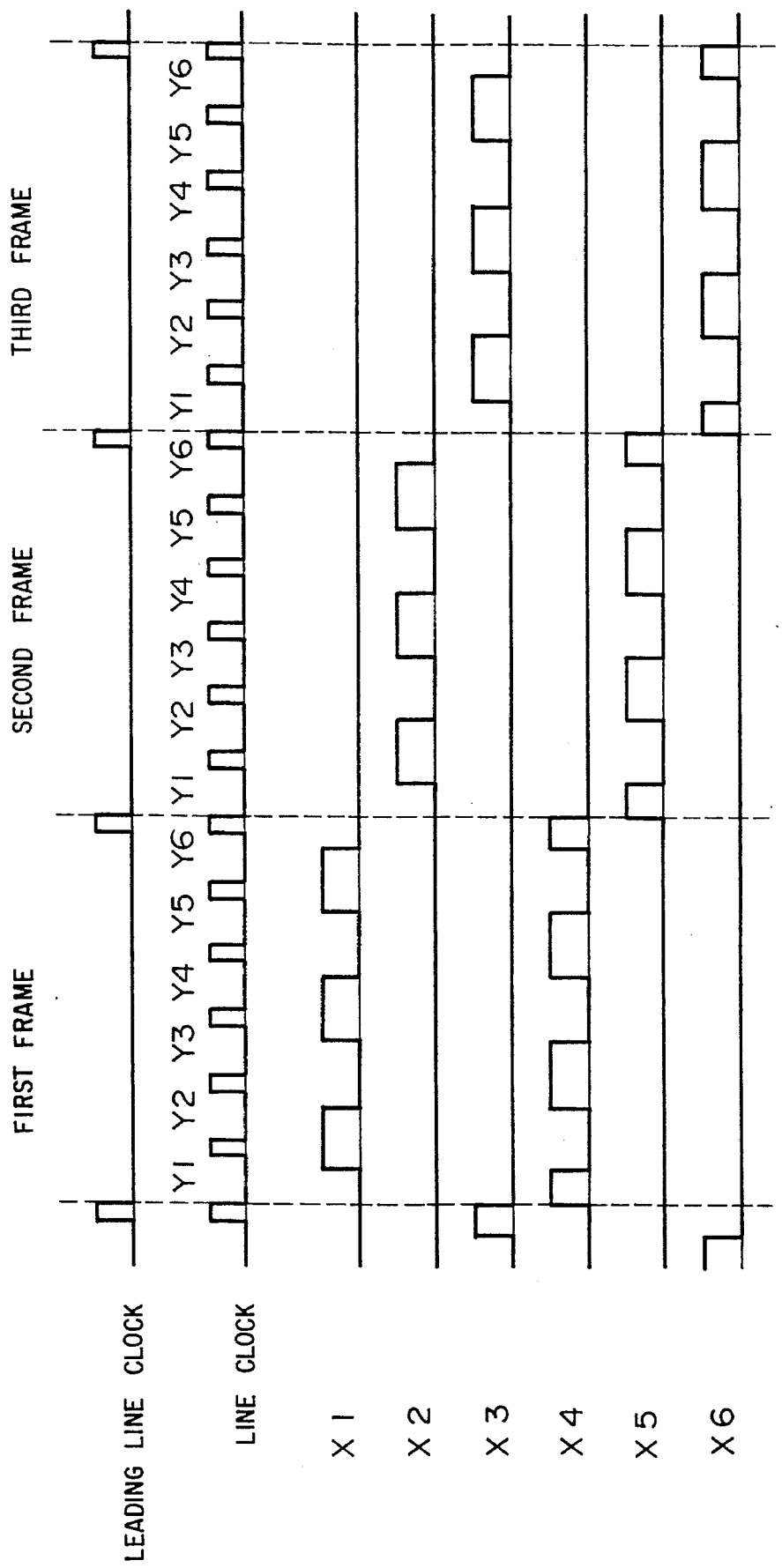

In the first frame shown in FIG. 44, pulses are applied to the electrode X1 in the order of pulse 2, pulse 3, pulse 2 and pulse 3. Pulse are applied to the electrode X4 in the order of pulse 3, pulse 2, pulse 3 and pulse 2. Pulse transition points cancel each other between these two electrodes. Pulse 1 is applied to all of other electrodes X2, X3, X5 and X6. In the same way, pulse transition points cancel each other between the electrodes X2 and X5 in the second frame. In the third frame, pulse transition points cancel each other between the electrodes X3 and X6.

The X drive pulse and the luminance level have heretofore been described by taking the frame rate control ratio 1/3 as an example. The same holds true for a different frame rate control ratio. Owing to the canceling effect of X drive pulses, therefore, lowering of the display luminance caused by expansion of display area is prevented. Multi-level tone display having stable display luminance thus becomes possible.

Figure 46:
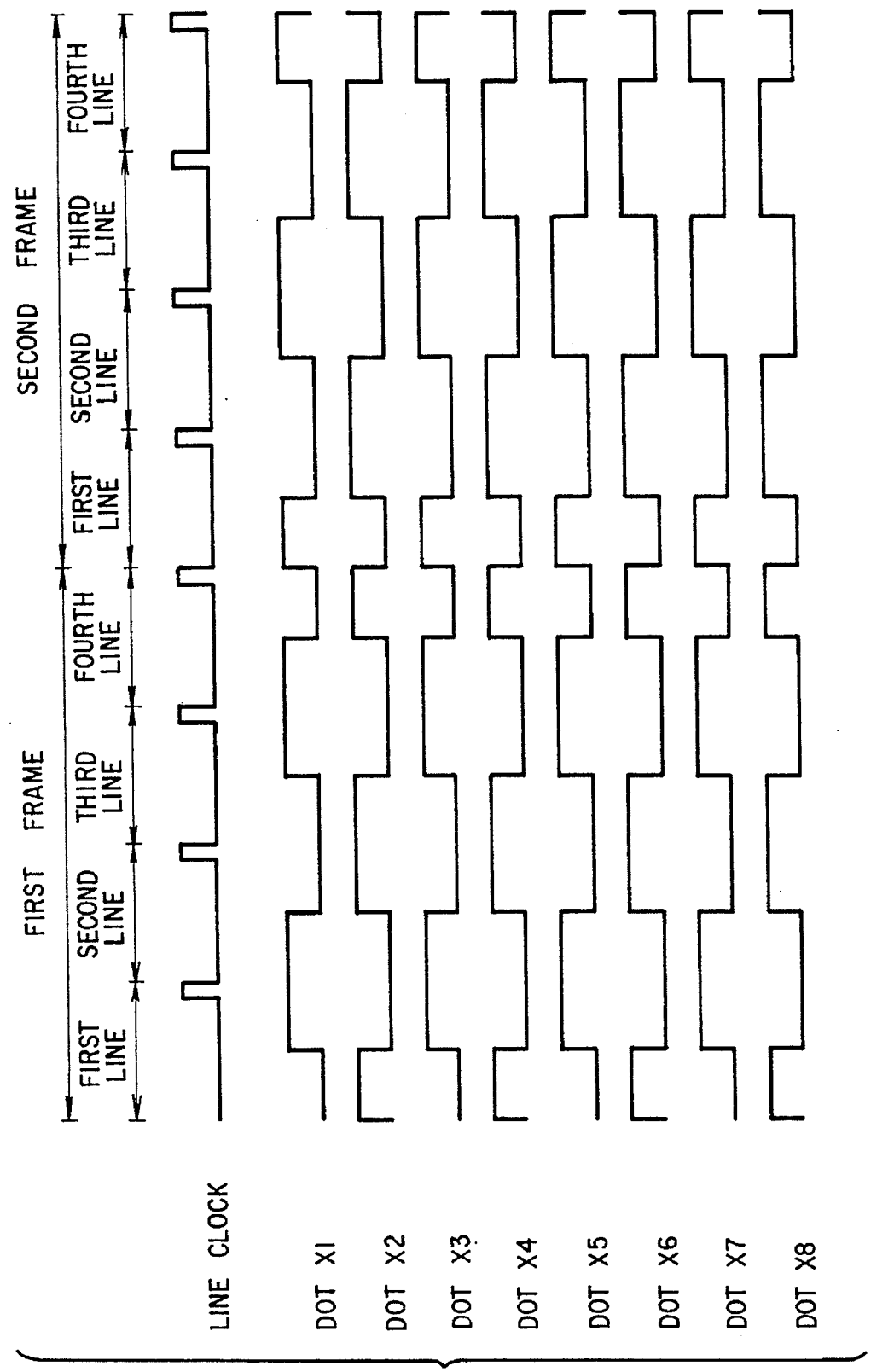

Another embodiment of phase inversion scheme using the phase inverting circuit 63 will be described with reference to FIGS. 46–50. In the phase inversion scheme mentioned in the foregoing, half-tone display is carried out by changing a data rearrangement as shown in FIG. 16 and thereby outputting display pulses shown in FIG. 46 from the X-column drive circuit 65. In FIG. 46 display pulses for adjacent X-dots are different from each other, and the display pulse for one of the adjacent dots rises while the display pulse for the other falls at the same time. For each time of the display panel, the number of rising display pulses is equal to the number of falling display pulses. Thus, the phase inverting circuit 63 serves to offset noise caused at the transition edges of the display pulses for adjacent dots by causing the transition pulse edges of adjacent dots to have opposite directions with one another.

When the half tone display is performed at a frame rate control ratio of odd-frame periods, such as 1/3 or 1/5, a display pulse of a certain X dot, for example, $X_1$ dot in FIG. 33 rises, while a display pulse of another dot making pair with the X dot falls, for example as shown by $X_4$ dot in FIG. 33. The number of rising edges of the display pulses is equal to the number of falling edges of the display pulses on each line. Thus, noise occurring at transition edges of the display pulses is offset on the line.

Figure 47:
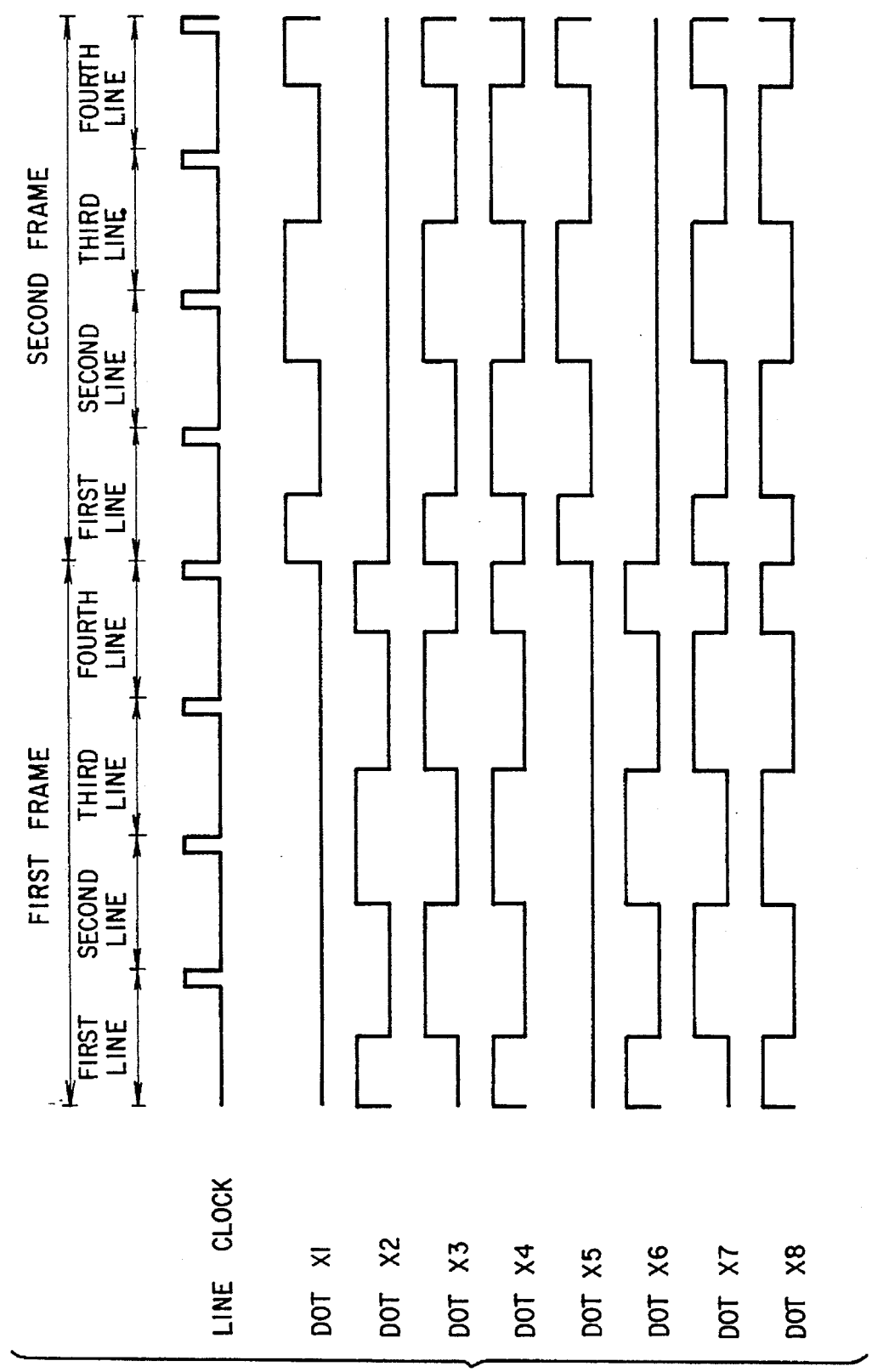

However, when the half tone display is performed at a frame rate control ratio of even frame periods such as 1/2 or 1/4, the display pulses are as shown in FIG. 47.

FIG. 47 shows waveforms of display pulses when a frame rate control is performed in the vertical direction of frames at a frame rate control ratio of 1/4. With reference to the first frame, four dots constitute one unit, and the first dot always takes an off state. When pulses for the second and fourth dots make falling edges a pulse for the third dot makes a rising edge. Conversely, when the pulses for the second and fourth dots rise, the pulse for the third dot falls. Accordingly, the numbers of rising pulse edges and falling pulse edges on each line of the display panel differ, so that noise due to the transition pulse edges cannot be offset.

Therefore, this embodiment of the present invention contemplates to cancel the noise caused at transition edges in a frame rate control of odd frame periods and even frame periods.

FIG. 48 illustrates a modification of FIG. 16 for data rearrangement with 8-dot units.

Figure 49:
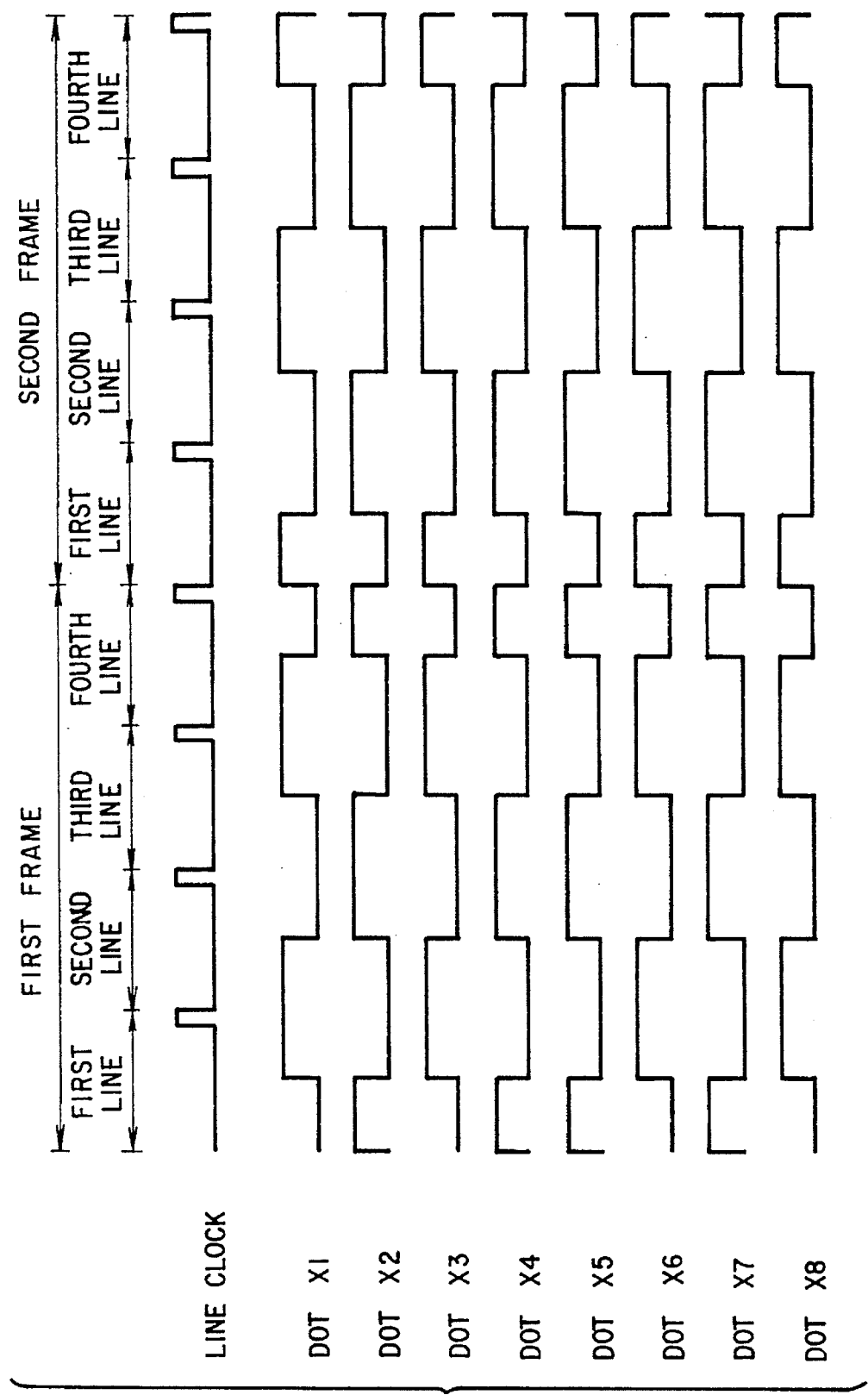

FIG. 49 illustrates display pulses for half tone display performed by data rearrangement. In FIG. 49, the numbers of rising edges and falling edges which cause transitions concurrently with respect to 8 dots in each line are equal. As a result, noise caused at the transition edges can be offset.

Figure 50:
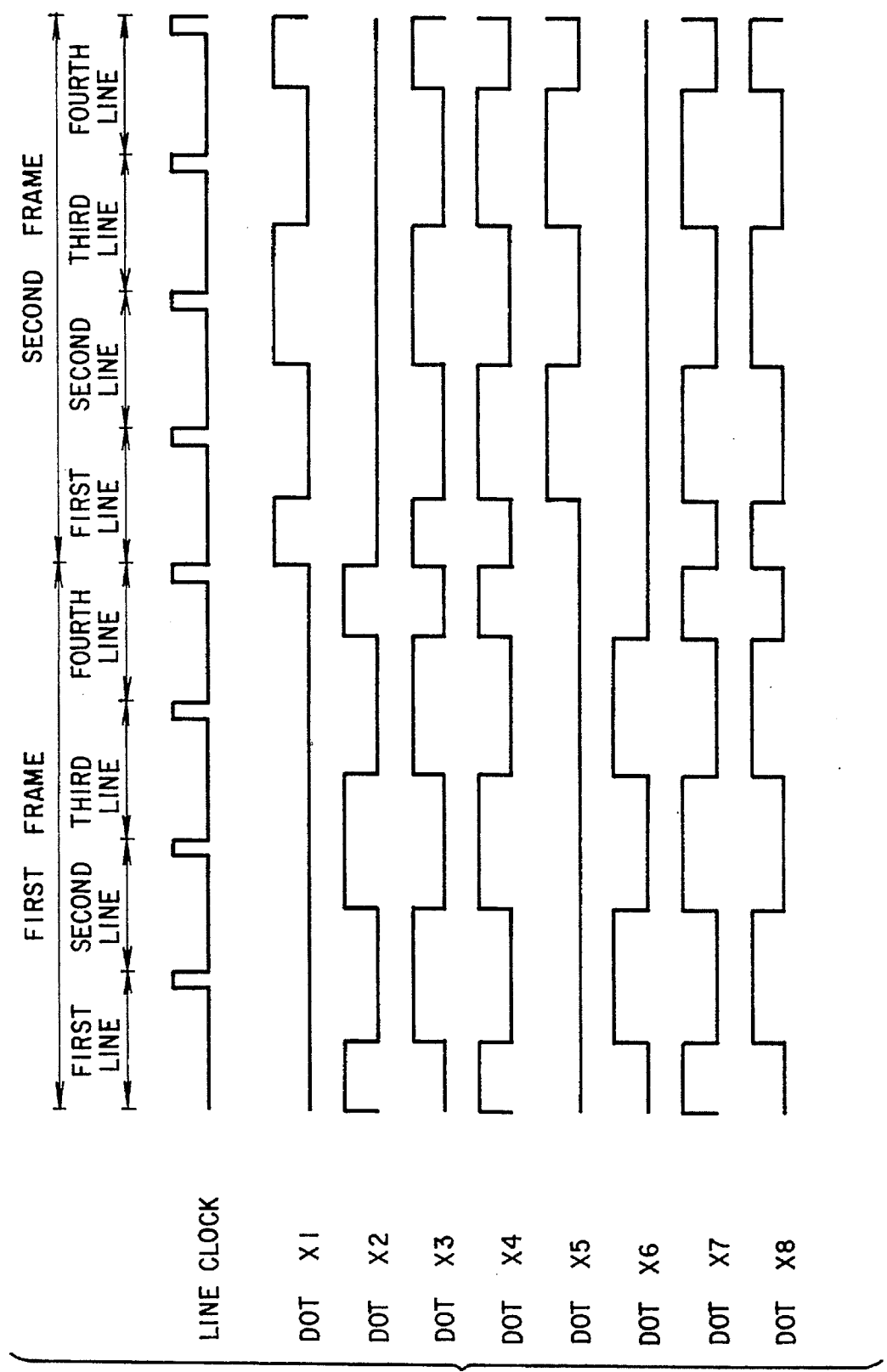

When a frame rate control at even frame periods is performed in the above half tone display, series of display pulses as shown in FIG. 50 are used. In FIG. 50, the display pulses are provided to achieve a frame rate control at a frame rate control ratio in the vertical direction of 1/4. For example, with reference to the first frame, the first and fifth dots among 8 dots constituting one unit take an off state. When the second, fourth and seventh dots take falling pulse edges, the third, sixth and eighth dots take rising pulse edges. Conversely, when the second, fourth and seventh dots take rising pulse edges, the third, sixth and eighth dots take falling edges. Thus, the numbers of rising pulse edges and falling pulse edges for each line become equal, thereby permitting the edge noise to be offset.

In the above-mentioned frame rate control of 4-frame periods, noise is cancelled for each 8 dots in one line. However, frame rate control for other frame periods may be performed in the following manners: Two-frame period frame control is performed for 8 dots as a unit, three-frame period frame control is for 24 dots, five-frame period frame control is for 40 dots, six-frame period frame control is for 24 dots and seven-frame period frame control is for 56 dots.

In the foregoing description of embodiments, only the liquid crystal panel is used. In principle, however, the present invention is also applicable to other flat display panels such as plasma or electro luminance.

Further, in transition to use of colors, quasi-multicolor display becomes possible by applying the present invention to red, blue and green colors.

By using the above described embodiments, multi-level tone display having fine steps which cannot be realized by the frame rate control method becomes possible. If the frame rate control method is simply used in order to obtain a multi-level tone display having a luminance level of 10%, for example, frame rate control with a frame rate control ratio of 1/10 resulting in deteriorated display quality must be used. In the present embodiment, however, multi-level tone display with fine display quality is realized by making high-order display data "0" and the frame rate control ratio of the frame rate control data equivalent to 1/5.

Further, by defining the unit in the frame rate control method so that one unit may have 2N lines in the Y direction of the screen and m dots in the X direction, canceling effect of transition points of X drive pulse can be made efficient.

What is claimed is:

1. A multi-level tone display method of display data for a dot matrix display panel comprising the steps of:

generating three kinds of pulses including an OFF pulse, an ON pulse and a 1/2 display ON pulse during one horizontal interval, said 1/2 display ON pulse including a first 1/2 display ON pulse which is ON in a first half of the one horizontal interval and a second 1/2 display ON pulse which is ON in a second half of the one horizontal interval;

generating a frame rate control signal for controlling one of the multi-level tones by controlling a ratio among a plurality of frames in response to the display data, said frame rate control signal being generated so that said three kinds of pulses are continuous in a vertical direction of the frames; and controlling supply of one of a pair of the pulses to a display dot of the dot matrix display panel at each frame by the frame rate control signal so as to display the display dot of the dot matrix display panel at one of the multi-level tones, said 1/2 display ON pulse being provided so that the first 1/2 display ON pulse and the second 1/2 display ON pulse are alternately supplied to vertically adjacent display dots.

2. A multi-level tone display method according to claim 1, wherein said frame rate control signal is generated so that said first 1/2 pulse display ON and said second 1/2 display ON pulse are alternatively supplied to each dot of a row of the dot matrix display panel.

* * * * *